US011055289B2

(12) United States Patent
Bastawala et al.

(10) Patent No.: US 11,055,289 B2
(45) Date of Patent: Jul. 6, 2021

(54) FRAMEWORK TO TRANSFER ROWS IN STORAGE FORMAT, STANDARD FORMAT, OR COMBINATION THEREOF

(71) Applicant: ORACLE INTERNATIONAL CORPORATION, Redwood Shores, CA (US)

(72) Inventors: Mehul D. Bastawala, Sunnyvale, CA (US); Ajit Mylavarapu, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 62 days.

(21) Appl. No.: 16/040,551

(22) Filed: Jul. 20, 2018

(65) Prior Publication Data

US 2019/0026339 A1    Jan. 24, 2019

Related U.S. Application Data

(60) Provisional application No. 62/535,872, filed on Jul. 22, 2017.

(51) Int. Cl.
*G06F 7/00*  (2006.01)
*G06F 16/2455*  (2019.01)
*G06F 16/22*  (2019.01)

(52) U.S. Cl.
CPC ...... *G06F 16/24553* (2019.01); *G06F 16/221* (2019.01)

(58) Field of Classification Search
CPC .................. G06F 16/24553; G06F 16/221
USPC .................................... 707/600–899
See application file for complete search history.

(56) References Cited

U.S. PATENT DOCUMENTS

| 7,188,102 B1 | 3/2007 | Gollapudi |
| 2005/0144176 A1 | 6/2005 | Lei et al. |
| 2018/0218030 A1* | 8/2018 | Wong .................. G06F 16/2425 |

OTHER PUBLICATIONS

Fuyuncat, Oracle Row Shipping, downloaded from http://www.hellodba.com/reader.php?ID=25, Dec. 25, 2009, pp. 6.
Timothy Hopkins, Virtual Columns and Row Shipping, downloaded from http://www.timothyhopkins.net/2009/10/virtual-columns-and-row-shipping/, Oct. 5, 2009, pp. 4.

(Continued)

*Primary Examiner* — Isaac M Woo
(74) *Attorney, Agent, or Firm* — Omkar K. Suryadevara; Silicon Valley Patent Group LLP

(57) ABSTRACT

A server receives a query and checks how columns in rows responsive to the query are to be sent to a client. Based on one result of checking, the server prepares and transmits a redacted version of one or more rows or portions thereof. The redacted version may be prepared by discarding from the retrieved rows or portions thereof, any columns that are to not be sent, by applying a specific redaction technique, while maintaining columns that are to be sent in a database storage format in which the retrieved rows are stored. Based on another result of checking, the server prepares and transmits a raw version of the retrieved rows or portions thereof, in the database storage format. Based on yet another result of checking, the server extracts columns selected by the query to memory and sends processed versions of the rows or portions thereof.

22 Claims, 32 Drawing Sheets

(56) References Cited

OTHER PUBLICATIONS

Timothy Hopkins, Attachment (to Virtual Columns and Row Shipping), downloaded from http://timothyhopkins.net/wp-content/uploads/2009/10/rowship.txt, believed to be published on or before Oct. 5, 2009, pp. 4.

Miladin Modrakovic, Wide Table Select (Row Shipping), downloaded from https://oraclue.wordpress.com/2009/07/13/wide-table-select-row-shipping/, Jul. 13, 2009, pp. 7.

* cited by examiner

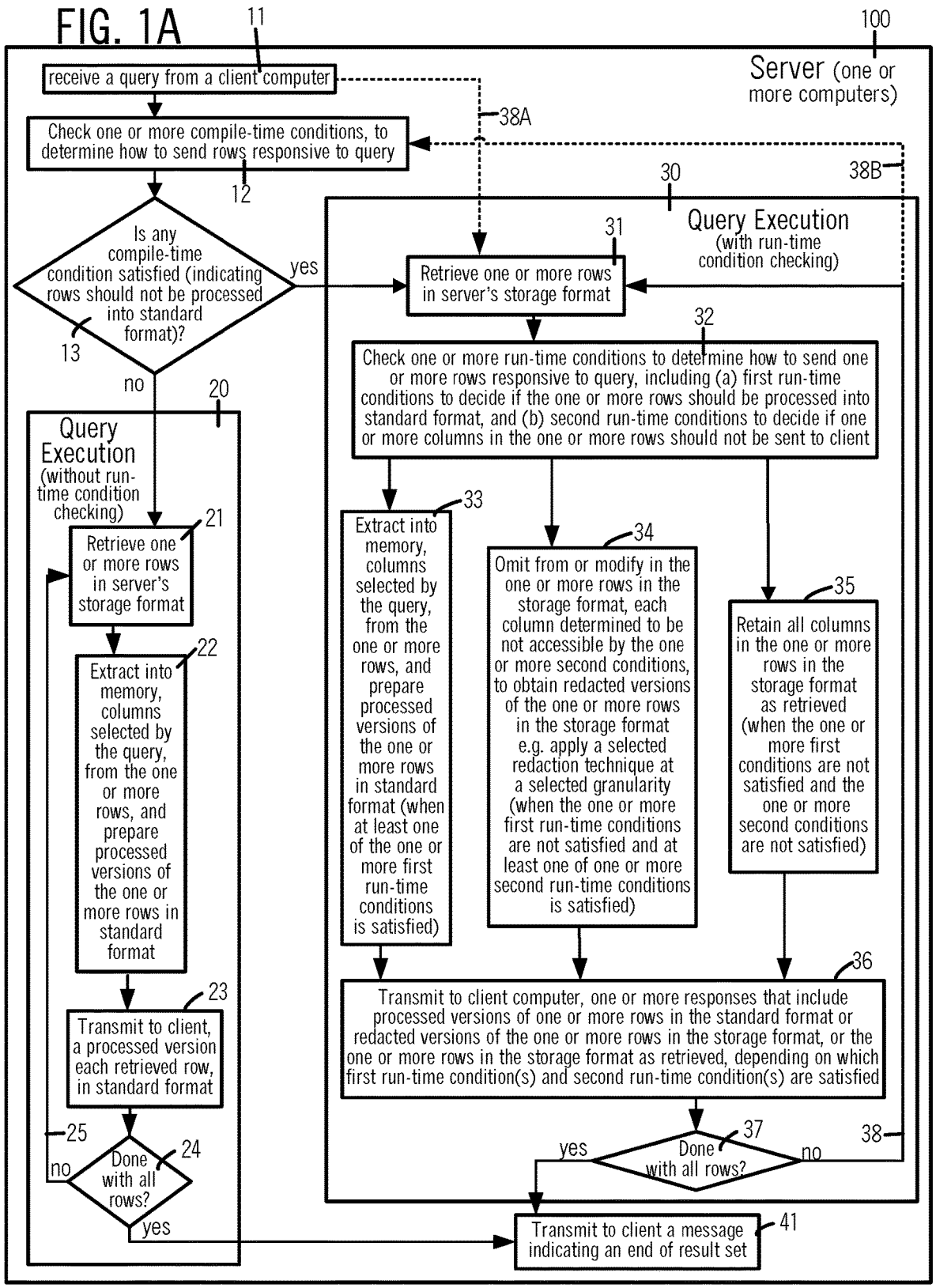

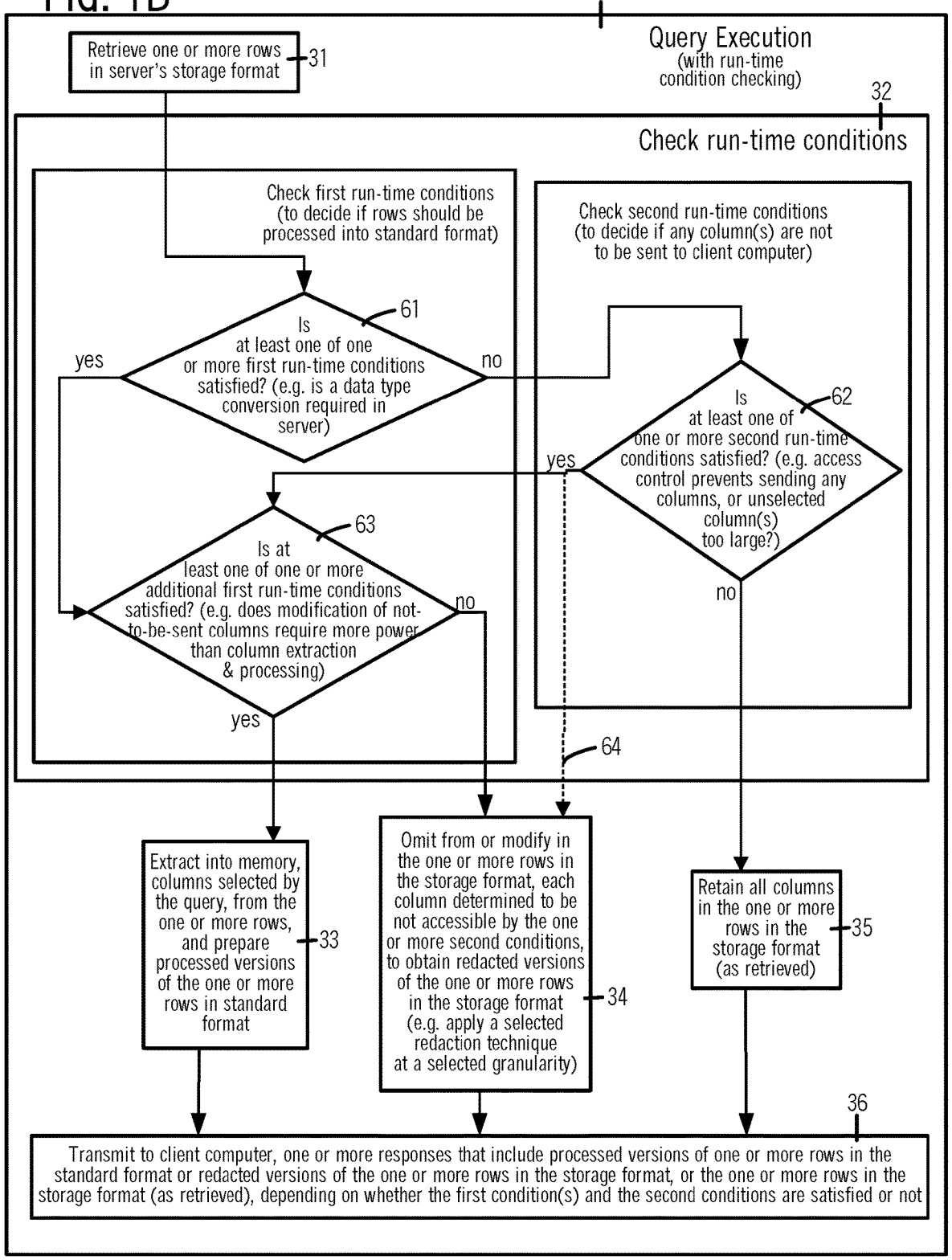

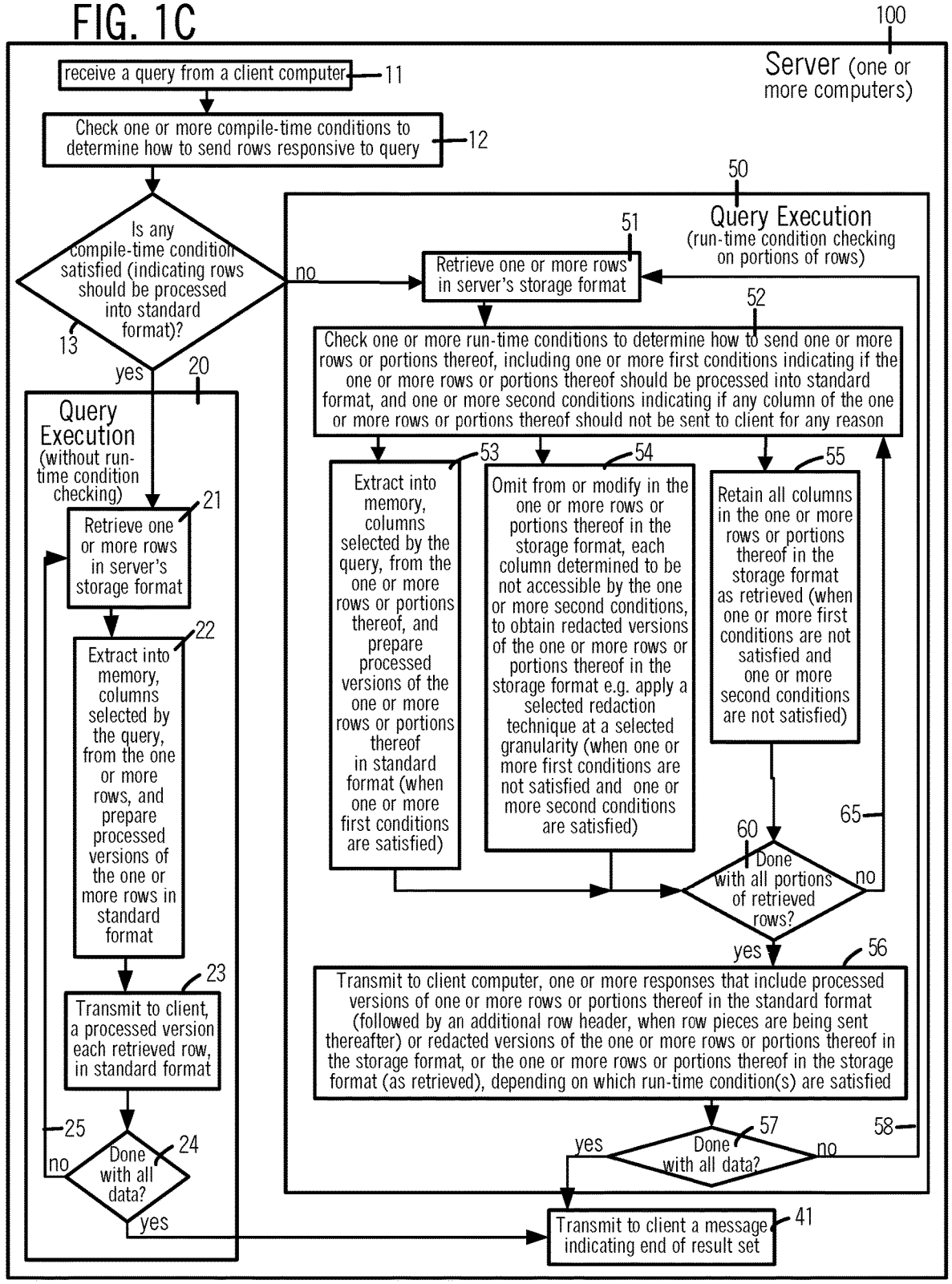

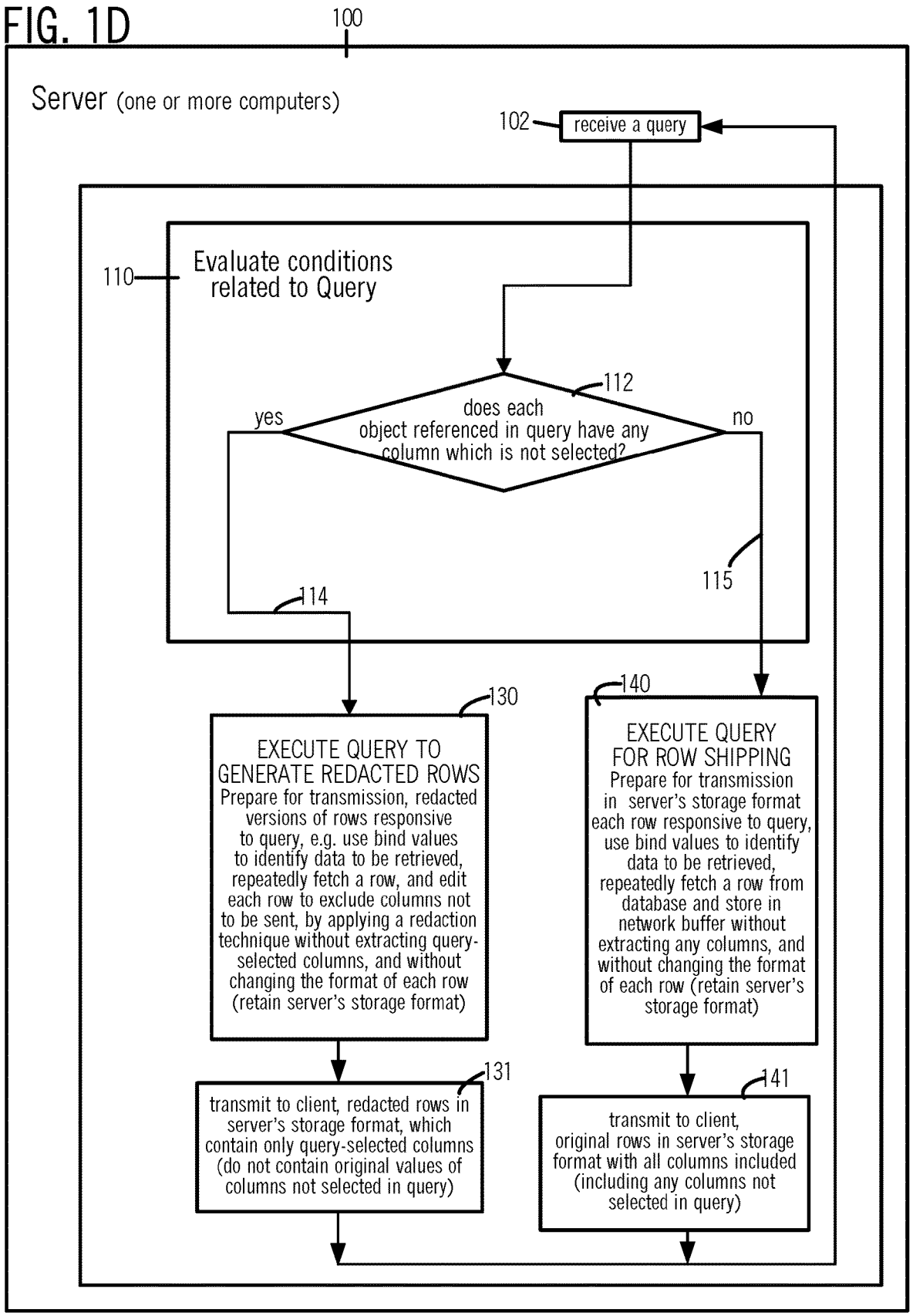

FIG. 1E

| | AI-1 | AI | AI+1 | ... | AJ-1 | AJ | AJ+1 | ... | AN | B1 | ... | BI-1 | BI | BI+1 | ... | BJ-1 | BJ | BJ+1 | ... | BZ |
|---|---|---|---|---|---|---|---|---|---|---|---|---|---|---|---|---|---|---|---|---|
| R1 | | 0000 | | | | 0000 | | | | | | | 0000 | | | | 0000 | | | |
| | | 0000 | | | | 0000 | | | | | | | 0000 | | | | 0000 | | | |
| | | 0000 | | | | 0000 | | | | | | | 0000 | | | | 0000 | | | |
| RI | | 0000 | | | | 0000 | | | | | | | 0000 | | | | 0000 | | | |
| | | 0000 | | | | 0000 | | | | | | | 0000 | | | | 0000 | | | |
| RJ | | 0000 | | | | 0000 | | | | | | | 0000 | | | | 0000 | | | |
| | | 0000 | | | | 0000 | | | | | | | 0000 | | | | 0000 | | | |
| RM | | 0000 | | | | 0000 | | | | | | | 0000 | | | | 0000 | | | |

FIG. 1F

| | AI-1 | AI | AI+1 | ... | AJ-1 | AJ | AJ+1 | ... | AN | B1 | ... | BI-1 | BI | BI+1 | ... | BJ-1 | BJ | BJ+1 | ... | BZ |
|---|---|---|---|---|---|---|---|---|---|---|---|---|---|---|---|---|---|---|---|---|
| R1 | | 8753 | | | | 6532 | | | | | | | 3546 | | | | 3424 | | | |
| | | 7315 | | | | 5676 | | | | | | | 8787 | | | | 5461 | | | |
| | | 9217 | | | | 7878 | | | | | | | 9091 | | | | 1314 | | | |
| RI | | 8415 | | | | 8934 | | | | | | | 3212 | | | | 5657 | | | |
| | | 6741 | | | | 1212 | | | | | | | 3342 | | | | 2412 | | | |
| RJ | | 5724 | | | | 3431 | | | | | | | 1233 | | | | 1334 | | | |
| | | 7842 | | | | 5672 | | | | | | | 5451 | | | | 4521 | | | |
| RM | | 7653 | | | | 6765 | | | | | | | 1235 | | | | 2311 | | | |

FIG. 1G

| | A1 | AI-1 | AI | AI+1 | AJ-1 | AJ | AJ+1 | AN | B1 | BI-1 | BI | BI+1 | BJ-1 | BJ | BJ+1 | BZ |
|---|---|---|---|---|---|---|---|---|---|---|---|---|---|---|---|---|
| R1 | | | 1971 | | | 1978 | | | | | 1977 | | | 1984 | | |
| RI | | | 1965 | | | 1984 | | | | | 1973 | | | 1989 | | |
| | | | 1975 | | | 1973 | | | | | 1985 | | | 1984 | | |
| | | | 1986 | | | 1976 | | | | | 1982 | | | 1987 | | |
| | | | 1976 | | | 1986 | | | | | 1985 | | | 1983 | | |
| RJ | | | 1983 | | | 1987 | | | | | 1987 | | | 1985 | | |
| | | | 1985 | | | 1984 | | | | | 1981 | | | 1984 | | |
| RM | | | 1974 | | | 1983 | | | | | 1971 | | | 1973 | | |

FIG. 1H

| | A1 | AI-1 | AI+1 | AJ-1 | AN | B1 | BI-1 | BI+1 | BJ-1 | BJ+1 | BZ |
|---|---|---|---|---|---|---|---|---|---|---|---|
| R1 | | | —191 | —192 | | | | —193 | | —194 | |
| RI | | | | | | | | | | | |
| RJ | | | | | | | | | | | |
| RM | | | | | | | | | | | |

FIG. 1I

| | AI-1 | AI | AI+1 | | AJ-1 | AJ | AJ+1 | | AN | B1 | | BI-1 | BI | BI+1 | | BJ-1 | BJ | BJ+1 | | BZ |
|---|---|---|---|---|---|---|---|---|---|---|---|---|---|---|---|---|---|---|---|---|
| R1 | | 0000 | | | | 6532 | | | | | | | 1977 | | | | | | | |
| RI | | 0000 | | | | 5676 | | | | | | | 1973 | | | | | | | |
| | | 0000 | | | | 7878 | | | | | | | 1985 | | | | | | | |
| RJ | | 0000 | | | | 8934 | | | | | | | 1982 | | | | | | | |
| | | 0000 | | | | 1212 | | | | | | | 1985 | | | | | | | |
| | | 0000 | | | | 3431 | | | | | | | 1987 | | | | | | | |
| | | 0000 | | | | 5672 | | | | | | | 1981 | | | | | | | |
| RM | | 0000 | | | | 6765 | | | | | | | 1971 | | | | | | | |

| | AI-1 | AI | AI+1 | AJ-1 | AJ | AJ+1 | AN | B1 | BI-1 | BI | BI+1 | BJ-1 | BJ | BJ+1 | BZ |
|---|---|---|---|---|---|---|---|---|---|---|---|---|---|---|---|
| R1 | AI-1 | 9217 | AI+1 | AJ-1 | 1978 | AJ+1 | AN | B1 | BI-1 | 0000 | BI+1 | BJ-1 | 0000 | BJ+1 | BZ |
| R2 | AI-1 | 7315 | AI+1 | AJ-1 | 0000 | AJ+1 | AN | B1 | BI-1 | 0000 | BI+1 | BJ-1 | 1984 | BJ+1 | BZ |
| RI | AI-1 | 0000 | AI+1 | AJ-1 | 0000 | AJ+1 | AN | B1 | BI-1 | 0000 | BI+1 | BJ-1 | 0000 | BJ+1 | BZ |
| RM | AI-1 | AI+1 | | AJ-1 | AJ+1 | | AN | | BI-1 | 0000 | BI+1 | | BJ-1 | | BZ |

199A, 198, 197, 196, 199B

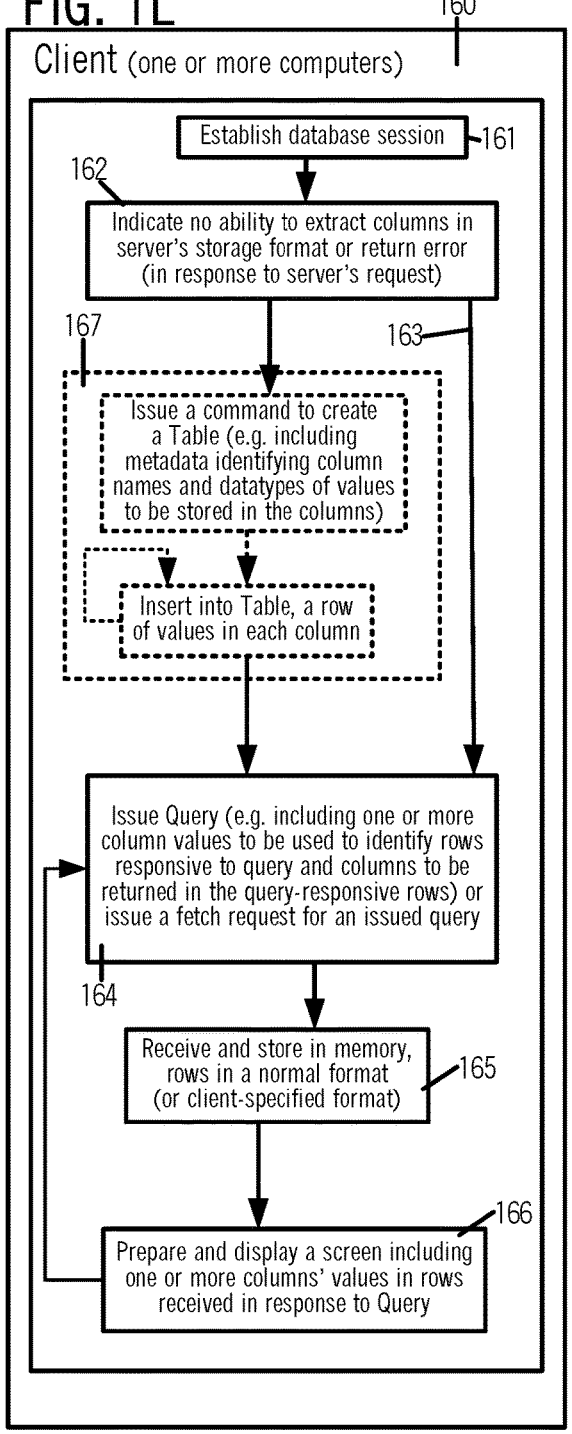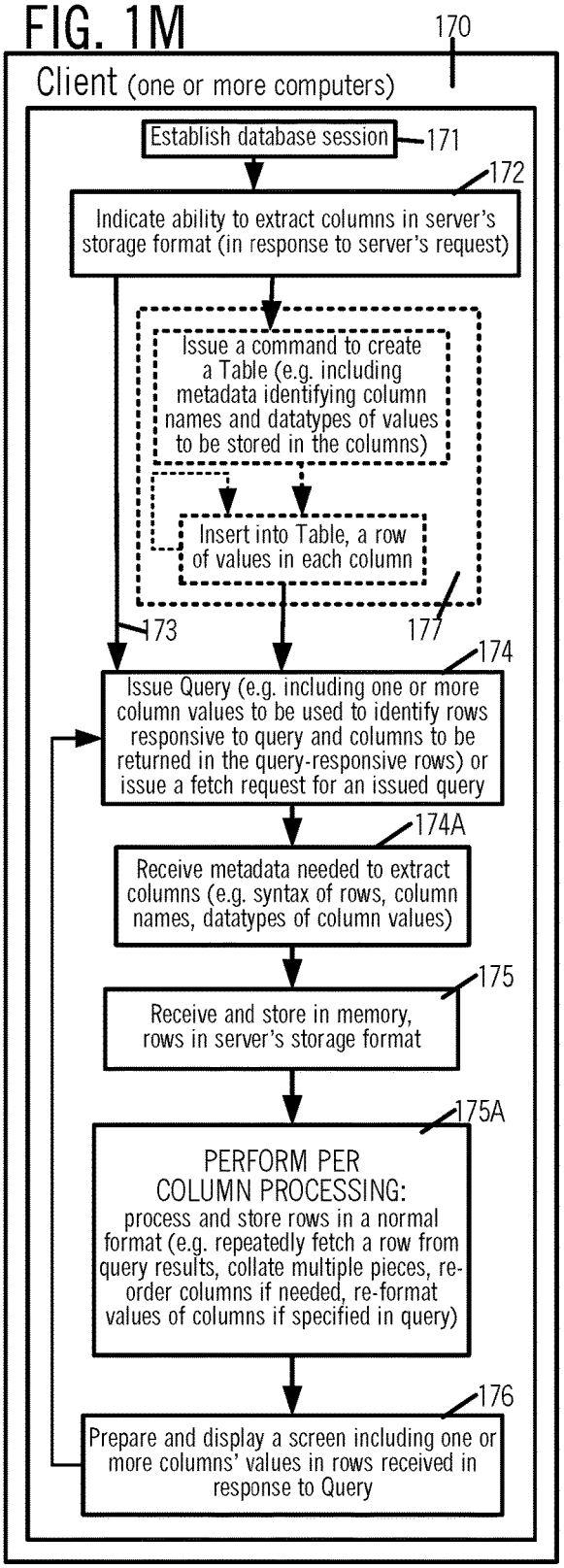

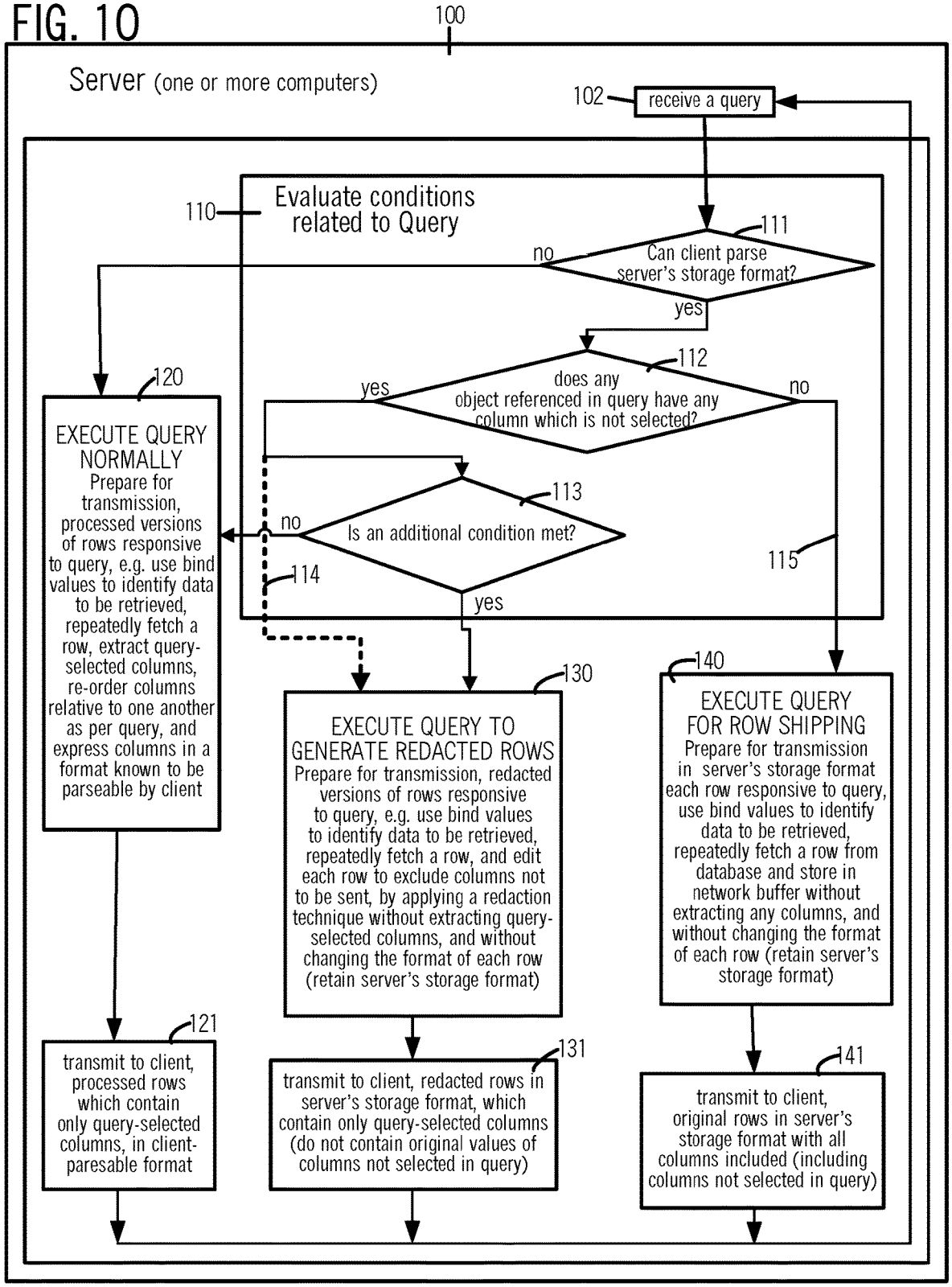

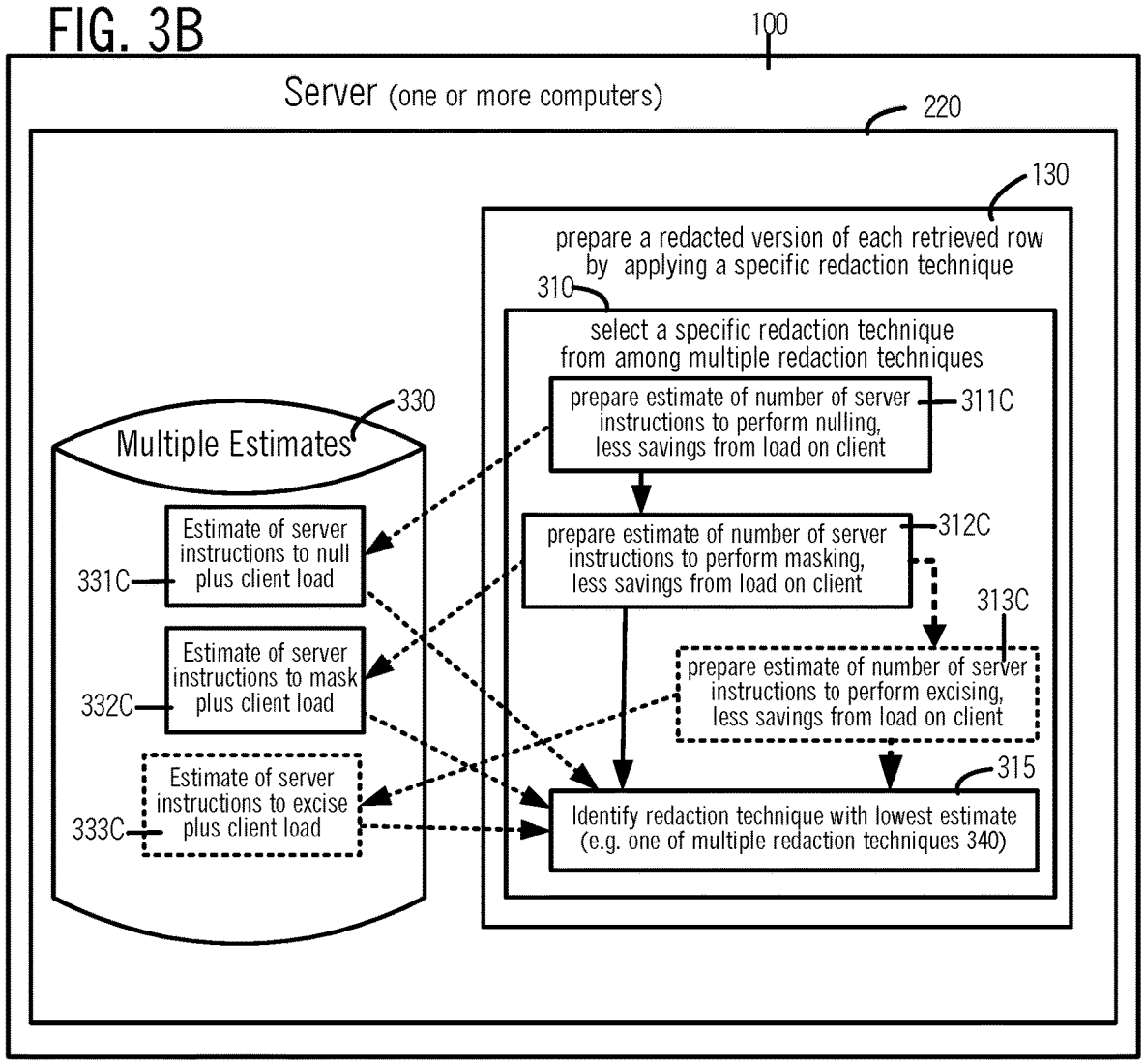

FRAMEWORK TO TRANSFER ROWS IN STORAGE FORMAT, STANDARD FORMAT, OR COMBINATION THEREOF

CROSS-REFERENCE TO PROVISIONAL APPLICATION

This patent application claims priority under 35 USC § 119 from U.S. Provisional Application 62/535,872 filed on Jul. 22, 2017, by Mehul Dilip Bastawala and Ajit Mylavarapu, originally entitled "Improving Transfer of Data in Storage Format In Response To A Query" and identified in a Provisional Filing Receipt of Jul. 31, 2017 by the title "Transfer of Data in Storage Format In Response To A Query", which is hereby incorporated by reference herein in its entirety.

BACKGROUND

In a prior art relational database management system (RDBMS), to reduce workload in a database server, certain work performed in the server was moveable to a client. Specifically, queries which referenced a single table had all columns of data streamed to the client (in a process called "row shipping"), in the same format in which the rows were stored on disk (also called "disk row format" or "database storage format"), when certain thresholds were met, e.g., X % of the total number of columns in a table were requested by the query or X % of the total amount of data in a table row were requested by the query. In addition, the server informed the client of a definition of the database storage format, which was then used by the client to extract the data of each column and process the data to obtain columns selected by the query. Because extraction and processing of data to obtain columns selected by the query was moved from the server to the client, a significant decrease was achieved in the number of instructions executed on the server, to respond to such queries.

For details on transfer of data in database storage format from a server to a client, see U.S. Pat. No. 7,188,102 by Sreenivas Gollapudi et al, entitled "Method and Apparatus For Efficient Transmission of Result Set Data" that is incorporated by reference herein in its entirety.

SUMMARY

In several embodiments, a server (which may be implemented by one or more computers in a cloud, depending on the embodiment) includes logic that implements a framework to respond to a query on one or more tables in a database, which is received from a client, by transferring to the client, data in the form of rows in a storage format (also called raw rows), or rows in a standard format (also called server processed rows) or rows in any combination of these two formats. In such embodiments, rows in any of these formats are transferred by the server to the client, after excluding from these rows, original values of any column identified as sensitive, e.g. by a database administrator (DBA).

In some embodiments, the framework's logic is used by the server, to decide which of one or more three operations is to be performed, on query-responsive rows of original values (or raw rows), which are retrieved from one or more storage devices or a remote location: (a) a first operation to process one or more raw rows (or portions thereof) into a standard format, resulting in server-processed rows (or server-processed values of one or more columns), or (b) a second operation to exclude original values of any column which is identified as sensitive from the raw rows, while retaining original values of other columns in the raw rows in the storage format, resulting in redacted versions of raw rows (or redacted versions of one or more row pieces), or (c) a third operation to retain unprocessed by the server, the raw rows (or one or more pieces of the raw rows), as retrieved from the database.

In the second operation to generate redacted versions of raw rows, the server omits from or modifies in the one or more raw rows (expressed in the server's database storage format), any columns not to be sent to the client (for any reason), to obtain and transmit to the client, redacted versions of the one or more rows. In the third operation, the server transmits to the client, original rows in the server's database storage format (also called "raw rows"), without discarding any value in any column of any row, regardless of which columns are selected or not selected in the query.

In certain embodiments, values of any columns that are not selected in the query and are not identified as sensitive, may be either (a) transmitted to the client or (b) excluded from transmission. In an illustrative example, rows in a database contain 100 columns, among which 10 columns are not selected in the query and among these 10 columns, 5 columns are identified in the database as sensitive. In this example, the framework additionally enables the server to decide (e.g. based on current server load), to perform the second operation described above either by excluding values of the 10 columns that are not selected (also called "first option") or alternatively by excluding only values of the 5 columns identified as sensitive (also called "second option"), while values of all other columns in either of these two options are retained in storage format (as raw values), for transmission to the client. Such an exclusion of values may be performed in the server by, for example, invoking a modification function, such as masking function or a randomizing function (similar to invoking a function to convert data types), or a nulling function or alternatively by invoking an excision function to excise (or cut out) one or more sensitive columns' values from a row, and any one of these functions may be determined by the framework depending on different factors, e.g. processing power to perform each function.

In some embodiments, original values of one or more specific columns in one or more raw rows are processed in the server in the first operation (e.g. to convert from one data type, such as a number, to another data type, such as a string of characters), and values of one or more other columns within each raw row are retained in storage format, while excluding if necessary, values of any column identified as sensitive in the second operation.

In certain embodiments, the server may be configured to do server processing only on columns that need conversion for client compatibility such as data type conversions. The server may choose to send columns not selected including the sensitive columns in raw format. This may be determined by the server evaluating certain conditions such as indications that the client and network are secure.

Such embodiments of the server may be configured to include an indication to the client that the one or more specific columns (which were processed in the first operation) are in the standard format, and/or that the one or more other columns (which were retained unprocessed) are in the storage format, e.g. as one or more flags in each row and row pieces transmitted. In one embodiment, instead of transmitting the flags within each row, the flags may be transmitted once for any number of rows transmitted in a query-responsive set, e.g. in response to a fetch request.

In many embodiments, a server receives from a client computer, a query that references one or more objects (such as tables) stored in a database on one or more storage devices (such as hard disks). Then, a framework in the server evaluates one or more conditions to decide how to return rows responsive to the query and based thereon the server executes the query by performing one or more of multiple operations. In such embodiments, one or more conditions (e.g. based on the query's SQL statement) may be checked in the framework at compile time, called "compile-time conditions", to see if the row can be transmitted in storage format by performing the second operation or third operation (e.g. SQL statement requires a complex join of more than two tables). If these compile-time conditions are not satisfied, a first operation is performed by retrieving one or more rows responsive to the query, extracting into memory one or more selected columns from the one or more rows, processing the columns in a normal manner into a standard format (e.g. a comma separated values), and transmitting processed versions of rows (also called "server processed rows") to the client computer. Depending on the embodiment, the first operation (to prepare server processed rows) may be performed repeatedly (in response to, e.g. a fetch request from the client computer), until all rows responsive to the query are sent to the client computer (also called simply "client"). In some embodiments, all compile-time conditions may need to be satisfied for storage format transmission by use of second or third operations. In other embodiments, one or more compile time conditions may need to be satisfied for storage format transmission by use of second or third operations.

After compile-time conditions have been checked (e.g. based on SQL) in the framework, and when compile-time conditions are satisfied, the server retrieves from the database one or more rows responsive to the query and uses the framework to check one or more run-time conditions after retrieval of the one or more rows. The run-time conditions checked in the framework include one or more first run-time conditions used by the server to decide if the one or more rows should be processed into the standard format (described above), to obtain server processed rows. The run-time conditions additionally include one or more second run-time conditions in the framework which are used by the server to decide if any column in the one or more rows should not be sent to the client, for any reason.

When any of the first run-time conditions is satisfied (e.g. if SQL statement of the query is complex), the server performs the above-described first operation to generate server-processed rows, and when any rows responsive to the query remain to be sent, repeats at least retrieving of query-responsive rows and checking of first run-time conditions (as described above). When the first run-time conditions are not satisfied (e.g. if SQL statement of the query is simple), instead of performing the first operation to generate server-processed rows, the server may perform a second operation to generate redacted versions of raw rows when at least one second run-time condition is satisfied (e.g. if any column is sensitive). Alternatively, when the first run-time conditions are not satisfied (e.g. if SQL statement of the query is simple) and when the second run-time conditions are also not satisfied (e.g. if no column is sensitive), the server may perform a third operation to send raw rows to the client.

In response to server's performance of the second operation or third operation, a client which receives rows in the server's database storage format performs one or more steps of processing each column (e.g. extracting, re-ordering and re-formatting) normally performed by the server, to obtain a processed version of each row. In contrast, in the above-described first operation, the server prepares and transmits rows in which all columns' values have been processed in the normal manner, as processed versions of rows. A client that receives the processed versions of rows does not need to perform the just-described steps of processing each column, as these steps have been already performed by the server.

Use of the first operation allows a server to maintain backward compatibility with clients that are unable to parse the server's database storage format, while use of the second or third operation by the server has several other advantages as follows. One advantage of the second and third operations is that processing of rows in the server's database storage format by the client reduces computation in the server, which in turn enables query processing in the server to be completed faster, relative to use of the first operation. In one example, transmission of rows in the server's database storage format reduces processing in the server, because the server does not have to re-order data in rows responsive to the query, even if the query specifies a first order (also called "query-specified order") which is different from a second order in which the data is stored in query-referenced objects (e.g. tables) in the database (also called "storage order"). Moreover, transmission of redacted versions of rows in the server's database storage format (or raw rows) allows the server to not re-format any column's values in responding to the query, even when a client's specified format (also called "client-requested format") is different from a format in which these values are stored by the server in its database. Another advantage of the second operation is that redaction of rows (which is a form of editing) within the server, while the rows are still in the server's database storage format, eliminates transfer to the client, of values that are discarded by redaction, which improves network bandwidth, and which additionally improves security when the redacted values are too sensitive to transfer over the network.

In some embodiments, the run-time conditions which are evaluated by a server as described above include a specific run-time condition which checks if a client computer that sent the query has an ability to parse the server's database storage format in which rows are stored in the database. At least partially in response to finding that this specific run-time condition is true, the server executes the second and/or third operation described above, to transmit rows responsive to the query in the server's database storage format. But if the client is found unable to parse the server's database storage format, the server executes the first operation described above, to prepare and transmit server processed versions of rows responsive to the query. The preparation and transmission of server processed versions of rows may also be performed even when the client is able to parse the server's database storage format, based on a result of the server's evaluation of one or more additional first run-time conditions. The additional first run-time conditions may check, e.g. whether a percentage of columns selected in the query relative to all columns in objects referenced by the query is below a predetermined minimum (e.g. 10%). When additional first run-time conditions are satisfied, the server prepares and transmits processed versions of one or more rows in standard format, as described above.

Checking of compile-time conditions and run-time conditions as described above enables a server to flexibly perform load balancing, by determining when to use its own processing power (e.g. to process columns itself) and when to use the client computer's processing power (e.g. by sending unprocessed rows in the server's database storage format (also called raw rows) to the client). Transfer of processing load from a server to a client (e.g. by sending one or more raw rows in the storage format) enables the server to perform other tasks, which improves internal functioning of the server, by enabling the server to use the processing power spared by the processing load transfer to perform other tasks (which may otherwise be delayed).

The above-described second operation, to redact rows by omitting or modifying one or more values of columns not selected in a query, can be performed by a server using a redaction technique at different levels of granularity. Specifically, a redaction technique (such as excising, masking, randomizing or nulling), can be used by a server to redact all unselected columns in all rows, when applied at table level granularity. Alternatively, multiple redaction techniques can be used by a server, to redact respective multiple unselected columns in all rows, which constitutes column level granularity. Yet another alternative is to apply a different redaction technique at each intersection of an unselected column with a row, which constitutes row level granularity.

Use of row level granularity enables a server to identify, based on statistics, which of multiple redaction techniques places the least computational load on the server, but usage of row level granularity is normally more computation intensive than column level granularity, which in turn can be more computation intensive than table level granularity. Hence, in some embodiments, the server evaluates additional conditions (which are different from the above-described compile-time and run-time conditions), and based thereon, automatically selects, from among multiple levels of granularity (such as table level, column level and row level), a current level of granularity at which a redaction technique is applied to discard from rows, values of columns not selected in the query. The current level of granularity may be selected based on, for example, additional conditions that test computation load in the server, privilege of the client, and latency in the client.

At a current level of granularity, the server determines one or more redaction techniques (such as nulling, excising, masking and randomizing) to be used, for example based at least partially on corresponding estimates of number of instructions required to be executed in applying respective redaction techniques. Depending on the embodiment, the server may determine the one or more redaction techniques additionally based on an estimate of reduction in processing load at a client that sent the query, due to not extracting from rows in the server's storage format one or more columns not selected in the query. Furthermore, in some embodiments, the one or more redaction techniques to be used may be determined by a server based on statistics related to a number of times in previous executions of the query, each redaction technique was found to be least computationally intensive and used to discard a value of a column. Then, the server applies the determined redaction techniques, at the current granularity level, to prepare redacted versions of rows, by discarding any value of any column not selected in the query. The current level of granularity may be changed at any stage of query execution, such as between executions of a query with different bind values or during execution of a query with the same bind values if the database returns multiple blocks of rows by changing the current level of granularity between blocks, followed by determination of one or more redaction techniques as needed.

As noted above, one of the first operation, or the second operation or the third operation may be performed on a single row in many embodiments. However, in other embodiments, one or more of the first, second and third operations may be performed on one or more portions of a single row. In certain embodiments, the first operation may be performed on one portion of a specific row, and the second and/or third operation may be performed on one or more other portions of the specific row, followed by transmission of the specific row as a combination that is expressed partly in the standard format (prepared by the first operation) and partly in the storage format (prepared by the second and/or third operation).

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

Figure 1K:
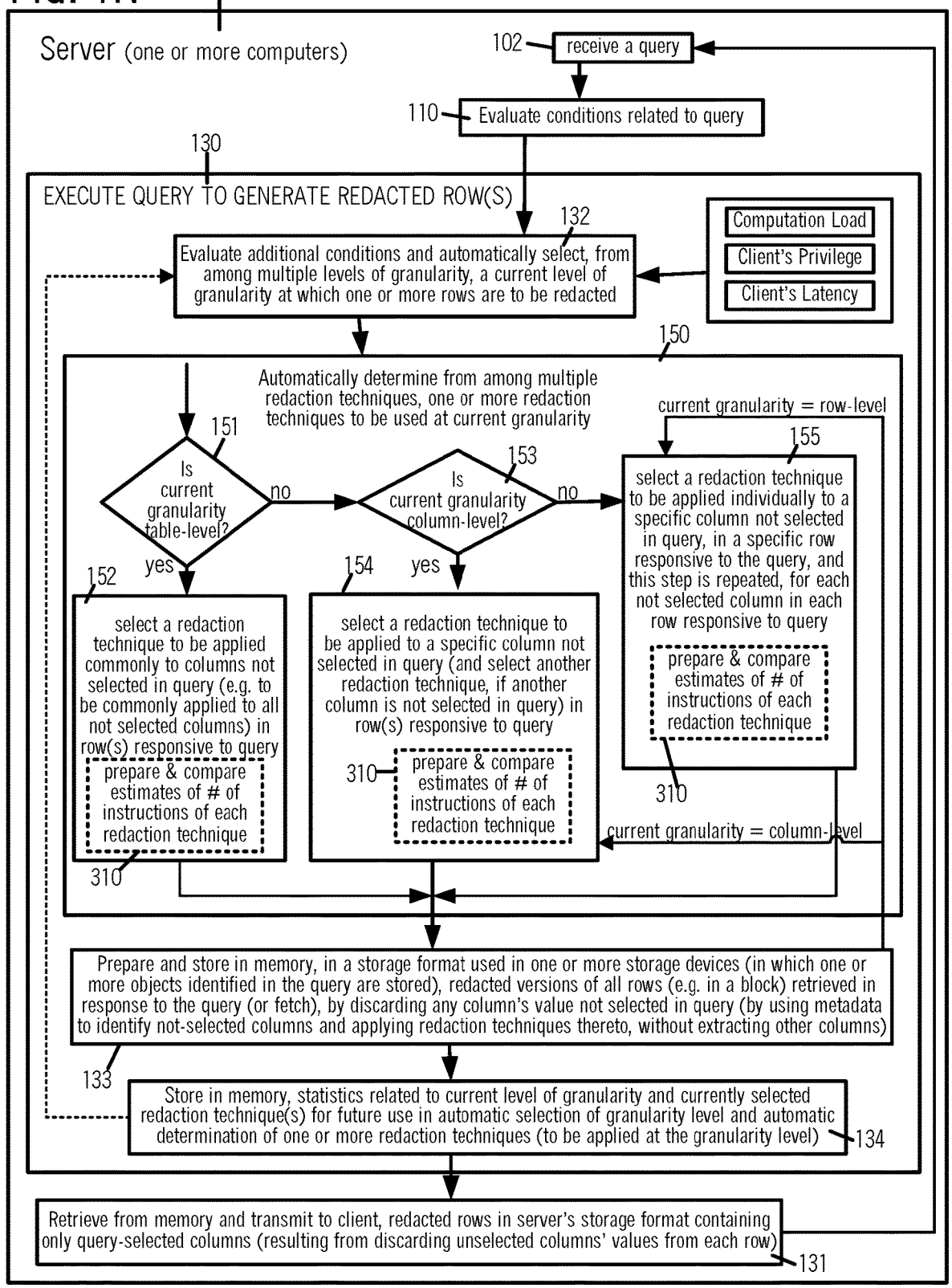
FIG. 1K illustrates, in a high-level flow chart, in the method performed by server 100 of FIG. 1D, operation 130 to prepare redacted versions of rows by discarding one or more column's values without extracting values of other columns, followed by transmission of the redacted versions in the server's database storage format to a client that sent the query, in certain embodiments of the invention.
Figure 1N:
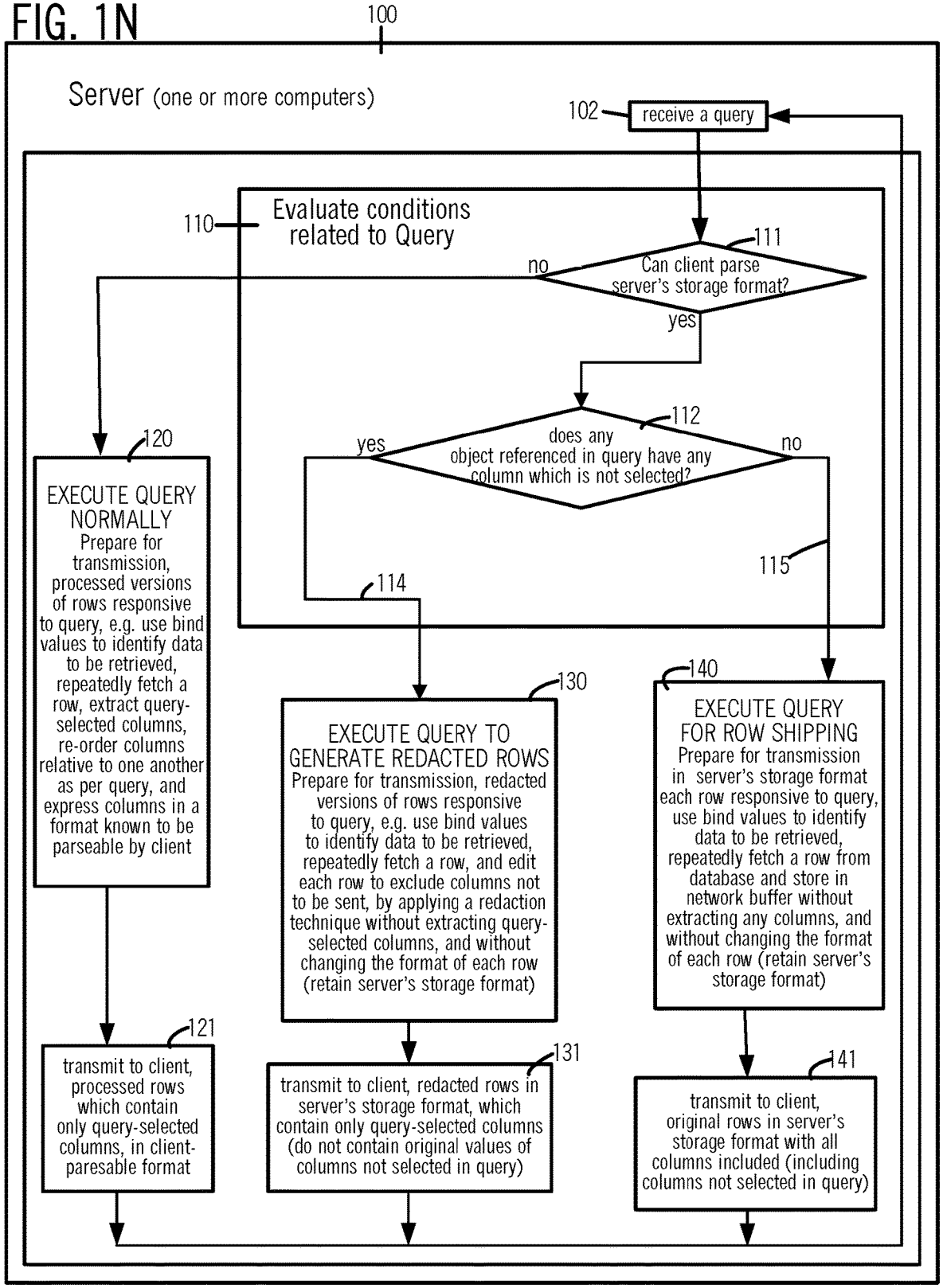
FIG. 1A illustrates, in a high-level flow chart, a method of performed by server 100 to prepare and transmit to a client, a result set of rows responsive to a query in illustrative embodiments of the invention.
FIG. 1B illustrates in an intermediate-level flow chart, steps 61-63 used to implement act 32 of FIG. 1A in some embodiments.
FIG. 1C illustrates, in a high-level flow chart, another method performed by server 100 of several embodiments, to prepare and transmit to a client, one or more rows responsive to a query, as a combination expressed partly in a standard format and partly in a storage format.
FIG. 1D illustrates, in a high-level flow chart, a method of performed by server 100, with one or more steps and/or acts and/or operations similar or identical to FIG. 1A, to analyze information related to a query in operation 110 and based thereon execute the query to prepare a result set responsive to the query, by performing one of alternative operations 130 and 140, in illustrative embodiments of the invention.
FIG. 1E-1H illustrate, redacted rows R1, R2 . . . RI . . . RM, prepared by server 100 on performance of operation 130 of FIG. 1D, by application of the respective redaction techniques of nulling, masking, randomizing and excising, at minimal (e.g. table level) granularity, in some embodiments.
FIG. 1I illustrates, redacted rows R1, R2 . . . RI . . . RM, prepared by server 100 on performance of operation 130 of FIG. 1A, by application of the redaction techniques of nulling, masking, randomizing, and excising at intermediate (e.g. column level) granularity, in some embodiments.
FIG. 1J illustrates, redacted rows R1, R2 . . . RI . . . RM, prepared by server 100 on performance of operation 130 of FIG. 1A, by application of redaction techniques of nulling, masking, randomizing and excising, at maximum (e.g. row level) granularity, in some embodiments.
FIGS. 1L and 1M illustrate, in two embodiments that are alternative to one another, methods performed by clients 160 and 170, in response to receipt of rows prepared by server 100's performance of the method of FIG. 1D, in illustrative embodiments.

FIG. 1N illustrates, in a high-level flow chart, an alternative method performed by server 100 (similar to the method of FIG. 1D), including act 111 and operation 120.

FIG. 1O illustrates, in high-level flow chart, another alternative method performed by server 100 (similar to the method of FIG. 1N), including act 113.

Figure 1P:
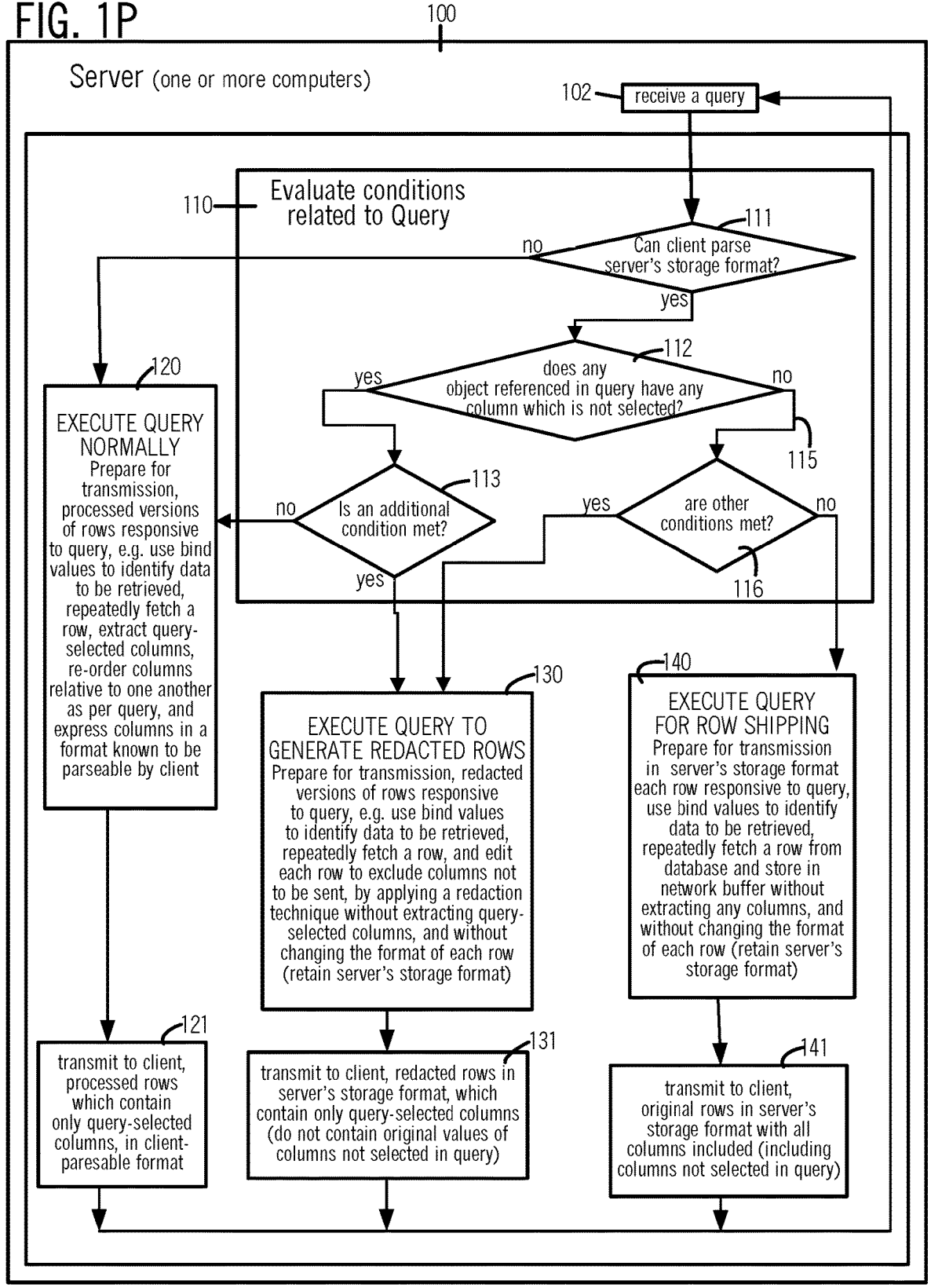

FIG. 1P illustrates, in high-level flow chart, yet another alternative method performed by server 100 (similar to the method of FIG. 1O), including act 116.

Figure 2A:
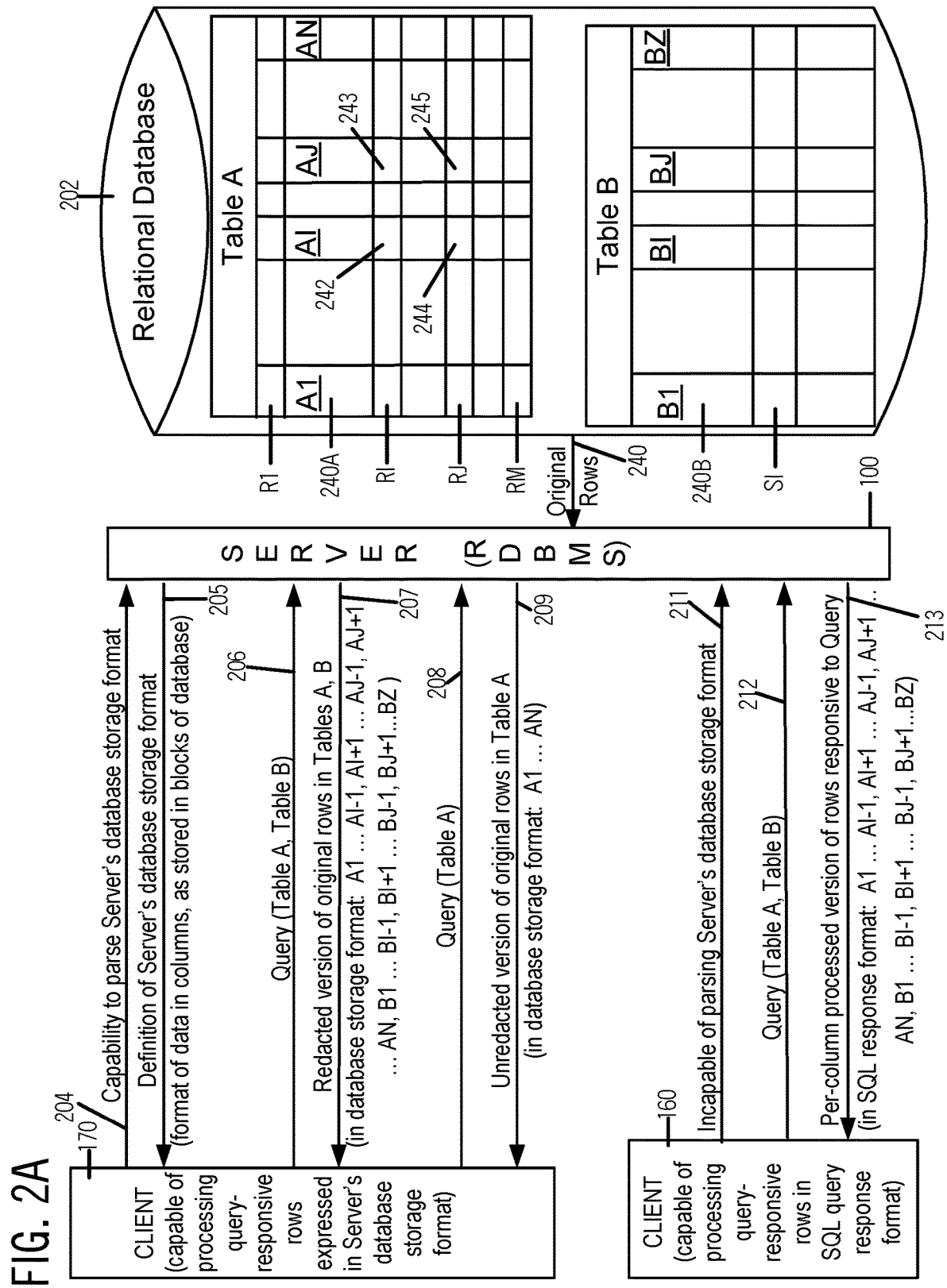

FIG. 2A illustrates, in a high-level data-flow diagram, queries and responses between clients 170, 160 and RDBMS server 100 that is coupled to relational database 202, in some illustrative embodiments.

Figure 2B:
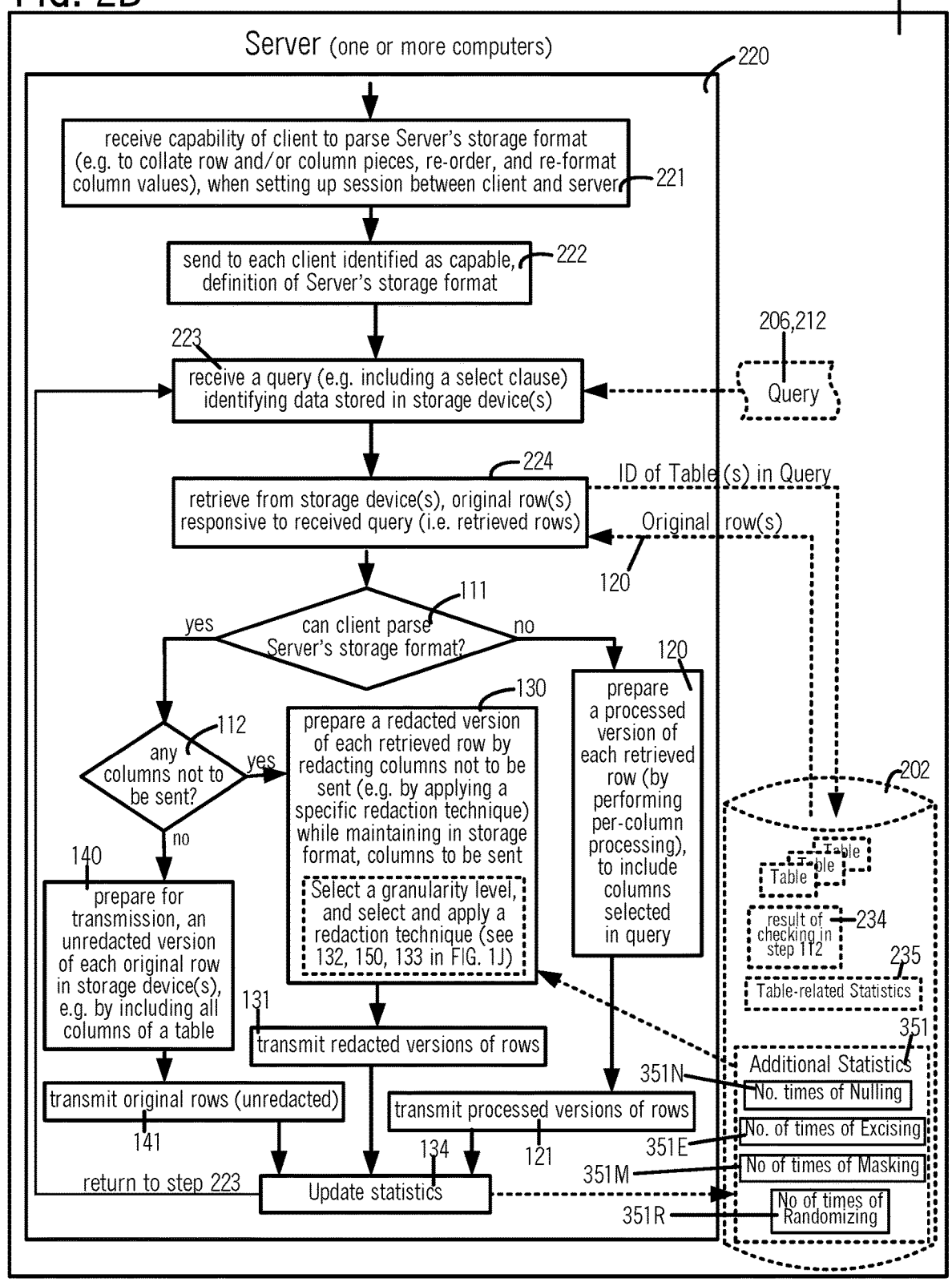
Figure 3A:
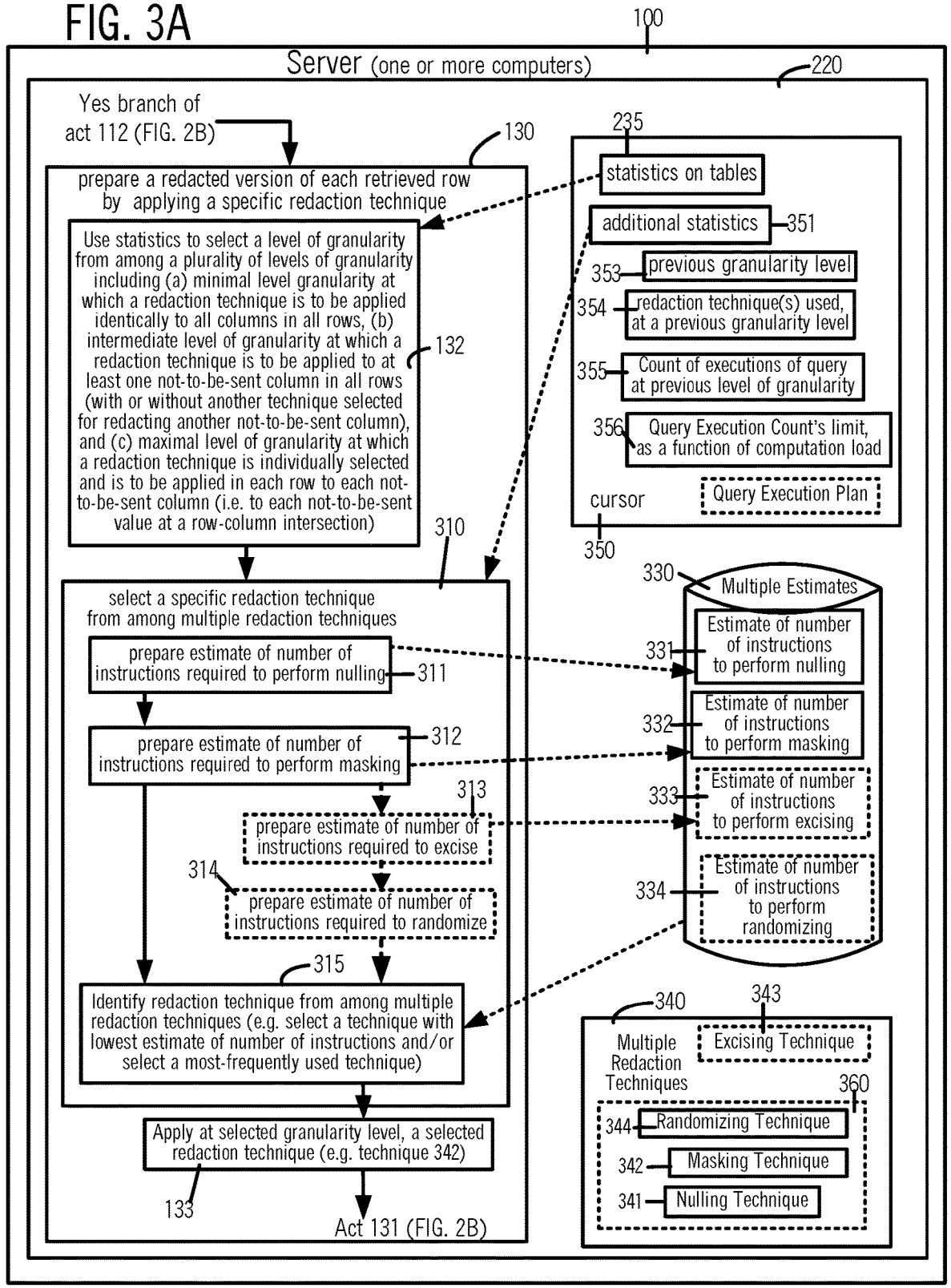

FIG. 2B illustrates, in a high-level flow-chart, acts 221-233 that are performed by a method 220 implemented in server 100 illustrated in FIG. 2A FIG. 3A illustrates, in an intermediate-level flow chart, steps 311-315 of an embodiment of operation 130 (FIG. 1D) including acts 132 and 310 illustrated in FIG. 1K.

FIG. 3B illustrates, in a flow chart similar to FIG. 3A, steps 311C-313C of another embodiment of act 310, wherein each of steps 313A-313C adds to an estimate of server instructions to perform a redaction technique, an estimate of savings from load on the client.

Figure 4A:
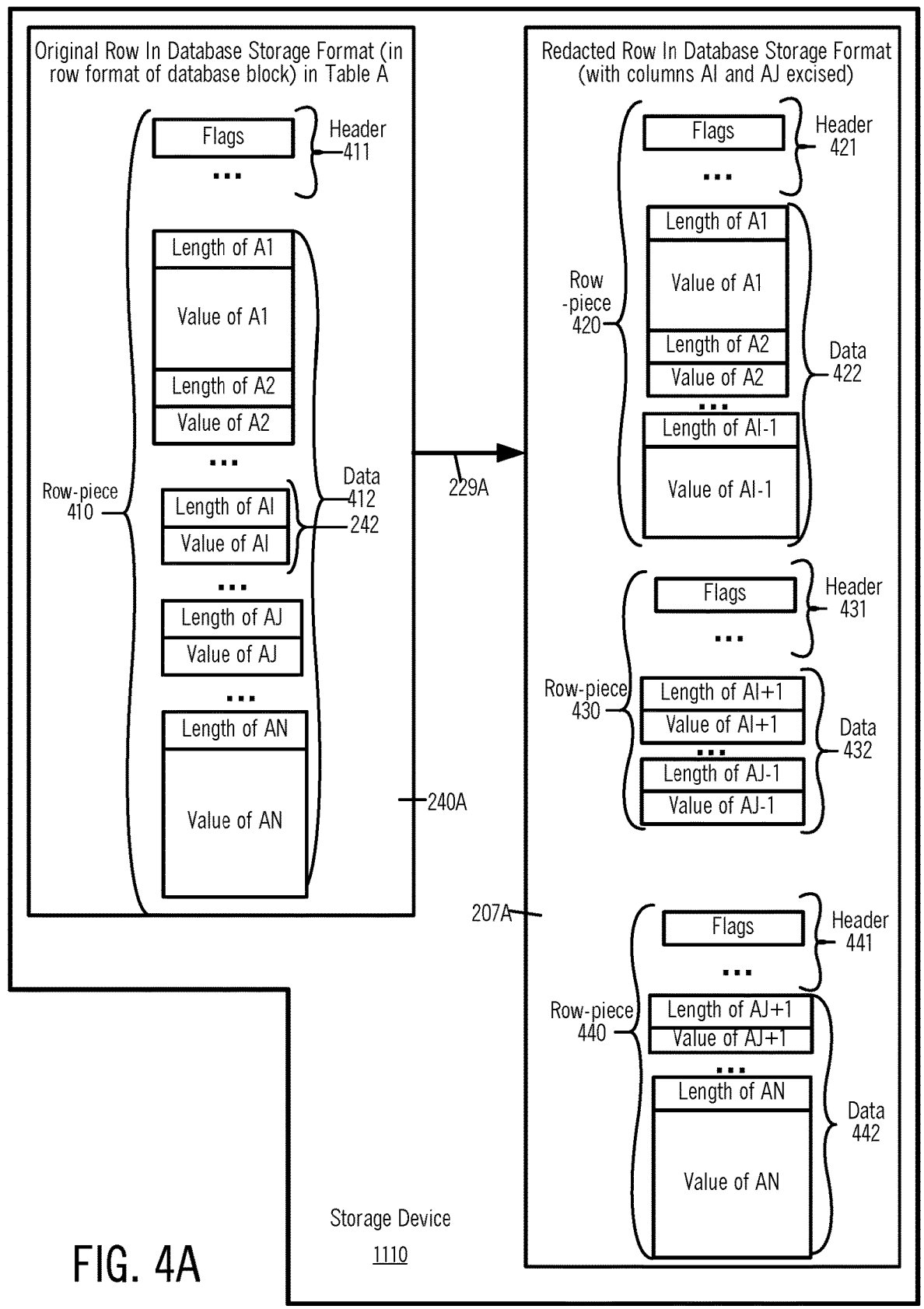
Figure 4B:
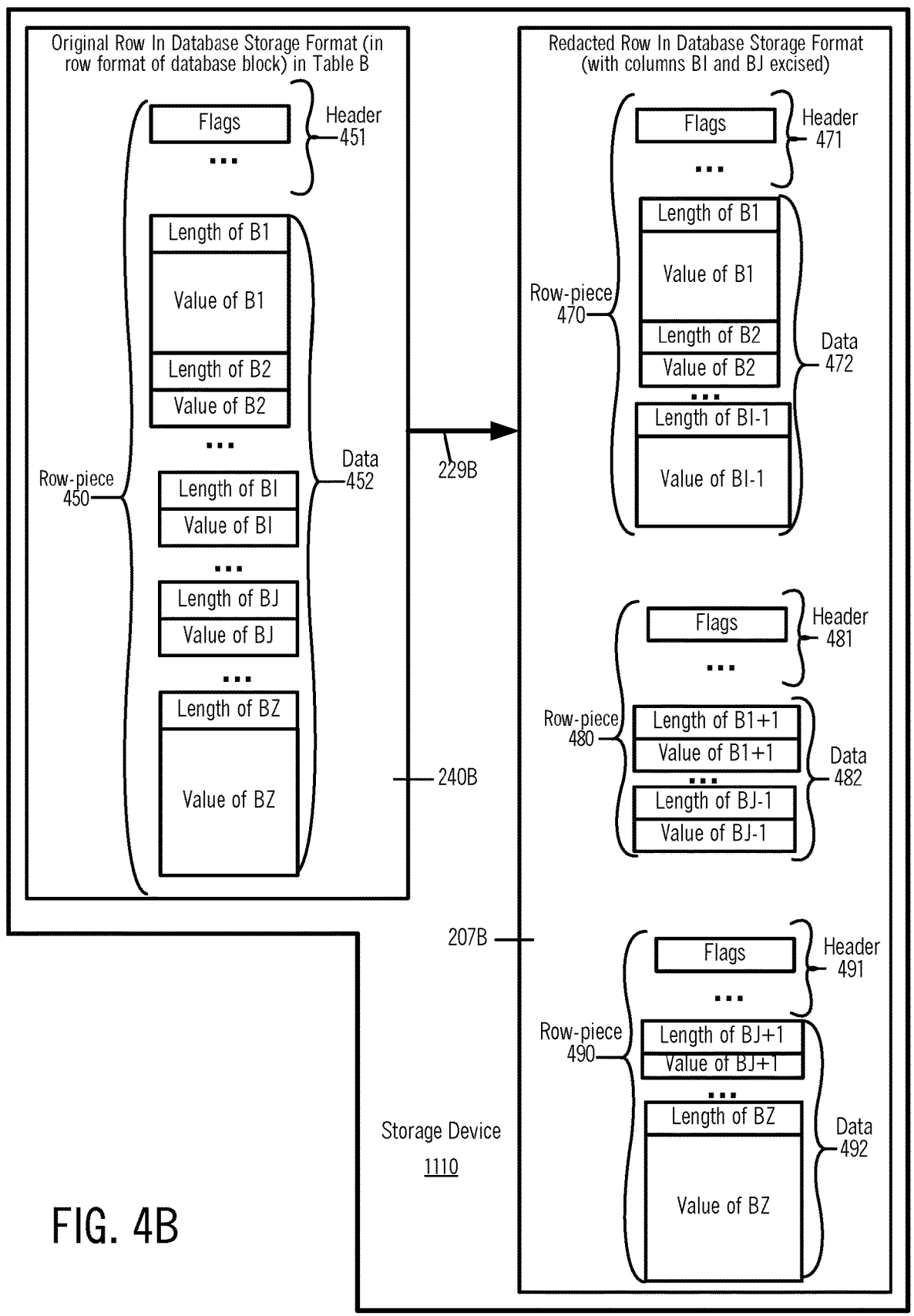

FIGS. 4A and 4B illustrate, in high-level block diagrams, fields in headers and data in row pieces 410 and 450 that respectively constitute original rows 240A and 240B in storage in respective tables A and B of FIG. 2A, and multiple row pieces of corresponding redacted rows 207A and 207B obtained by application of an excising redaction technique, to exclude columns AI and AJ of the original row 240A and columns BI and BJ of the original row 240B.

Figure 4C:
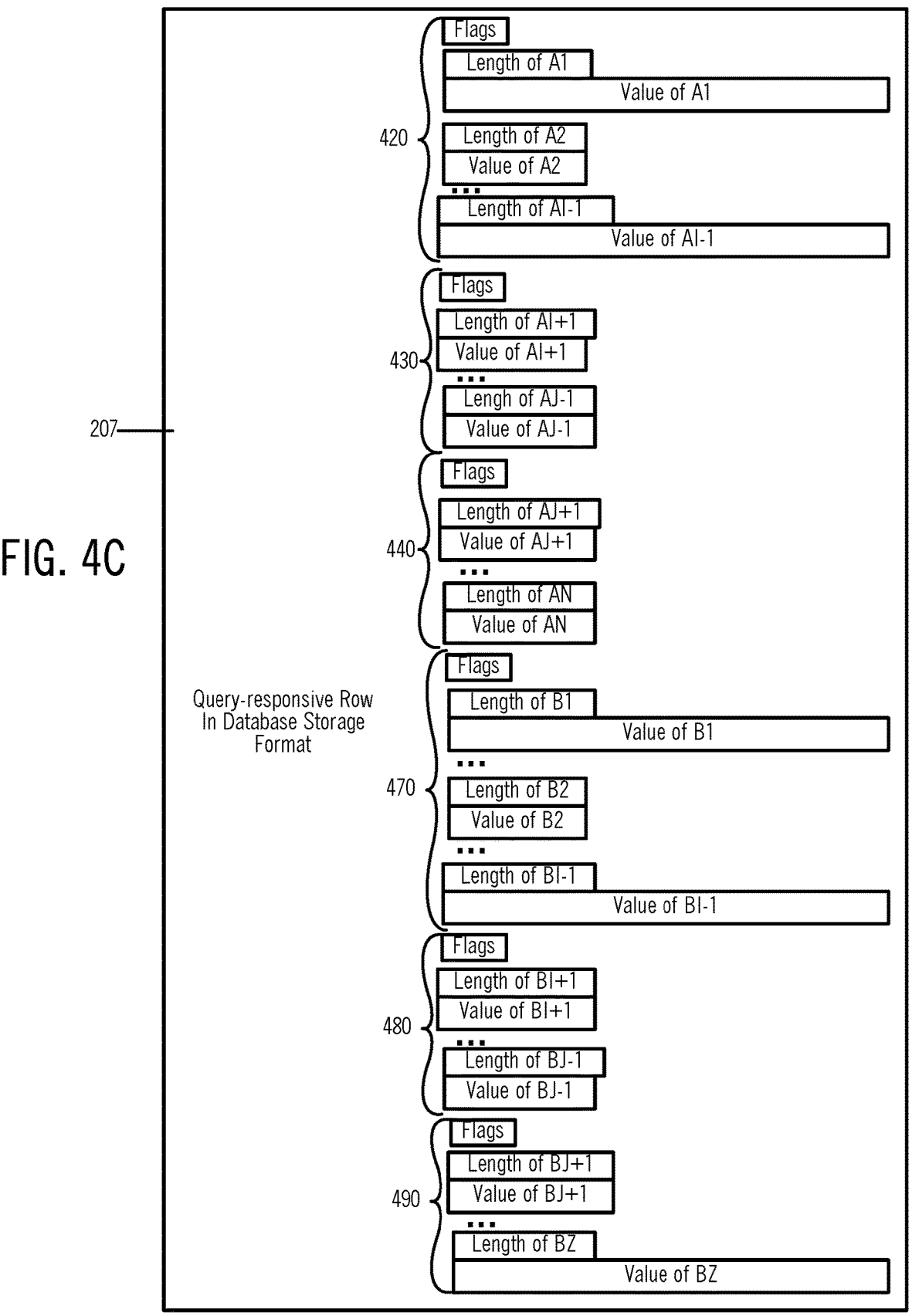

FIG. 4C illustrates, in a high-level block diagram, a redacted version of row 207 in server's database storage format in a result set to be transmitted from server 100 to client 170 (in response to query 206 on tables A and B shown in FIG. 2A).

Figure 4D:
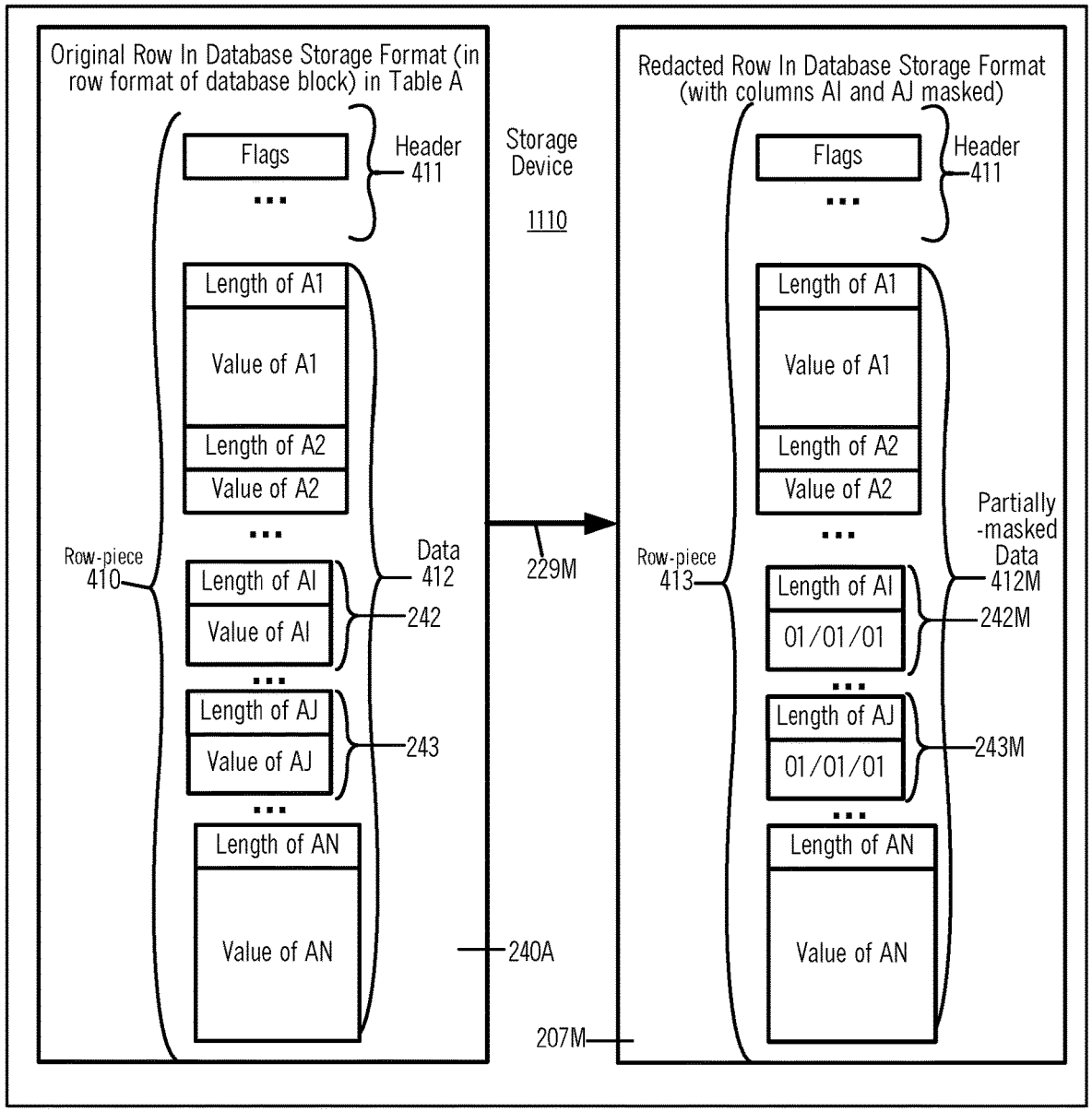
Figure 4E:
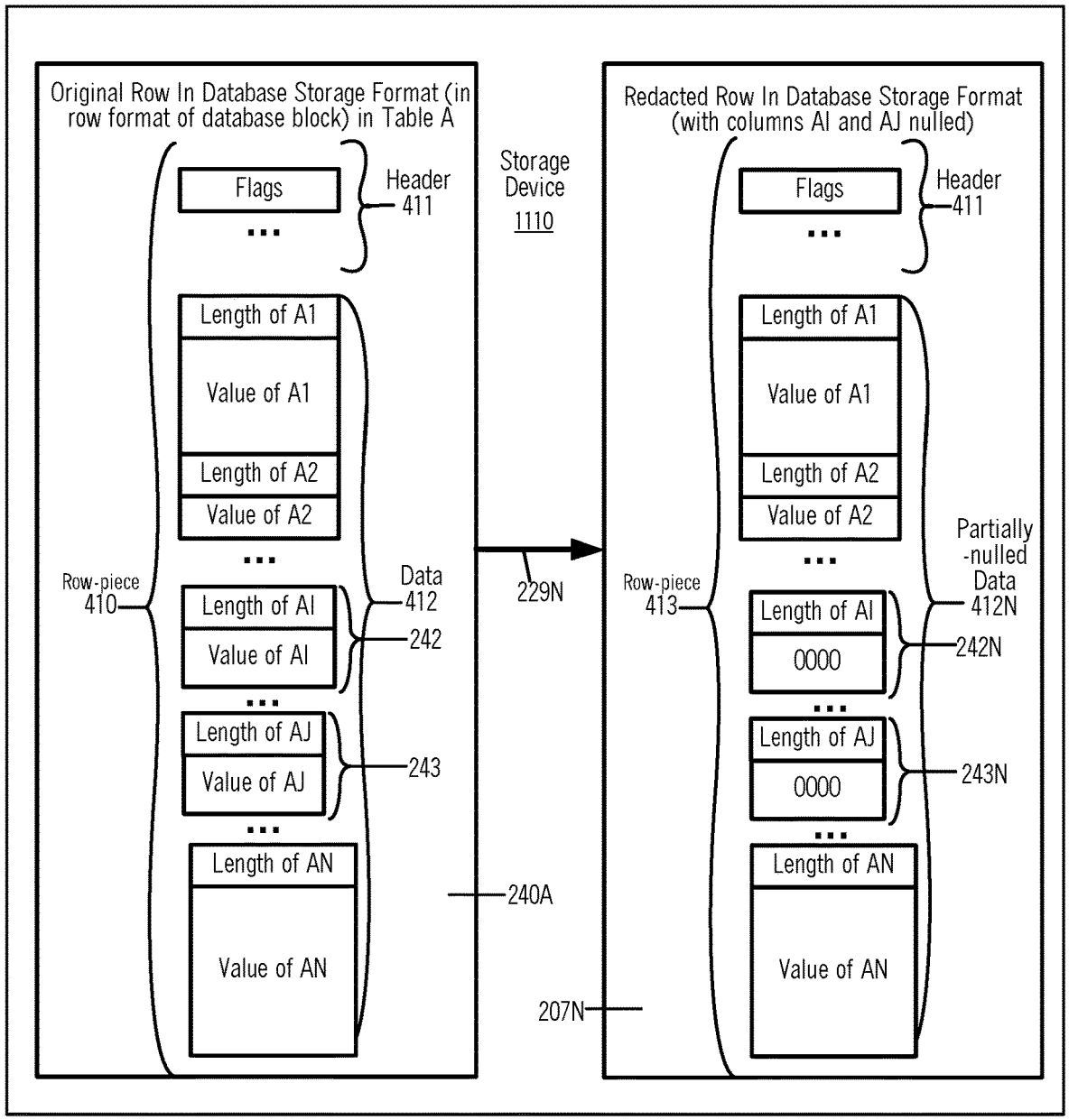
Figure 4F:
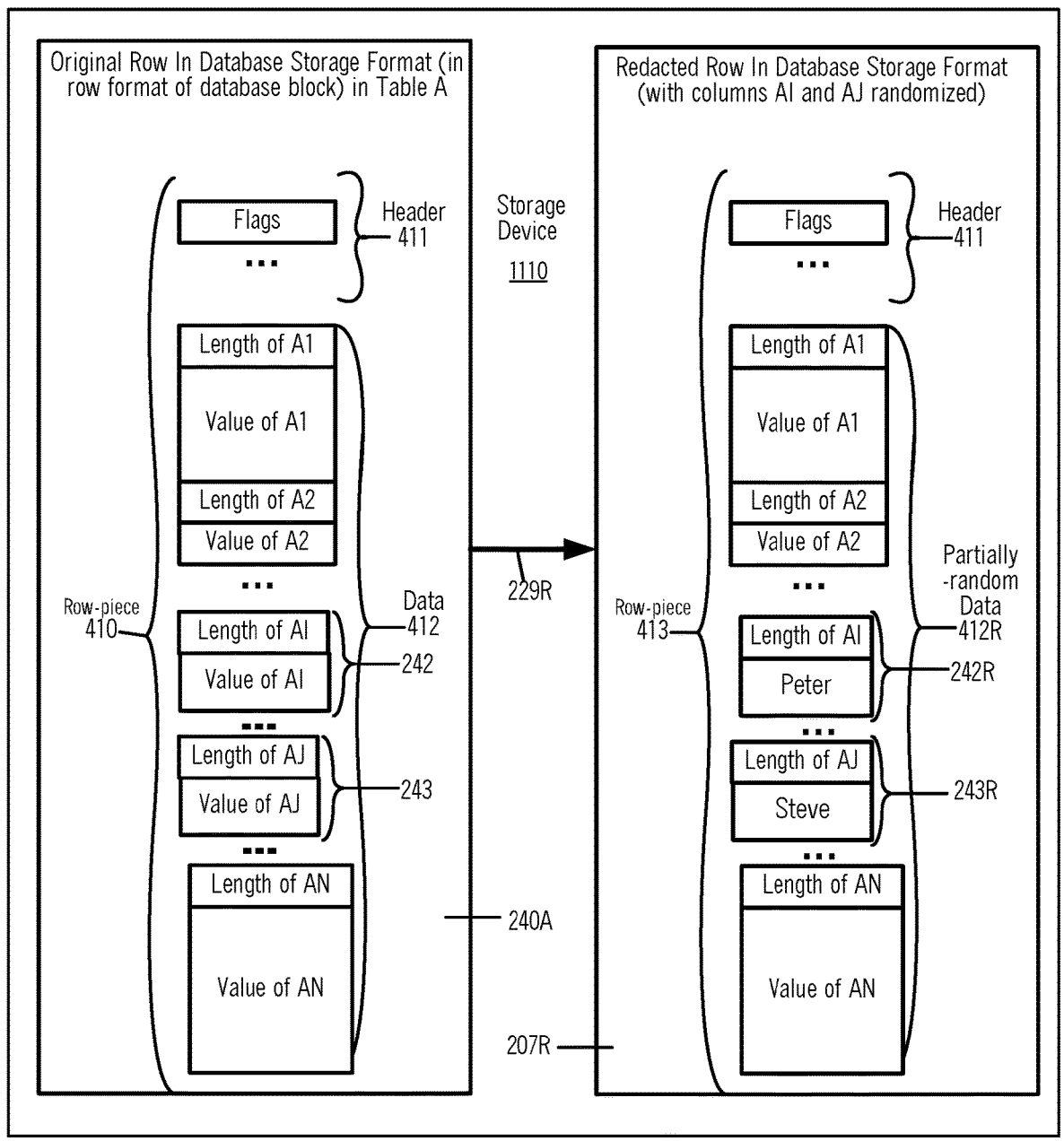

FIGS. 4D, 4E and 4F illustrate, in respective high-level block diagrams, application of three redaction techniques that modify data (instead of excising), namely a masking redaction technique, a nulling redaction technique, and a randomization redaction technique, to original row 240A in storage in table A of FIG. 2A, to obtain corresponding redacted rows 207M, 207N and 207R.

Figure 5A:
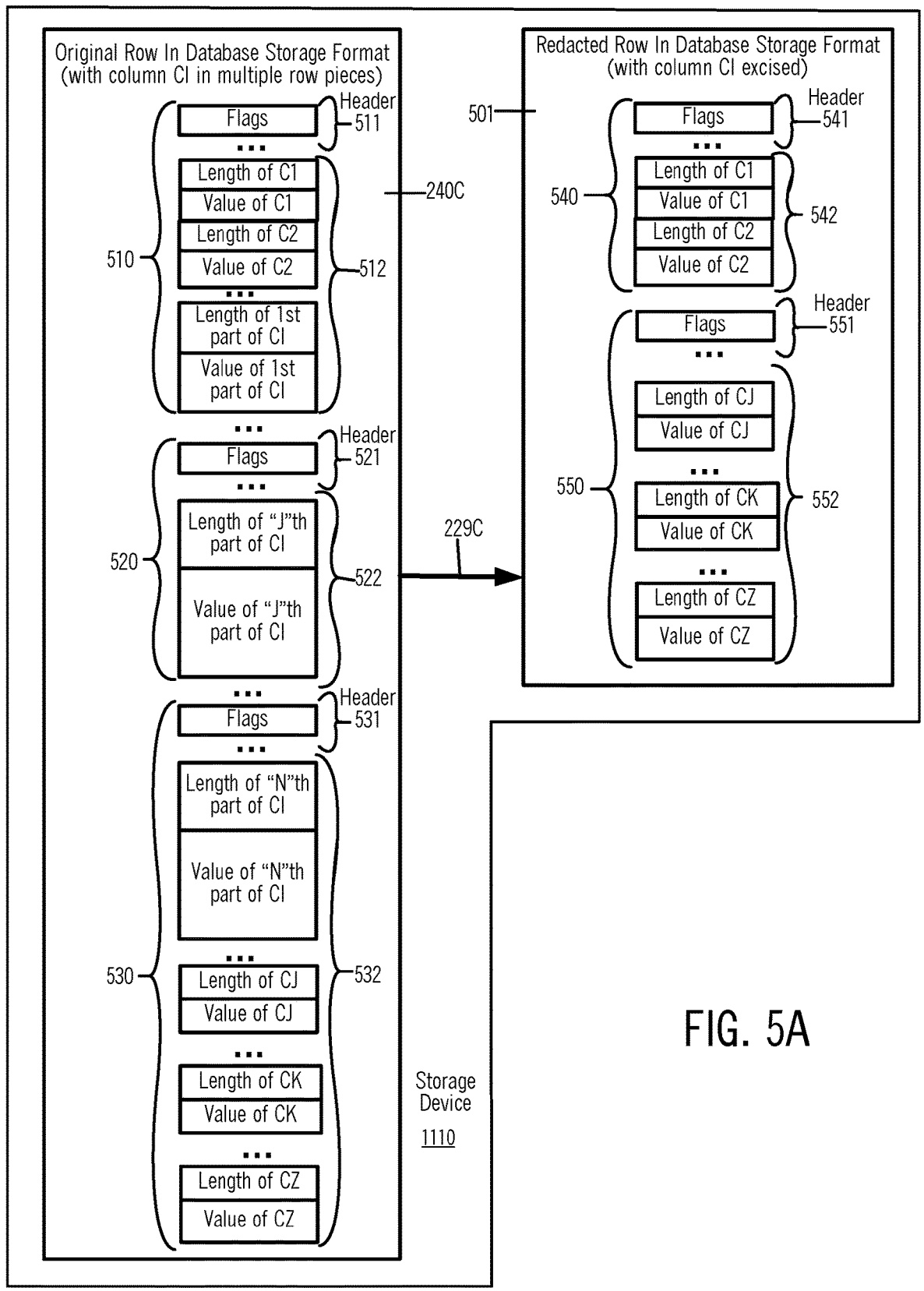

FIG. 5A illustrates original row 240C in storage (in table A of FIG. 2A) in three row pieces 510, 520 and 530, being redacted by application of an excising redaction technique, to excise column CI, thereby to obtain redacted row 501 split into row pieces 540 and 550.

Figure 5B:
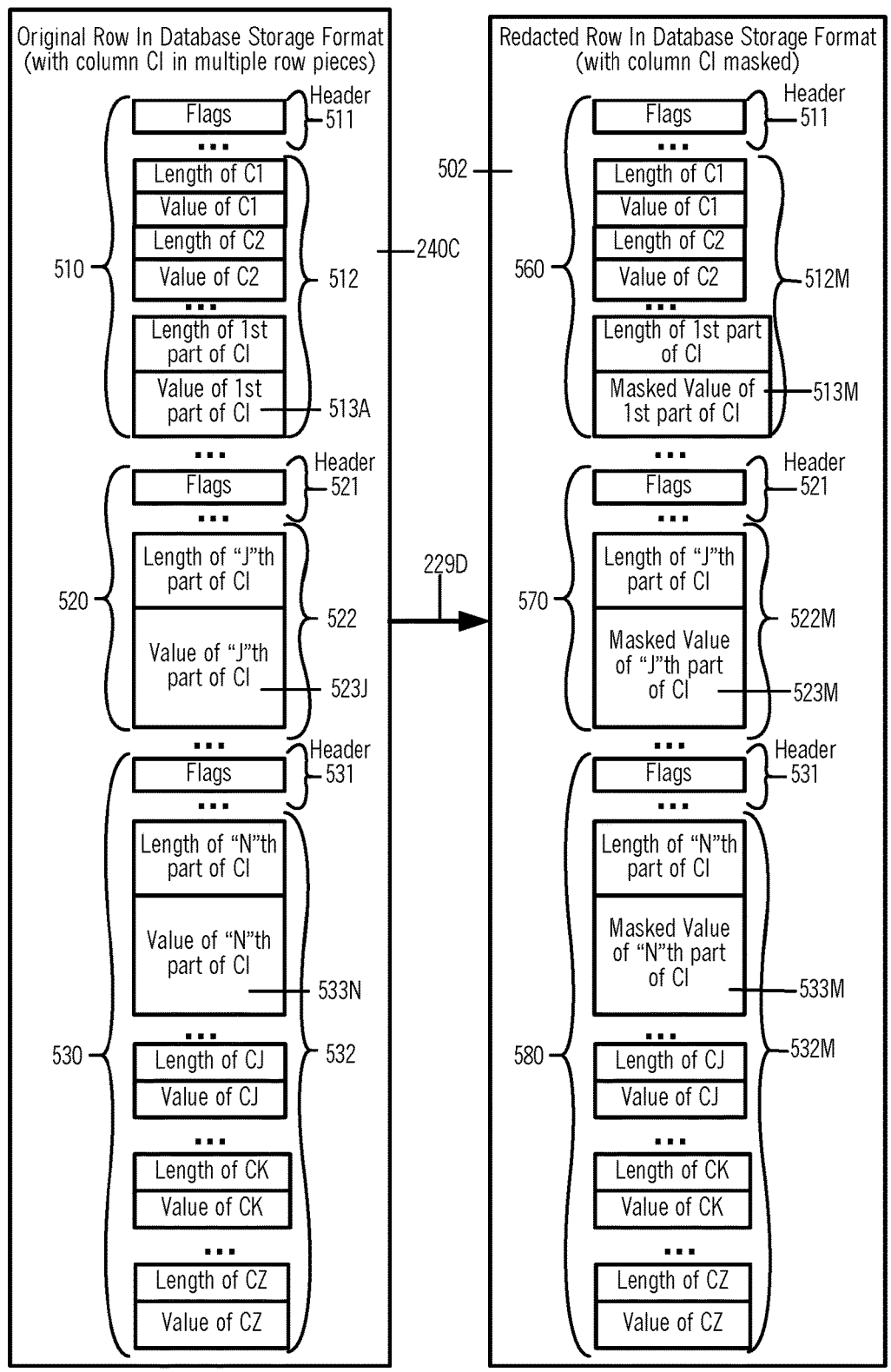

FIG. 5B illustrates original row 240C in storage (in table A of FIG. 2A) in three row pieces 510, 520 and 530, being redacted by application of a masking redaction technique, to mask column CI, thereby to obtain redacted row 502 split into row pieces 510, 520 and 530.

Figure 5C:
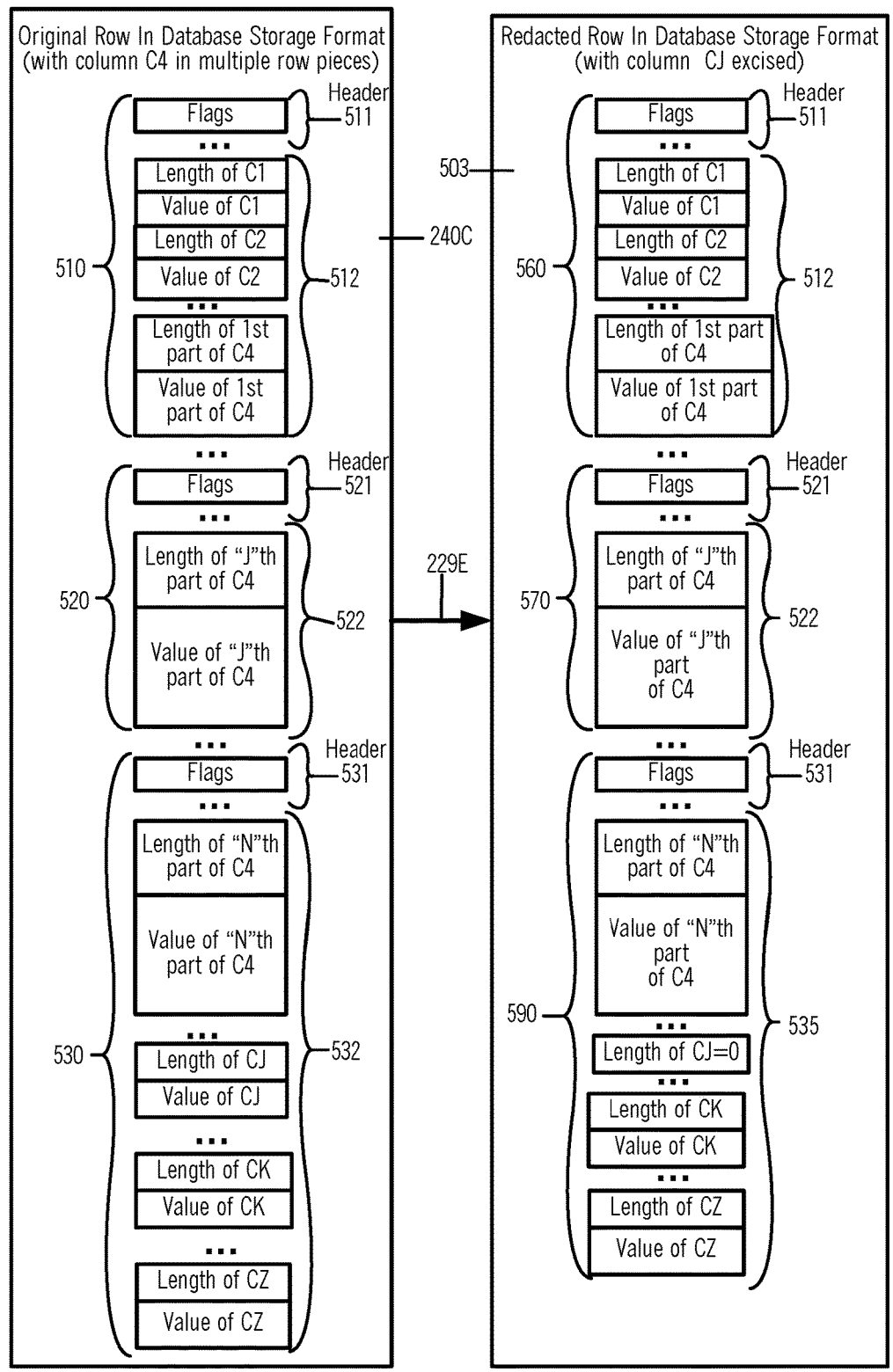

FIG. 5C illustrates original row 240C in storage (in table A of FIG. 2A) in three row pieces 510, 520 and 530, being redacted by application of a combination redaction technique to column CJ in data 532 in row piece 530, by modifying a portion of the data (namely, length of column CJ) and excising another portion of the data (namely, value of column CJ), thereby to obtain data 535 in row piece 590 in redacted row 503.

Figure 5D:
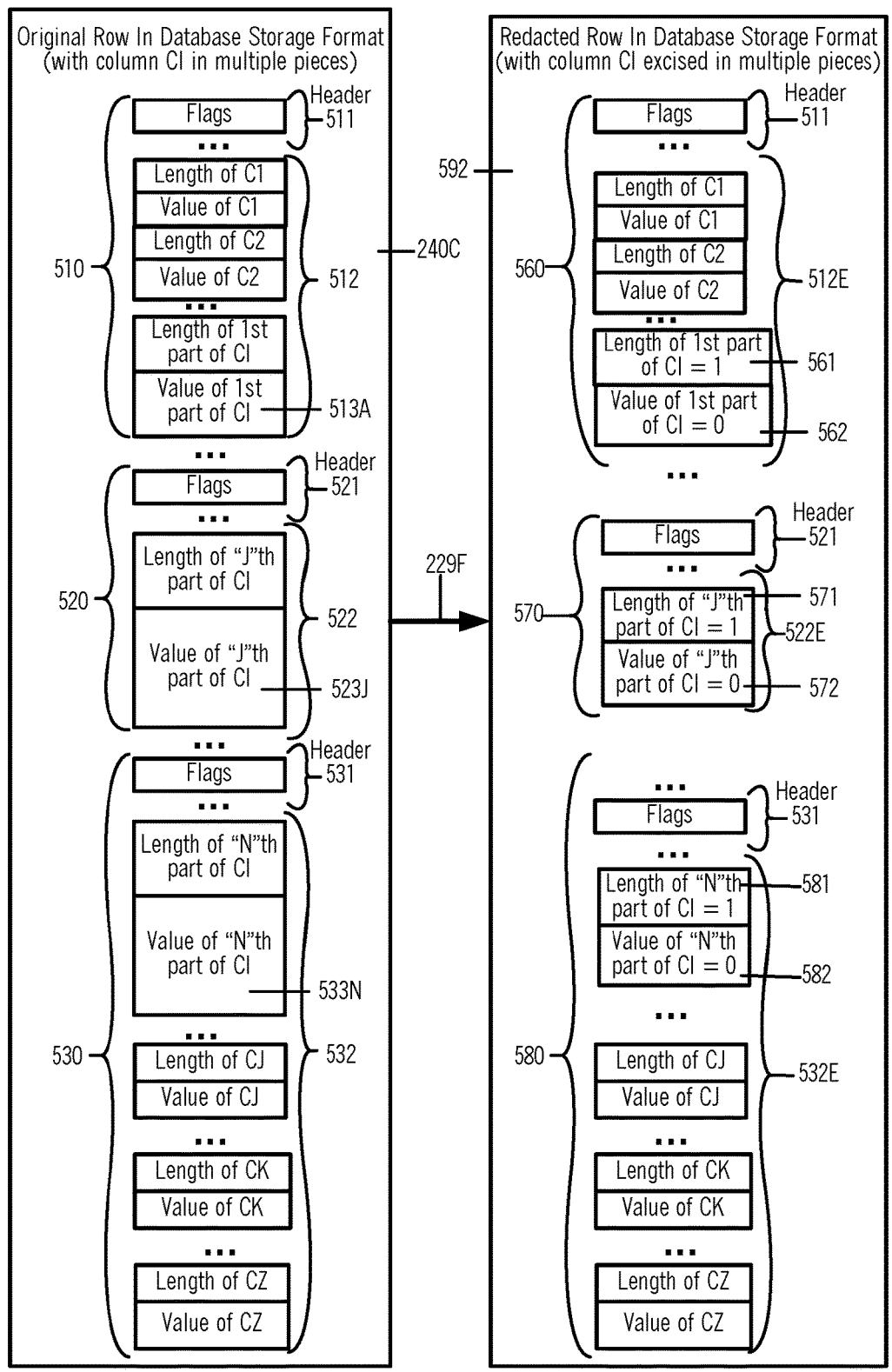

FIG. 5D illustrates original row 240C in storage similar to FIG. 5A redacted by application of an excising redaction technique in an alternative embodiment, to excise column CI from each piece, while retaining the number of row pieces unchanged.

Figure 5E:
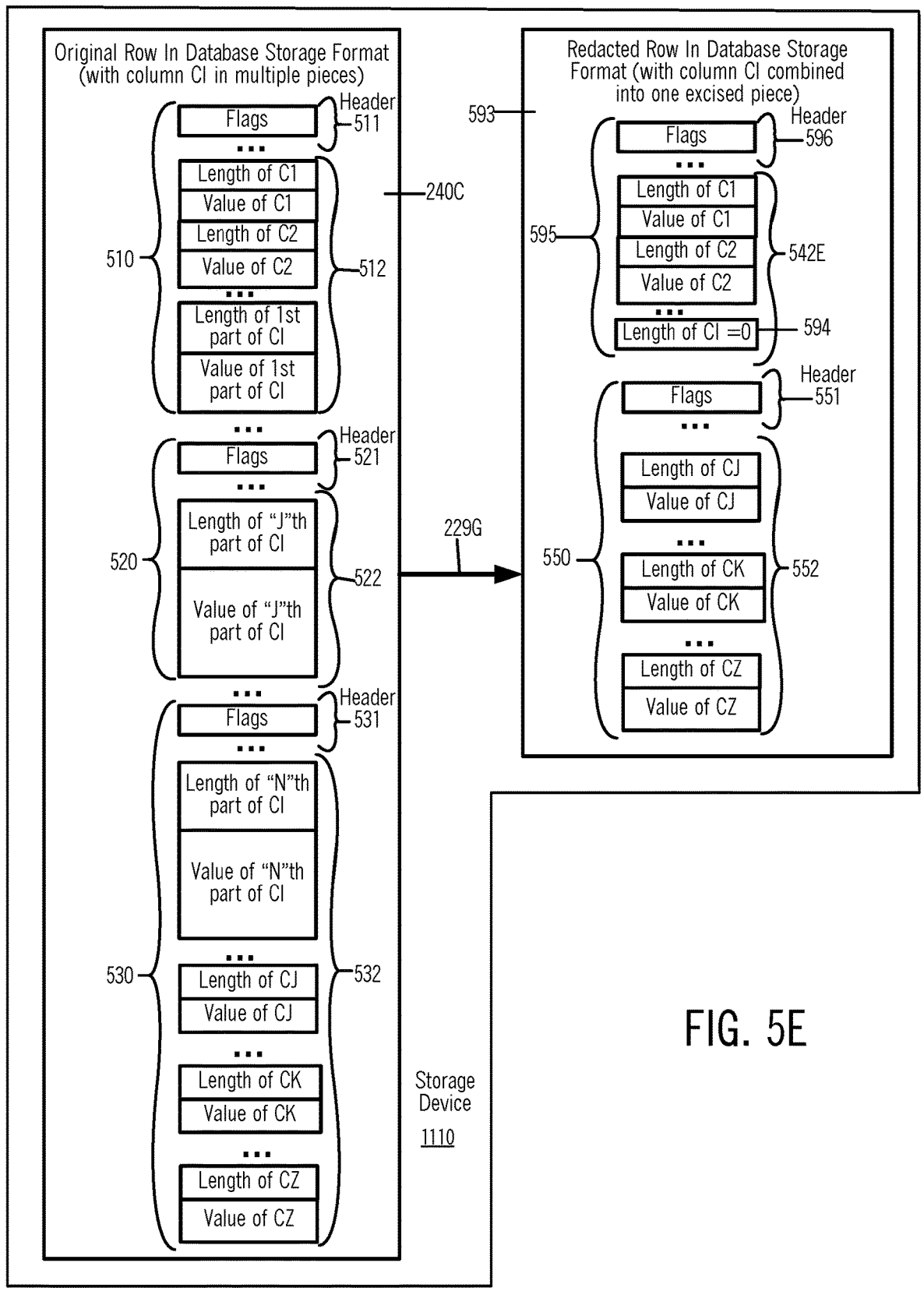

FIG. 5E illustrates original row 240C in storage similar to FIG. 5A redacted by application of an excising redaction technique in another alternative embodiment, to excise column CI in one excised piece that combines multiple pieces in which column CI is present originally.

Figure 6A:
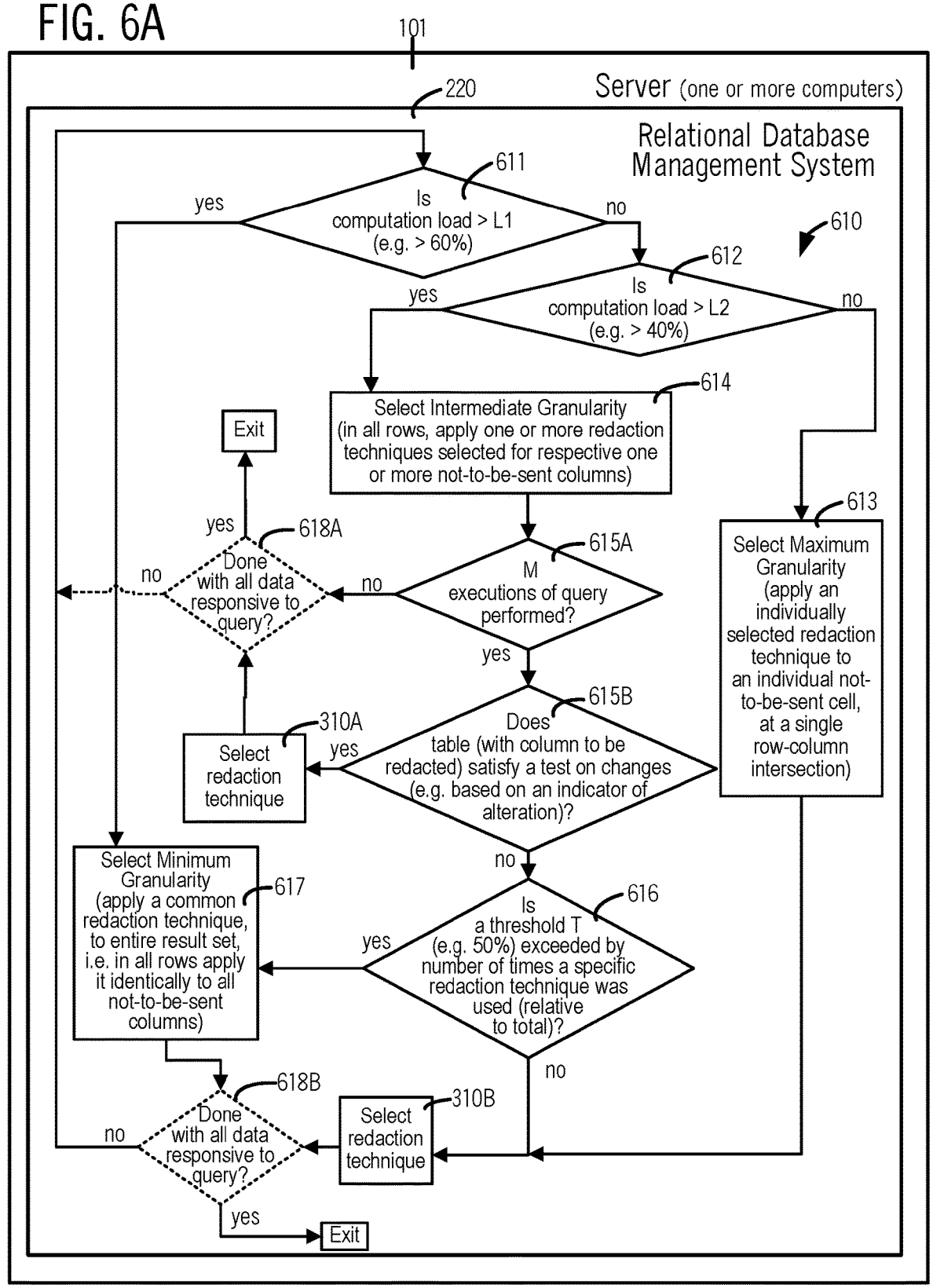

FIG. 6A illustrates, in a high-level flow-chart, a procedure 610 executed by server 100 in performing method 220 to select a granularity level (as per act 132 in FIG. 1K), at which to apply (in act 133 of FIG. 1K) a specific redaction technique selected by acts 152, 154 or 155 in FIG. 1K) that are implemented as described in reference to act 310 of FIG. 3A.

Figure 6B:
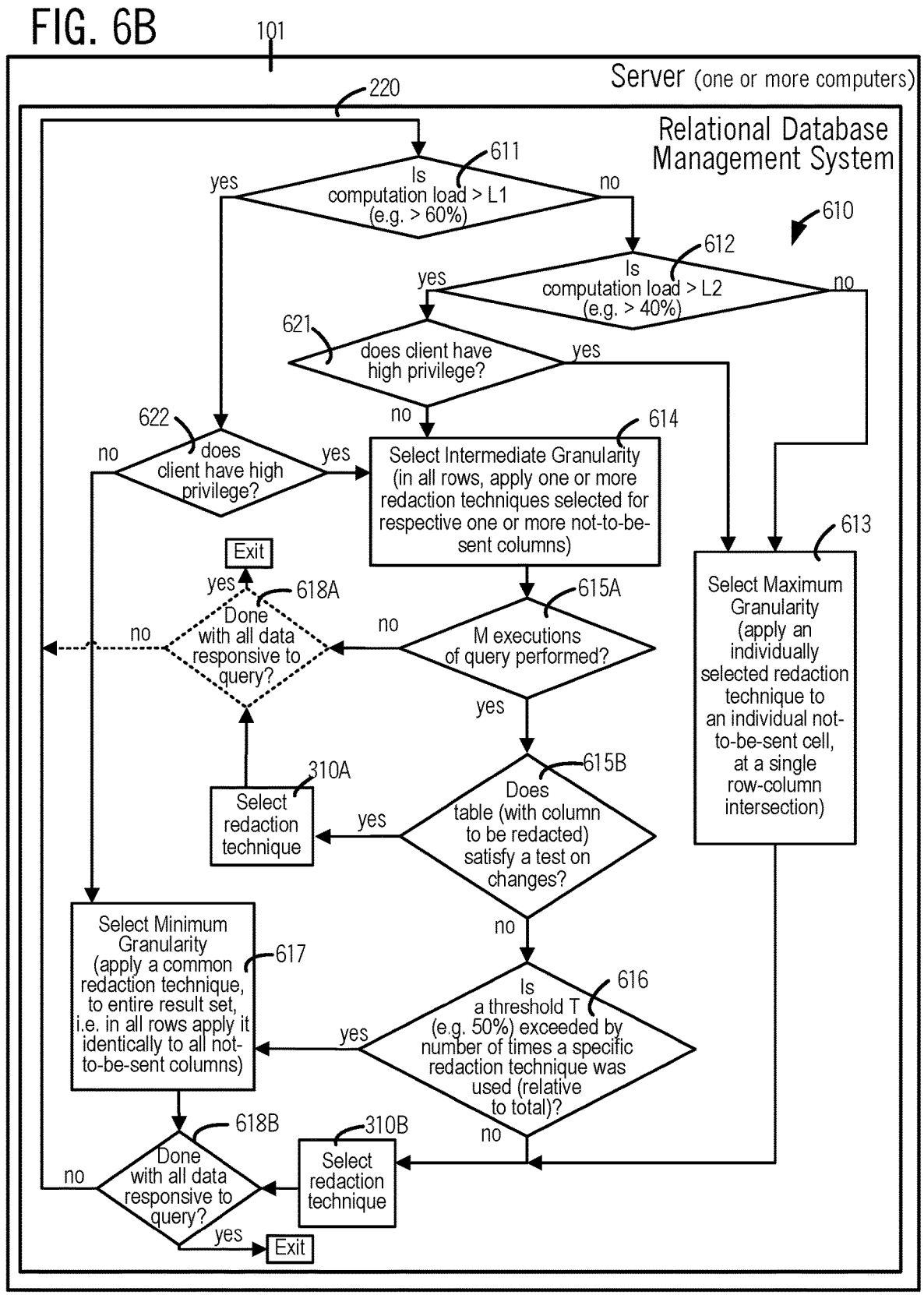
Figure 6C:
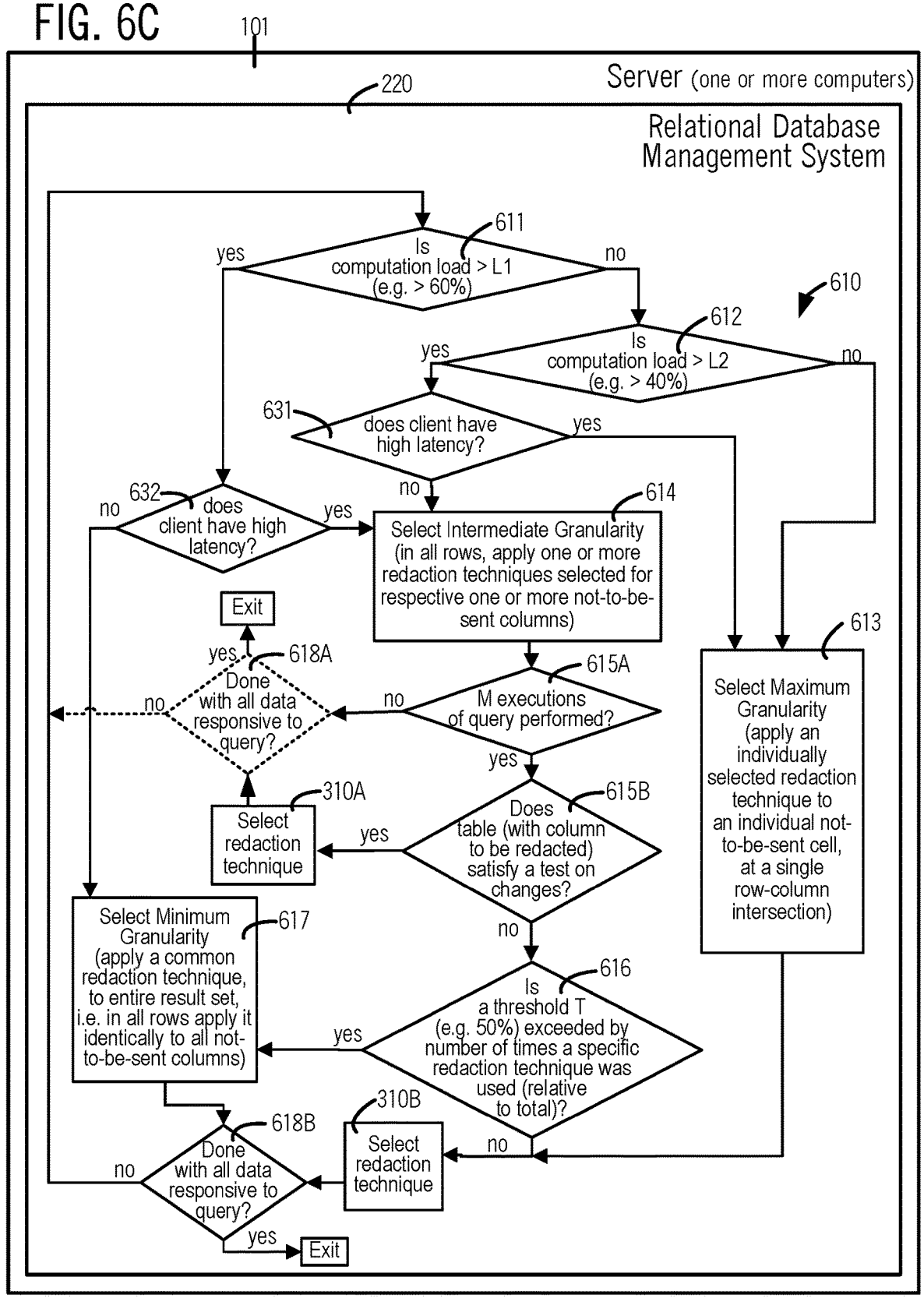

FIGS. 6B and 6C illustrate, in flow charts similar to FIG. 6A, other embodiments of procedure 610 to select granularity levels depending on privilege or latency of a client.

Figure 7A:
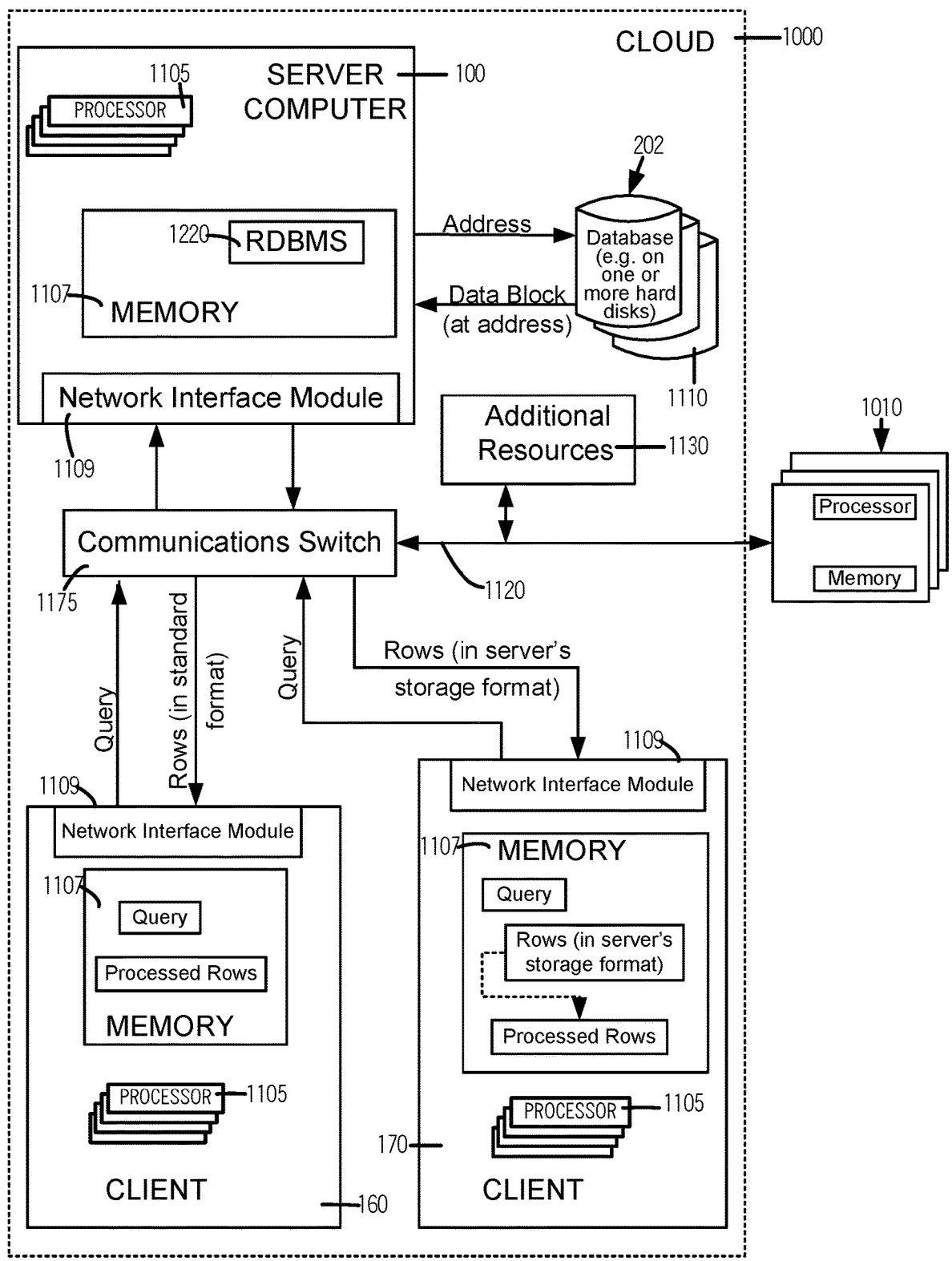
Figure 7B:
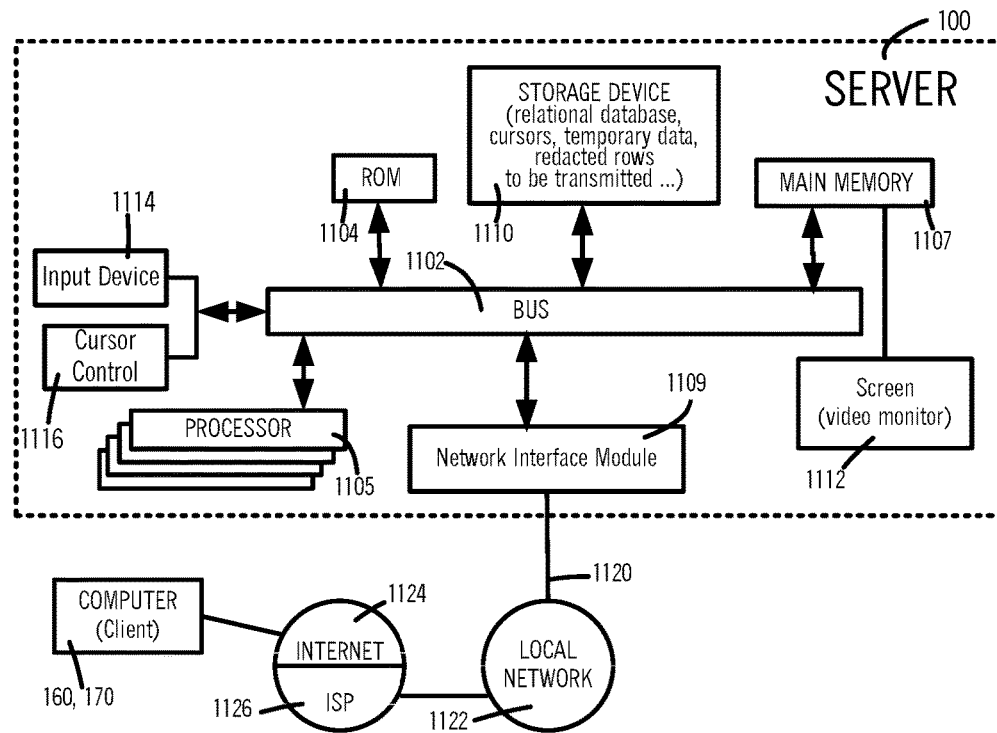
Figure 7C:
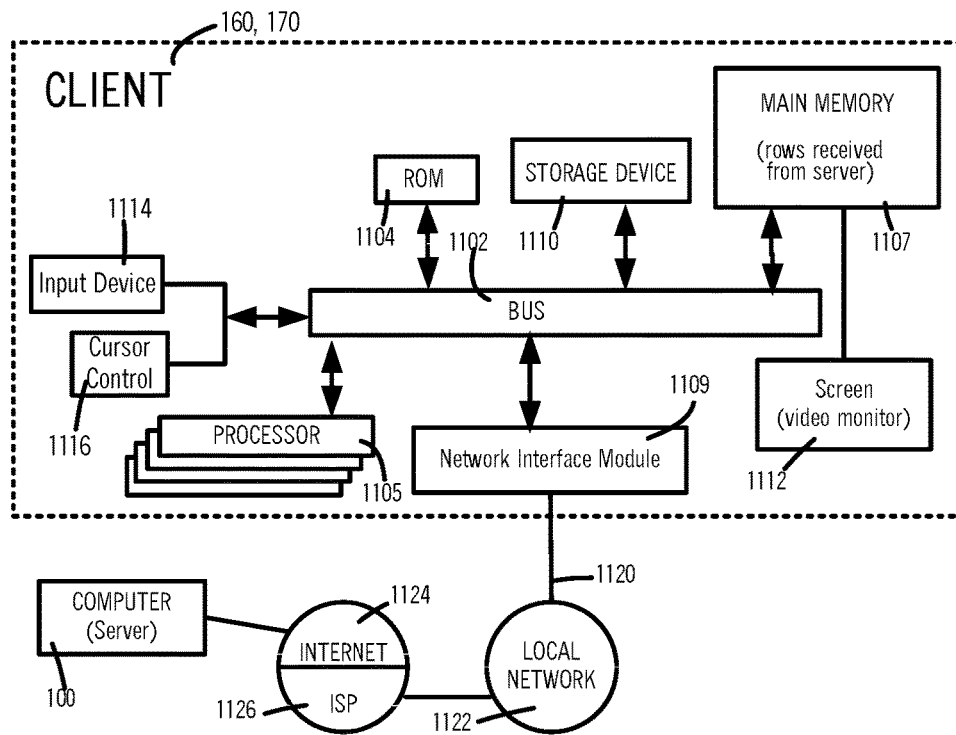

FIGS. 7A-7C illustrates, in block diagrams, hardware portions of server 100 and clients 160, 170 that may be configured to perform one or more acts illustrated in FIGS. 1A-1D, 1K, 2B, 3A, 3B, 6A, 6B and 6C in some embodiments.

DETAILED DESCRIPTION

The current inventors realize that transmission to a client computer, of rows retrieved from a database in response to a query, in a server's database storage format has drawbacks, including, for example, a sending of all columns in a row to the client computer, including columns not selected in the query and/or columns not accessible to the client, which raises a concern about a breach in security, due to transmission of not selected columns and/or not accessible columns. Specifically, when all columns of a row are sent to a client computer, the client computer may receive columns of data that include, e.g., social security number, bank balance and/or mother's maiden name, although this data (also called "values") is not selected in the query, and/or not visible to the client (e.g. due to access control), which poses a security issue. Also, when all columns of a row are sent, there is un-necessary utilization of network bandwidth by sending of one or more columns that a client computer may have not selected and that need to be discarded by the client computer after receipt. If there are few columns that need server processing, the sending of all columns in storage format need not be disabled. Hence, the current inventors believe there is a need for improvement in transfer of data in a server's database storage format, by redacting columns not selected in a query, as described below, which has several benefits such as (a) better security, (b) more query responses can be sent in storage format (c) reduces un-necessary utilization of network bandwidth and d) less server CPU utilization. For example, if a query on a table with 100 columns does not select column 100, as it a sensitive column, with the remaining columns being selected, and if the result-set has 10,000 rows, then server 100 (described below) may avoid the need to extract each of the (100*10,000)=1,000,000 column values into a buffer and send these buffers on the network to client computer. Instead, all row pieces of the rows may be sent by server 100 as-is (in database storage format) on the network, saving a lot of server CPU processing power. In this example, row pieces that contain column 100 may be redacted if necessary. A client computer that receives such row pieces uses its CPU processing power, to extract columns from the row pieces it receives from server 100 (described below).

In several embodiments, a database management system (DBMS) may include one or more computers (hereinafter "server") 100 that store data in a database 202 (FIG. 7A), on one or more storage devices 1110 (FIG. 7B). Server 100 may be programmed by software in memory 1107 (FIG. 7B), to perform a method of the type illustrated in FIGS. 1A-1C described below. Storage devices 1110 (FIG. 7B) may include one or more hard disks or other such non-volatile memory. In such embodiments, in act 11, server 100 (FIG. 1A) receives a query (such as a SQL expression) from a client computer (such as one of computers 160, 170 shown in FIG. 7B) that reference one or more objects stored in database 202. Thereafter, server 100 compiles and executes the received query.

During query compilation, server 100 parses the query and generates an execution plan (not shown). The execution plan may include one or more operators, used by server 100 to execute the query. At the time of query compilation, and prior to execution of the query, in act 12 (FIG. 1A), server 100 checks one or more conditions (called "compile-time conditions"), to determine how to send back to the client computer (also called simply "client"), one or more rows retrieved from database 202 as being responsive to the query. More specifically, the compile-time conditions are used by server 100 to determine whether columns of each row should be extracted into memory 1110 and expressed in a standard format, such as a list of values of the columns separated from one another by commas.

In some embodiments, compile-time conditions are based on one or more attributes that do not change during query execution, such as attributes of the query and/or attributes of the client. A query's attributes which may be checked by a compile-time condition in act 12 (FIG. 1A), include, for example, whether the query requires a complex join, as indicated by a join operator on 3 or more tables. Another compile-time condition may check if the query's select clause requires functions to be evaluated on two or more columns.

A compile-time condition may include threshold T on number of columns that need server processing. For example if a SQL query on table T with 10 columns is "select col1, col2, . . . , col7+5, col8, col9, col10 from T", only one column col7 need server processing. This compile-time condition makes an assessment if first operation is less expensive on server compared to the second or third operation. If T is 20%, the above query responses can be transmitted using second operation. If T=5%, then above query responses exceed the threshold and they would be transmitted using first operation.

Other query attributes that may be checked by a compile-time condition in act 12 are: whether too few columns (e.g. as determined by comparison to a limit thereon) are selected in the query and/or whether a percentage of columns selected relative to total number of columns in tables (or other such objects) referenced in the query is too low (e.g. as determined by comparison to another limit thereon). An attribute of the client which may be checked by a run-time condition in act 32 is whether or not the client has an ability to parse a database storage format in which server 100 stores data in database 202. In some embodiments, such a database storage format may be proprietary to a vendor of database software that implements a DBMS, such as Oracle 11gR2 available from Oracle Corporation of Redwood Shores, Calif. Specific details of the database storage format used by server 100 to store data in database 202 are not a critical aspect of the invention, and these details are different in different embodiments. The attributes used in compile-time conditions which are checked by server 100 in act 13 (as noted above) do not change during query execution (described below).

When any compile-time condition is found to be not satisfied (e.g. in act 13), a database administrator (DBA) may configure server 100 to execute the query in stage 20 (FIG. 1A), which disables row format processing for this query, as described below for stage 30. Specifically, in stage 20, server 100 retrieves from database 202, a set of one or more rows responsive to the query, e.g. by using bind values to identify the rows to be retrieved. In some embodiments, the set of one or more rows retrieved in act 21 (also called "retrieved set"), may be a subset of an entire result set of query-responsive rows, and the number of rows in the retrieved set may be determined, e.g. by a fetch request from the client. On completion of act 21, the retrieved set of one or more rows exist in the database storage format (which is used by server 100 to store data in database 202, as noted above). Thereafter, in operation 22, server 100 extracts into memory, from the retrieved set of one or more rows in the database storage format, one or more columns selected in the query and prepares processed versions of the one or more rows in the standard format (such as comma separated values). Next, in act 23, server 100 transmits to the client computer, these processed versions of the one or more rows. In some embodiments of act 23, server 100 may optionally notify the client computer that the rows being transmitted are in the standard format (e.g. when the client has functionality to process rows in both the database storage format and also in the standard format, but the notification may be omitted when the client can receive rows only in the standard format). In act 24, if all rows responsive to the query have not been retrieved and sent, server 100 returns to act 21 (described above), via branch 25. In executing branch 25, server 100 may optionally wait for a fetch request (in embodiments that support fetch requests), from the client from which the query was received in act 11. In act 24, if server 100 finds that all rows responsive to the query have been transmitted, stage 20 ends, and in some embodiments server 100 may perform an act 41 to transmit to the client computer a message indicating an end of the result set (of rows responsive to the query).

Query execution in stage 20 (as described in the preceding paragraph above) is performed without checking additional conditions (called "run-time conditions"). The run-time conditions are checked by server 100 in a different query execution stage 30 (described below), when compile-time conditions are found to be satisfied. Specifically, in stage 30, server 100 checks a number of run-time conditions (see act 32 in FIG. 1A), to determine how to send to the client, a retrieved set of one or more rows responsive to the query (which, as noted above, may be a subset of the entire result set with the number of rows therein being specified in, e.g. a fetch request from the client). Hence, the checking of run-time conditions in act 32 (FIG. 1A) may be performed repeatedly in stage 30, to determine how to send to the client, multiple retrieved sets of one or more rows responsive to the query. In one embodiment, run-time conditions may be evaluated on every fetch request. In another embodiment, run-time conditions may be evaluated on the initial fetch or after a certain time duration or after certain number of client fetch requests.

In some embodiments, the run-time conditions checked in act 32 (FIG. 1A) may be of multiple types, such as (a) first run-time conditions used by server 100 to decide if one or more rows in the database storage format in the retrieved set should be processed into the standard format, and (b) second run-time conditions used by server 100 to decide if any column in the one or more rows in the retrieved set should not be sent to the client, for any reason. An example of a first run-time condition used in act 32 checks whether a fetch request from a client identifies a data type of a specific column to be returned (e.g. the data type LOB) as being different from the data type of the specific column as stored in the database (e.g. the data type varchar), and whether conversion between these two data types uses an operator supported in server 100 (e.g. to convert varchar to LOB) and this same operator is not available in the client (as determined based on the to-be-returned data type being explicitly identified in the fetch request). As discussed below, when a first run-time condition is met, server 100 performs operation 33 (FIG. 1A), because the client does not have the functionality needed, to prepare processed rows in the standard format, based on one or more rows in the retrieved set in the database storage format. Operation 33 may be performed in a manner similar or identical to operation 22 (described above).

An example of a second run-time condition used in act 32 (FIG. 1A) checks whether column level security, or a virtual private database (VPD) policy associated with any column, or any other such access control policy (e.g. specified in an ACL), prevents access of a column by the client that issued the query. Another example of a second run-time condition used in act 32 checks whether a ratio of a size (in bytes) of columns not selected in the query relative to the total size of all columns exceeds a limit thereon, e.g. greater than or equal to 20%. As discussed below, when at least one of these second run-time conditions is met, the one or more rows should not be transmitted to the client, and hence server 100 does not perform operation 35 (described below), and instead performs one of operations 33 or 34 (also described below). The size of columns can be calculated during runtime, based on rows in a retrieved set (or alternatively as per table definition, if size is used in a compile-time condition).

Another example of a first run-time condition used in act 32 checks whether not sending a column in one or more rows in the retrieved set in the database storage format (by performing operation 34) requires more processing power (e.g. based on an estimate of the number of instructions) relative to extracting and processing the columns (by performing operation 33). In some embodiments, the just-described first run-time condition may be checked after the above-described second run-time condition in act 32 as illustrated by steps 61, 62 and 63 in FIG. 1B (described below), although in performing act 32 (FIG. 1A), server 100 may combine checking of such run-time conditions in any sequence relative to one another, in any logical combination of ANDs and ORs.

Depending on the embodiment, the run-time conditions checked in act 32 may use any parameter available in server 100 which varies during query execution, e.g. based on a fetch request and/or based on size of a column in a row in one or more rows in a retrieved set. Moreover, one or more run-time conditions may be checked in act 32 based on statistics of the one or more rows in a retrieved set in a current iteration (as per branch 38 described below, for a current fetch request), or alternatively based on one or more previously retrieved set(s) of the same query for a previously-received fetch request. An example of the parameter could be the granularity level used for modification or redaction of the previous batch of rows or previous execution of that SQL statement. Another example of the parameter is minimum ratio used in threshold comparison, of total size of columns not selected vs total size of columns, for server to send rows in storage format.

During query execution in stage 30, a retrieved set of one or more rows may be obtained by server 100 performing an act 31 before or after checking of run-time conditions in act 32. Act 31 may use bind values to identify the rows to be retrieved (as noted above in reference to act 21). Also as noted above, on retrieval from database 202 in act 31, the one or more rows in the retrieved set exist in the database storage format. Although act 31 is shown before act 32 in FIG. 1A, in alternative embodiments these two acts may be performed in the opposite sequence in stage 30. Specifically, act 32 may be performed before act 31 in certain embodiments wherein act 32 is designed to not use any information from a set of rows retrieved in a current iteration (e.g. by performing act 32 on a set of rows retrieved in a previous iteration, and/or based on information received in a fetch request from the client).

In some embodiments, in query execution stage 30, depending on the results of checking run-time conditions in act 32, server 100 performs one of operations 33, 34 or 35 (FIG. 1A). Specifically, when one or more first run-time conditions are satisfied, server 100 performs operation 33 (in a manner similar or identical to operation 22 described above), by extracting into memory 1107 (FIG. 7B) one or more columns selected in the query, from the one or more rows retrieved in act 31 (described above) which exist in the database storage format, and server 100 prepares processed versions of these one or more rows in the standard format. When the one or more first run-time conditions are not satisfied, server 100 performs either (a) operation 34 (described next) when at least one of the second run-time conditions is satisfied, or (b) operation 35 (described below) when the second-runtime conditions are not satisfied.

In operation 34 (FIG. 1A), server 100 omits from or modifies in, the one or more rows of the retrieved set in the database storage format, each column that is determined by the second run-time conditions, as not to be sent to the client for any reason. The omitting or the modifying may be performed by server 100 in some embodiments, by applying a redaction technique at a granularity level. The granularity level may be selected from among multiple levels of granularity, based on results of evaluation of one or more additional conditions, e.g. as described below in reference to FIGS. 6A-6C. The redaction technique may be selected from among multiple redaction techniques, for use at the current level of granularity, as described below in reference to FIGS. 3A and 3B.

In operation 35, server 100 retains unchanged, the one or more rows of the retrieved set, in the database storage format (also called "storage format"). On completion of any of operations 33, 34 or 35, server 100 transmits to the client computer (see act 36 in FIG. 1A), one or more responses to the query based on these operations. Specifically, the one or more responses which are transmitted in act 36 may include (a) processed versions of one or more rows or in the standard format as generated by operation 33, when the one or more first run-time conditions are satisfied, or (b) redacted versions of the one or more rows in the storage format as generated by operation 34, when the one or more first run-time conditions are not satisfied and the one or more second run-time conditions are satisfied, or (c) the one or more rows in the storage format as retained unchanged by operation 35, when the one or more first run-time conditions are not satisfied and the one or more second run-time conditions are not satisfied. In some embodiments, in act 36, server 100 may notify the client computer, about the format in which the rows are being sent (e.g. as standard format or storage format or any combination thereof).

On completion of act 36, server 100 performs an act 37 similar or identical to act 24 described above, specifically by checking whether all rows responsive to the query have been transmitted to the client computer. In act 37 if all rows responsive to the query have not been retrieved and sent, server 100 returns via branch 38 to act 31 (described above). As noted above, in executing branch 38, server 100 may optionally wait for a fetch request. In act 37, if server 100 finds that all rows responsive to the query have been transmitted, stage 30 ends and in some embodiments server 100 may perform an act 41 (described above).

Flexibility of server 100 in sending different sets of rows in different formats in response to a query is illustrated by an example as follows. In this example, a character column is defined in database 202 to hold a maximum of 2,000 bytes but the actual size of columns in various sets of rows is initially found to be much smaller, e.g. 10, 20, or 50 bytes. In this example, server 100 initially decides to send rows in storage format after redaction (e.g. as per operation 34 described above), but after sending one or more sets of rows, server 100 may find that a ratio of columns selected (based on size in bytes) is less than 30% of entire row, in which case server 100 switches to column level processing (e.g. as per operation 33) for a next set of rows. This decision by server 100 may be reversed in this example, at a subsequent time during execution of the same query, when server 100 finds in act 32 that the actual size of columns to be sent exceeds 30% of row size, so that performing operation 34 to redact unselected columns pays off (by reducing the processing power otherwise needed in server 100, to perform column processing in operation 33).

In some embodiments, server 100's checking of access control policies in act 32 (as a second run-time condition) prevents unauthorized access of a column, when operation 33 or 34 is performed (instead of operation 35 in which rows may be sent in the database storage format, including all columns therein). In an illustrative example, a column 3 in table "A" is associated with an access control policy (such as a VPD policy) which specifies that a client computer may access this column only between 9 am and 5 pm. Accordingly, between these times, server 100 may use operation 35 to transmit all columns of this table A, including column 3 to the client. After 5 pm, server 100 may use operation 34 to redact column 3 (or alternatively, if column 3 is not selected in the query, server 100 may use operation 33 to send query-selected columns and exclude column 3). In contrast, if server 100 did not use operation 33 or 34 after 5 pm (i.e. if server 100 continued to use operation 35 even after 5 pm), then a client that does not implement access control may improperly allow the user to access column 3 even after 5 pm, is a security risk. Hence, flexibility of server 100 to select among operations 33, 34 or 35 improves security.

In certain alternative embodiments, instead of going from act 11 to act 12 (FIG. 1A), server 100 may go from act 11 directly to query execution stage 30, and in particular to act 31 (or act 32) therein. In such alternative embodiments, when the answer is no in act 37, server 100 may go via branch 38B to act 12 to check compile-time conditions to decide how to transmit to the client computer, one or more additional rows. Thus, when the compile-time conditions are satisfied, server 100 then goes via the yes branch of act 13 to stage 20. And in stage 20, server 100 then extracts into memory 1107, one or more columns from the additional rows, and prepares processed versions of the one or more additional rows in standard format and transmits them to the client computer as described above. In act 13 if the answer is no, server 100 goes via the no branch to query execution stage 30 (FIG. 1A), to transmit the additional rows to the client computer. Although the additional rows described in the current paragraph are responsive to the current query, in other embodiments, the additional rows may be responsive to an additional query which is received after the current query.

In an illustrative embodiment, act 32 (see FIG. 1A) of checking run-time conditions is implemented by checking first run-time conditions in two steps 61 and 63, and between these two steps checking second run-time conditions in step 62 (see FIG. 1B). In step 61, server 100 checks one or more first run-time conditions, to determine if rows of a retrieved set should be processed into the standard format. If the answer is yes in step 61, server 100 goes to step 63 (described below). An example of a first run-time condition checked in step 61 is whether a data type conversion (as described above) is required in server 100. If the answer in step 61 is no, server 100 performs step 62.

In step 62, server 100 checks one or more second run-time conditions to determine if any columns in rows of a retrieved set should not be sent to the client. In step 62, if the answer is no, server 100 goes to operation 35 (described above). Examples of the second run-time conditions checked in step 62 are whether access control prevents sending of any columns in the rows of a retrieved set, or whether any unselected column is too large in size (as described above). If the answer in step 62 is yes, server 100 performs step 63. In some embodiments, if a user that issues a query has access rights to a column, that column be sent in raw format, even if not selected. In another embodiment, such column may be redacted in operation 34 in FIG. 1B.

The access control on certain columns in some databases can be set on individual rows, the row level access control is implemented by branch 38 returning to act 31 in FIG. 1A.

In step 63, server 100 checks additional first run-time conditions to determine if any rows of a retrieved set should be processed into the standard format. In step 63, if the answer is no, goes to operation 34 (described above). In step 63 if the answer is yes, server 100 goes to operation 33 (described above). An example of an additional first run-time condition checked in step 63 is whether modification of one or more not to be sent columns in rows of the retrieved set in operation 34 requires more processing power (e.g. based on an estimate of number of instructions) than extraction and processing of columns in operation 33. In one embodiment, the more processing power check in step 63 can translate to a threshold on the ratio of columns that need server side processing to the total number of columns in the one or more tables. In another embodiment, the more processing power check in step 63 can translate to a threshold on the ratio of columns that need server side processing to the total number of columns selected in query.

Note that in an alternative embodiment, all first run-time conditions are checked in a single step 61, and step 63 is not performed. In this alternative embodiment, when the answer in step 62 is yes, server 100 goes via branch 64 to operation 34.

In an illustrative example, a query requires no data type conversion, and the answer in step 61 is no, so server 100 goes to step 62. In step 62 server determines that the number of columns selected is small (below a limit thereon, e.g. only 1 column may be selected out of 100 columns), and hence the answer in step 62 is yes (to avoid sending all 100 columns, which would otherwise be sent if operation 35 were to be performed). Then, server 100 goes to step 63, and finds by checking an additional first run-time condition, that the current processing load is too high (e.g. above a limit thereon, e.g. 60%). So in step 63, server 100 decides to take the yes branch, and performs operation 33. By taking the yes branch in step 63, server 100 avoids performing omission or modification on too many unselected columns (which may otherwise have been performed in operation 34, to prevent sending of 99 unselected columns).

In some embodiments, there may not be a threshold on the ratio of number of columns selected in query to total number of columns in one more tables in either the compile-time conditions or run-time conditions. This implies more queries responses can be sent as raw rows in storage format.

The additional first run-time check performed in step 63 may be configured by a DBA specifying e.g. that if over 30% of columns need to be omitted or modified, then the answer in step 63 is yes (and rows should be processed into the standard format). Another first run-time check that may be configured by a DBA may be, for example, if more than a certain percentage of columns are associated with access control policies, then the answer in step 61 is yes (e.g. to prevent excessive processing power usage in performing step 62). Therefore, server 100 may be designed and/or configured to flexibly decide, which of three operations 33, 34 or 35 is performed, e.g. depending on its own current processing load, thereby to improve operation (and responsiveness) of server 100.

Some embodiments of server 100 may be designed to send rows partly in the standard format and partly in the storage format, in a query execution stage 50 (FIG. 1C) that is similar or identical to the above-described query execution stage 30 (FIG. 1A) except that stage 50 operates on multiple portions of each row in a set of retrieved rows. The reference numbers of items in FIG. 1C within stage 50 are obtained by adding 20 to respective reference numbers of corresponding items in FIG. 1A within stage 30. On completion of any of operations 53, 54 or 55, server 100 goes to an act 60 in FIG. 1C to check if all portions of all retrieved rows are prepared for transmission and if not goes via branch 65 to act 52 to repeat the checking of run-time conditions on the remaining portions. When the answer in act 60 is yes, server 100 goes to act 56 in which each row's portions are transmitted to the client, wherein each portion may be in any format. In an illustrative example, in a row with 100 columns, the last 50 columns are selected, whereas in the first 50 columns only 5 columns are selected. Server 100 may decide to send the first part of the row (namely the first 50 columns) in the standard format (which implies sending only the 5 selected columns in standard format), and send the second part of the row (namely the last 50 columns) in the storage format. The advantage is server does not have to redact 50−5=45 columns in the first part of the row. In this example, server 100 may add to the second part of the row, a row header in the storage format.

In several embodiments, a server 100 (which may be implemented by one or more computers in a cloud, depending on the embodiment) receives in act 101 (FIG. 1D), a query that references one or more objects (such as tables having rows and columns) stored by server 100 in a database on one or more storage devices (such as hard disks). Server 100 may be programmed, in some embodiments, with a relational database management system (RDBMS) software, to create and maintain a relational database 202 (FIG. 2A, described below), in which the objects referenced in the query are stored, in a normal manner. In response to receipt of the query in act 102, server 100 performs an operation 110 to evaluate one or more conditions related to the query. In one embodiment (also called "first embodiment"), operation 110 includes an act 112 (FIG. 1D) to check if each object referenced in the query has any column which is not selected in the query. In a second embodiment illustrated in FIG. 1N, operation 110 includes an act 111 to evaluate an additional condition, to check whether a client can parse the server's database storage format and act 112 is performed when the answer in act 111 is yes. In the second embodiment, if the answer in act 111 is no, an operation 120 (described below) is performed. In a third embodiment illustrated in FIG. 1O, operation 110 includes, after acts 111 and 112, another act 113 to evaluate yet another additional condition. For example, the additional condition in act 113 may check if a number of query-selected columns relative to a total number of columns in query-referenced tables are at least a minimum percentage (e.g. at least 20%).

In embodiments of the type illustrated in FIGS. 1D and 1N, on completion of act 112 if the answer is yes operation 130 (described below) is performed as per branch 114, and if the answer is no in act 112 operation 140 (described below) is performed as per branch 115. In the third embodiment illustrated in FIG. 1O, instead of going from act 112 to operation 130 directly when the answer is yes, the above-described act 113 is performed after which operation 130 is performed when the answer in act 113 is yes. In the third embodiment, on completion of act 113 (FIG. 1O) if the answer is no, server 100 executes the query, by performing operation 120. Specifically, in embodiments of the type shown in FIG. 1D, there is no checking of whether a client can parse the server's storage format (by omission of act 111), because the server's software and the client's software are released together, and by design the client software contains functionality to parse the server's storage format. Unless described otherwise herein, the embodiments shown in FIGS. 1N, 1O and 1P are similar or identical to the embodiment shown in FIG. 1D.

On completion of act 112 (FIG. 1D), if the answer is no, server 100 executes the query, by performing operation 140. On completion of act 111, if the answer is no, server 100 executes the query, by performing operation 120 (FIG. 1D). Hence, based on results of evaluation of multiple conditions in operation 110, server 100 executes the query, by performing one of multiple operations which are alternatives to one another, such as operations 130 and 140 (FIG. 1D). Use of such conditions in different embodiments of operation 110 is described further in detail, below.

In operation 130 (FIG. 1D), which is an alternative to operation 140, server 100 prepares, in the server's database storage format, rows from which original values of all columns not selected in the query are discarded (also called "redacted versions of rows" or simply "redacted rows") followed by act 131 in which these redacted rows are transmitted while still in the server's database storage format. Original values of unselected columns may be discarded, for example, by excising a row to omit the original values altogether, or by modifying the original values in a row in any manner, e.g. by masking, randomizing or nulling the original values. In operation 130, server 100 does not perform one or more of the steps normally performed to process columns selected in the query (e.g. steps in operation 120, described below in reference to FIG. 1O). In some embodiments, in operation 130, server 100 does not extract, and does not re-order, all the query-selected columns, although one or more specific columns may be extracted as described next.

Extracting a column includes retrieving an original row from disk (e.g. see act 224 in FIG. 2B), looking up the column's value within a row piece of the original row by use of metadata (e.g. lengths of preceding columns), to identify a precise location of bytes of the column's value in the original row, and copying these bytes to memory (e.g. main memory 1107 in FIG. 7B). In certain embodiments of operation 130, in responding to a query that has a predicate, such as an evaluation function on a specific column, server 100 may extract the specific column, and execute the evaluation function using the specific column's value (e.g. by adding the number 5, if so specified in the evaluation function). Then, server 100 may replace an original value of the specific column in a row piece from which the original value was extracted, with an evaluated value resulting from the execution of the evaluation function, to obtain a new row piece that contains the evaluated column(s), followed by transmission to the client of the new row piece, which is still in database storage format. The evaluation may increase or decrease the size of the original column in the row. In some embodiments, the row piece format may be row header followed by length, value of individual columns. In this case the length of that column is altered. In some embodiments, this may alter size of the row piece in the row header.

In some embodiments, the length of a column may be updated inside a row piece, which may be needed in addition to (or in some cases instead of) updating the column's value. The changing of one or more column lengths and/or column values in one or more row pieces in a database storage format, to obtain new row pieces with evaluated columns still in the database storage format, is also referred to herein as in-line row piece transformation. In-line row piece transformation of one or more row pieces uses less processing power in server 100, than extracting columns of a row, e.g. during per column processing in operation 120. Server 100 can use the processing power saved in this manner (and/or saved in any other manner described herein), to perform other activities, such as DBA management activities, or other actions specified by a database administrator, such as identifying in a list, N most CPU intensive SQL queries.

A client 170 (FIGS. 1M, 2A) that receives redacted versions of rows in the server's database storage format, performs one or more steps of processing each column (e.g. extracting, re-ordering and re-formatting, described below in reference to operation 120) normally performed by server 100, to obtain a processed version of each row, e.g. as shown by act 175A in FIG. 1M. In the redacted rows received by client 170, columns not selected in the query have been redacted by server 100, hence client 170 omits any modified values which may (or may not) be present in the redacted rows.

In operation 140 (FIG. 1D), which is an alternative to operation 130 described above, server 100 prepares for transmission to the client, original rows in the server's database storage format, without discarding any value in any column of any row, regardless of which columns are selected or not selected in the query (also called "original versions of rows" or simply "original rows"), followed by act 141 in which these original rows are transmitted in the server's database storage format (e.g. transmitted unchanged, when there is no evaluation function in any predicate of the query). A client 170 (FIGS. 1M, 2A) that receives original rows in the server's database storage format, performs one or more steps of processing each column (e.g. extracting (by looking up within a row piece, and copying to memory), re-ordering and re-formatting described below in reference to operation 120) normally performed by server 100, to obtain a processed version of each row.

As noted above, on completion of operation 130, server 100 performs an act 131 to transmit rows in server 100's database storage format. Depending on the amount of data, an original row may be physically stored in multiple disk blocks. This original row is retrieved from the one or more objects by server 100 and is represented by multiple row pieces (e.g. as described below in reference to FIGS. 4A-4F and 5A-5C). Here each row piece is of a size sufficiently small to fit within a single block of one or more storage devices (such as hard disks) accessible to server 100 (also called "disk block" or "data block"). Specifically, in the database storage format, each row includes one or more row pieces which have a size (e.g. in bytes) small enough to fit wholly within a fixed-size disk block which is used by a database management system to store the database, on a non-volatile storage device e.g. a hard disk. Each row piece may include a header followed by data, wherein the data may include for one or more columns, corresponding one or more pairs of column length and column value, as illustrated in FIGS. 4A-4F and 5A-5E (described below).

Depending on the amount of data in an original row, a specific column may itself be split into multiple pieces (so that each piece of the column has a size small enough to fit within a disk block), in the server 100's database storage format. In responding to a query as described above, multiple row pieces are transmitted in act 131, in the server 100's database storage format, unless a specific column (or a portion thereof) is not to be sent for any reason, in which case the specific column is redacted from one or more row pieces by discarding at least it's original value which is thus not sent (e.g. by excising the original value), or alternatively the original value may be modified and sent as a modified value (e.g. modified by nulling, randomizing, or masking or a combination thereof) in one or more row pieces. In one embodiment, a column may be split across multiple row pieces in an original row as retrieved from database 202 (in server storage), and in this situation each row piece containing the column's original value may be excised, while retaining the number of row pieces unchanged (see FIG. 5D). In another embodiment, the multiple pieces of this un-selected column can be combined into one excised column piece in a redacted row piece (e.g. in FIG. 5E see length 594 of column CI set to 0 in a single row piece 595 to replace column CI which was represented by three column pieces in original row pieces 510, 520 and 530).

In some embodiments, the conditions which are evaluated in operation 110 (FIG. 1H) by server 100 include a condition checked in act 111 as to whether a client that sent the query has an ability to parse the server's database storage format in which rows are stored in the database. At least partially in response to finding that this condition is true on completion of act 111 (e.g. after performance of act 112 and optionally act 113), server 100 executes operation 130 (FIG. 1H) described above, to prepare redacted versions of rows responsive to the query. But on completion of act 111 (FIG. 1H), when a client is found unable to parse the server's database storage format (e.g. when the query is received from client 160 described below in reference to FIG. 1L), server 100 executes the query by performing operation 120 (FIG. 1N), to prepare and transmit processed versions of rows responsive to the query.

In operation 120 (FIG. 1N), server 100 prepares for transmission, rows in which all columns' values are processed by server 100 in the normal manner (also called "processed versions of rows" or simply "processed rows"). Specifically, server 100 performs one or more steps of processing each column, e.g. uses bind values to identify data to be retrieved from the one or more objects identified in the query, repeatedly fetches a row responsive to the query, extracts from the fetched row all columns selected in the query (e.g. by parsing one or more pieces of the fetched row to perform lookup and copying to memory), re-orders the query-selected columns relative to one another (e.g. if order of columns in the query is different from the columns' order in storage), and expresses the query-selected columns in a predetermined format known to be parse-able by the client. The just-described predetermined format may be either identified in a predetermined standard (such as comma separated values), and/or agreed upon by the client and server prior to the query, or specified in the query, depending on the embodiment. Thereafter, these processed rows are transmitted by server 100, in act 121, followed by returning to act 102 (described above). A client 160 (FIGS. 1L, 2A), which receives these processed rows, does not need to perform any steps to process each column in each row, because such steps have been already performed in operation 120 by server 100, as described in this paragraph.

In some embodiments, on completion of act 111 (FIG. 1N), if server 100 determines that the client is able to parse the server's database storage format, server 100 may be configured to evaluate another condition in act 112 (FIG. 1N), to check if each object referenced in the query has any column which is not selected in the query. When the condition checked in act 112 evaluates to false (because all columns of all objects referenced in the query are selected in the query), server 100 performs operation 140 to transmit to the client, original rows in the server's database storage format. In operation 140, server 100 transmits rows in the database storage format without discarding any value in any column of any row, regardless of which columns are selected or not selected in the query. When the condition checked in act 112 (FIG. 1N) evaluates to true (because at least one column in at least one object referenced in the query is not selected in the query), server 100 may be configured to perform operation 130 (as shown by branch 114 in FIG. 1N), to prepare and transmit to the client, redacted versions of rows in the server's database storage format.

In certain embodiments, when the condition checked in act 112 (FIG. 1O) evaluates to true, server 100 may be configured to check one more additional conditions in act 113 (FIG. 1O). Specifically, act 113 (FIG. 1O) checks whether an additional condition is met e.g. by checking if a percentage of columns selected in the query relative to all columns in objects referenced by the query, exceeds a predetermined minimum. When this additional condition is satisfied, the result of act 113 is yes, and server 100 prepares and transmits redacted versions of one or more rows by performing operation 130 as described above. In such embodiments, when this additional condition is not satisfied, the result of act 113 is no, and server 100 is configured to perform operation 120, to prepare and transmit processed versions of one or more rows as described above. For example, if only 2 columns are selected in a query, from among 100 columns stored in query-referenced tables, the percentage of selected columns is 2% and when the predetermined minimum is set at 10%, the additional condition in act 113 is not satisfied and so server 100 (FIG. 1O) prepares processed versions by performing operation 120 instead of redacting 98 columns by performing operation 130.

In some embodiments, when the answer is no in act 112, server 100 may check if one or more other conditions (which are predetermined) are met, as illustrated by act 116 (FIG. 1P), and if the answer in act 116 is yes then server 100 performs operation 130, but if the answer in act 116 is no then server 100 performs operation 140. In one illustrative embodiment act 116 checks if there is any column on which special processing needs to be performed, e.g. based on indication from a database administrator (DBA) stored in a policy in the database 202 identifying any specific column as being required to be redacted (such as based on a user's privilege). In one illustrative example, a database administrator sets a policy (e.g. as a column security feature) specifying that for a query by certain user (who may receive a privilege granted by another user) or query via certain views (on that table), even if all rows are selected by accessing a certain view, redaction of specified columns is required by the policy, and in this case the answer in act 116 is yes, and server 100 goes to operation 130 to redact the specified columns.

As noted above, server 100 may be configured in some embodiments, to go from act 112 via yes branch 114 to operation 130, in which case act 113 is never performed (e.g. as shown in FIG. 1D), and hence such embodiments have no thresholding or other such additional conditions. Similarly, other such embodiments may omit any of acts 111 and 112, and may include other such acts that test other such additional conditions in act 113 (e.g. whether the query requires a complex join processing of three or more tables). Furthermore, in some embodiments, configuration of server 100, to perform (or not perform) an act to evaluate one or more such conditions, may be based on flags in server 100, and such flags may be set by user input, e.g. input from an administrator of database 202 (FIG. 2A, described below).

Operation 130 (FIGS. 1D, 1N, 1O, 1P) described above, to redact rows by discarding one or more values of columns not selected in a query, can be performed by server 100 using a redaction technique at different levels of granularity. Specifically, a redaction technique (such as excising, masking, randomizing or nulling), can be used by server 100 to redact all unselected columns in all rows, when applied at table level granularity (also called minimum granularity or least granularity).

In a first example, server 100 uses nulling as the redaction technique at table level granularity, and values of all unselected columns (e.g. columns AI, AJ, BI and BJ) in all rows are modified to the value zero, as illustrated in FIG. 1E. In this example, the rows in FIG. 1E are shown only with the values of columns A1-BZ, although in some embodiments, each row additionally includes a length of each column that is located adjacent to the column's value (e.g. length may precede the column's value, or length may follow the column's value, depending on the embodiment). Although in the example illustrated in FIG. 1E, there is no change in length of each column (e.g. 4 bytes) being redacted (e.g. columns AI, AJ, BI and BJ), other examples of using nulling as the redaction technique may update each redacted column's length (not shown in FIG. 1G) to the value 1 and update the redacted column's value to a single byte of value zero.

In a second example, server 100 uses masking as the redaction technique at table level granularity, and values of all unselected columns (e.g. columns AI, AJ, BI and BJ) in all rows are modified to masked values, as illustrated in FIG. 1F. A masked value at a row column intersection, e.g. value 9217 at RI, AI in FIG. 1F may be different from a masked value at another row column intersection, e.g. value 1212 at RJ, AJ in FIG. 1F, if each masked value is obtained by applying a masking function to an original value at the respective row column intersection.

In a third example, server 100 uses randomizing as the redaction technique at table level granularity, and values of all unselected columns (e.g. columns AI, AJ, BI and BJ) in all rows are modified to values selected from random from a range (e.g. 1970-1990) as illustrated in FIG. 1G. A random value at a row column intersection, e.g. value 1975 at RI, AI in FIG. IF is independent of a random value at another row column intersection, e.g. value 1986 at RJ, AJ in FIG. 1G, because each random value is obtained by applying a randomizing function to pick a value in the range (e.g. 1970-1990) unrelated to the original value at the respective row column intersection.

In a fourth example, server 100 uses excising as the redaction technique at table level granularity, and values of all unselected columns in all rows are omitted, as illustrated in FIG. 1H by boundaries 191, 192, 193 and 194 which denote omission of respective columns AI, AJ, BI and BJ. More specifically, as shown by row R1 in FIG. 1H, column AI−1 and AI+1 are adjacent to one another with boundary 191 between them denoting omission of column AI. One advantage of excising is that a snooper who captures rows R1-RM shown in FIG. 1H would not know that columns AI, AJ, BI and BJ even exist in database 202 (FIG. 2A). However, excising may place more computation load on server 100, relative to other redaction techniques, depending on how many (or how few) columns need to be redacted, as described more completely below. Moreover, although in some embodiments of excising, a column's value is omitted from a row as shown in FIG. 1H, other embodiments of excising may change a column's length to 1 (regardless of original length), and set the column's value to 0. Still other embodiments of excising may change a column's length to 0, and omit the column's value from the redacted row (see FIG. 5C, described below).

Alternatively, in operation 130 described above (FIGS. 1D, 1N, 1O), multiple redaction techniques can be used by server 100 to redact respective multiple unselected columns in all rows, which constitutes column level granularity (also called intermediate granularity). In an example of column level granularity illustrated in FIG. 1I, server 100 uses nulling as the redaction technique to discard values of column AI in all rows. Moreover, serve 100 uses masking as the redaction technique to discard values of column AJ in all rows and randomizing as the redaction technique to discard values of column BI in all rows. Furthermore, server 100 excises column BJ, as shown by boundary 195 between columns BJ−1 and BJ+1 in FIG. 1I.

Yet another alternative is for server 100 perform operation 130 by individually selecting and applying a redaction technique at each intersection of each row with a column not selected in the query, which constitutes use of row level granularity (also called maximum granularity), as illustrated in FIG. 1J. In an example of row level granularity illustrated in FIG. 1J, in the first row R1, server 100 uses masking to discard the value of column AI, randomizing to discard the value of column AJ, nulling to discard the value of column BI and excises column BJ, as illustrated by boundary 196. Moreover, in the second row R2, server 100 uses masking to discard the value of column AI, nulling to discard the value of column AJ, excises column BI as illustrated by boundary 197 and nulls the value of column BJ. Furthermore in row RI, server 100 uses nulling to discard the value of column AI, excises column AJ as illustrated by boundary 198, nulls the value of column BI, and randomizes the value of column BJ. Finally, in row RM, server 100 excises columns AI and AJ as illustrated by boundaries 199A and 199B and nulls the values of columns BI and BJ.

Use of row level granularity as illustrated in FIG. 1J enables server 100 to identify, based on statistics, which of the multiple redaction techniques places the least computational load on the server, but usage of row level granularity is normally more computation intensive than column level granularity, which in turn can be more computation intensive than table level granularity. Hence, in some embodiments, at the beginning of operation 130, server 100 performs an act 132 (FIG. 1K) to evaluate additional conditions and based thereon, automatically selects, from among multiple levels of granularity (such as table level, column level and row level), a current level of granularity at which a redaction technique is thereafter applied to discard from one or more rows retrieved from database 202 (FIG. 2A), values of columns not selected in the query (or columns not to be sent for any reason). The current level of granularity may be selected in act 132 (FIG. 1K), based on one or more conditions for example, computation load in the server, privilege of the client, and latency in the client, e.g. as described below in reference to FIGS. 6A-6C. In certain embodiments, when operation 130 is first performed, the current level of granularity is initially set in act 132 by default to maximum granularity, and server 100 collects statistics, to be used to identify a redaction technique which is least computationally intensive in discarding a value, for each unselected column.

After selection of granularity level in act 132, server 100 performs an act 150 (FIG. 1K) to automatically determine from among multiple redaction techniques (such as excising, masking, randomizing and nulling), one or more redaction techniques to be used at the current granularity level. Specifically, in act 150, server 100 performs an act 151 to check if the current granularity level (also called "current granularity") is table level, and if so performs act 152 to select a redaction technique to be applied to all unselected columns, in one or more rows responsive to the query. If the current granularity level is not table level, in act 153, server 100 checks if the current level of granularity is column level, and if so server 100 performs act 154 to select a redaction technique to be applied to a specific unselected column in all rows, and act 154 is repeated for each unselected column (by return from act 133, described below). In act 150, if the current level of granularity is row level, server 100 performs act 155 to select a redaction technique for use in a specific row on a specific unselected column, and act 155 is repeated for each additional unselected column in the specific row, and also repeated for each additional row (on return from act 133, described below)

In each of these acts 152, 154 and 155, server 100 determines one or more redaction techniques (such as nulling, excising, masking and randomizing) to be used, for example based at least partially on corresponding estimates of number of instructions required to be executed in applying respective redaction techniques, e.g. as described below in reference to act 310 in FIG. 3A. Depending on the embodiment, server 100 may determine the one or more redaction techniques additionally based on an estimate of reduction in processing load at a client that sent the query, due to not extracting from rows in the server's database storage format one or more columns not selected in the query, as described below in reference to act 310 in FIG. 3B. Furthermore, in some embodiments, the one or more redaction techniques to be used may be determined by server 100 based on statistics related to a number of times in previous executions of the query, each redaction technique was found to be least computationally intensive and used to discard a value of a column, e.g. as described below in reference to step 315 in FIG. 3A.

After determination of one or more redaction techniques in act 150 (FIG. 1K), server 100 performs act 133 in which the determined redaction techniques are applied at the current granularity level, to one or more rows retrieved from database 202 (FIG. 2A) as being responsive to the query (e.g. in response to a fetch request), to prepare redacted versions of the one or more rows in the server's database storage format. In preparing the redacted version in act 133, server 100 applies the one or more redaction techniques to edit each row, to discard any value of any column not selected in the query but without extracting values of one or more columns selected in the query. Specifically, in some embodiments, based on metadata, server 100 identifies positions of unselected columns within each row, and edits in-situ, values of the unselected columns (by e.g. by modification or omission thereof on application of the one or more redaction techniques), while other portions of each row are retained in the server's database storage format (e.g. any row pieces and/or column pieces in these other portions are not collated, to extract columns therefrom).

Then, server 100 checks if the current level of granularity is maximum (i.e. row level), and if so, whether all unselected columns have been discarded by application of a redaction technique and if so, whether all rows responsive to the query (e.g. in a block) have been redacted, and if not returns to act 155 (described above). Server 100 also returns to act 155, when all unselected columns in a row have not been redacted. When the current level of granularity is minimum (i.e. table level), server 100 repeatedly uses the redaction technique selected in act 152, until all unselected columns in all rows responsive to the query (e.g. in a block) have been redacted. Moreover, when the current level of granularity is intermediate (i.e. column level), server 100 repeatedly applies the one or more redaction techniques selected in act 154 to all rows responsive to the query (e.g. in a block).

On completion of act 133, server 100 performs act 134 to store in memory, statistics related to the current level of granularity and the currently selected redaction techniques which have been applied in act 133, for future use in automatic selection of granularity level and/or determination of one or more redaction techniques (to be applied at that granularity level), followed by returning to act 132 (described above).

On return to act 132, a current level of granularity may be changed by server 100, so a new level of granularity is chosen on repetition of act 132. Hence, the granularity level is changed when a query is executed in operation 130 with different bind values. Moreover, even when the query is executed with the same bind values, act 132 may be repeated, for example if database 202 returns multiple blocks of one or more rows, thereby to change the current level of granularity between blocks. As noted above, act 132 is followed by determination of one or more redaction techniques as needed in act 150. When operation 130 is repeated (e.g. in iterations for multiple blocks, or when the same query is executed with different bind values), the current level of granularity selected in act 132 may be based on various factors, such as computation load in the server, privilege of the client, and latency in the client.

In a first illustrative example, initially, in response to receipt of a query, if computation load in server 100 is low (e.g. below 40%), server 100 selects a current level of granularity in act 132 (FIG. 1K) to be maximum (e.g. row level). Thereafter, act 132 may be performed again, for example after one block of rows (e.g. 5000 in number), to continue responding to this query by fetching a next block of rows, or alternatively to respond to another receipt of this same query, but with different bind values. During such a repeated performance of act 132, server 100 may find (based on statistics) that certain redaction techniques (e.g. nulling and randomizing) are used a majority of times to redact values in each unselected column (e.g. col. 7 and col. 10 respectively). If so, then in the next set of rows to be redacted, server 100 changes the current level of granularity to intermediate (e.g. column level), and then applies these majority-used redaction techniques (e.g. nulling, randomizing) to redact rows at the intermediate level, which enables server 100 to skip estimate preparation and comparison in act 310, as described below in reference to FIG. 3A.

In a second illustrative example, in response to receipt of a query, in act 132 (FIG. 1K), server 100 selects a current level of granularity to be minimum (e.g. table level), e.g. due to computation load in server 100 being high (e.g. above 60%). Thereafter, on the next performance of act 132 (FIG. 1K) for this query, if the computation load has reduced, server 100 changes the current level of granularity to intermediate (e.g. column level). After changing the current granularity level to intermediate, server 100 repeats determination of one or more redaction techniques in act 150 (for each unselected column), followed by applying the redaction techniques to rows responsive to the query in act 133 (as described above).

In several embodiment, server 100 (FIG. 1D, 1N, 1O) receives a query in act 102 from a client 160 or from a client 170 (FIGS. 1L, 1M, 2A) that are respectively unable to parse or able to parse, the server's database storage format. In response to receipt of the query from client 160 (FIG. 1L), server 100 transmits rows that are expressed in a format known to be parse-able by client 160, such as comma separated values, as per act 121 (FIGS. 1N, 1O) described above. In response to receipt of the query from client 170 (FIG. 1M), server 100 transmits rows that are expressed in the server's database storage format, as per act 131 or 141 (FIGS. 1D, 1N, 1O) described above. Depending on the embodiment, client 160 may be programmed to perform acts 161-167 of the type illustrated in FIG. 1I and described below. Similarly, also depending on the embodiment, client 170 may be programmed to perform acts 171-177 of the type illustrated in FIG. 1M and described below.

In act 161 (FIG. 1L), client 160 establishes a database session with server 100, followed by act 162 in which client 160 indicates its inability to extract columns from rows expressed in the server's database storage format, e.g. in response to a request from server 100 to identify its ability. Depending on the embodiment, client 160 may return an error if the server's request is unrecognized, in which case server 100 determines that client 160 is unable to parse its database storage format. Thereafter, as shown by branch 163, client 160 goes to act 164 and issues a query which includes one or more columns to be used by server 100 to identify one or more rows responsive to the query and also includes one or more columns to be returned by server 100 in the query responsive rows. Next, in act 165, client 160 receives and stores in its local memory, one or more rows expressed in a normal format, e.g. values of columns that are separated from one another by commas. Depending on the embodiment, the one or more rows received in act 165 may contain columns' values expressed in a format specified by client 160, e.g. in the query issued in act 164, or notified to server 100 in another manner prior to act 164. The values of columns in one or more rows stored in local memory by client 160 are used in a normal manner, e.g. to prepare and display in act 166, a screen based on these values, in one or more rows received in response to the query issued in act 164. On completion of act 166, client 160 may return to act 164 and issue a fetch request, based on a query previously issued (e.g. on initial performance of act 164). Depending on the embodiment, client 160 may be additionally used prior to issuance of a query in act 164, to perform an act 167, e.g. in response to user input to create tables, which provides metadata on columns, such as column names and data types of values to be stored in the columns, and additional user input to repeatedly insert rows into the created tables.

Similarly, client 170 performs acts 171-177 in FIG. 1M in a manner similar or identical to acts 161-167 in FIG. 1L, except for certain differences, as described below. In act 172, client 170 expresses its ability to extract columns in the server's database storage format. Moreover, after act 174, client 170 receives table-specific metadata which is needed, to extract columns from rows in the server's database storage format, such as syntax of the rows, names of columns, and data types of values of columns. In act 175, client 175 receives rows expressed in the server's database storage format and stores them in local memory.

Thereafter, in act 175A, client 170 prepares processed versions of one or more rows, based on the one or more rows in the server's database storage format in local memory. For example, in act 175A, client 170 repeatedly fetches a row received from server 100 and performs thereon, one or more of the following steps: (1) collates multiple row pieces to form one or more columns in each row (and if necessary forms a column itself, by collating column pieces thereof), (2) re-orders columns relative to one another if necessary to meet a query-specified order, and/or (3) re-formats any column if necessary depending on any differences between the server's database storage format and a format specified in the query as being required in response thereto (e.g. by converting an integer into a character string or vice versa). In act 175A, when client 170 finds a row that contains one or more unselected columns' values, in preparing a processed row, client 170 omits these values, which may (or may not) have been modified by server 100, e.g. when the row is edited by server 100's application of a redaction technique that modifies values of unselected columns, such as nulling, masking or randomizing. When a row is edited by server 100's application of a redaction technique that excises an unselected column's value, the row received by client 170 in the server's storage format does not have a value for the unselected column, and hence skipped by client 170 in preparation of a processed row in act 175A. On completion of act 175A, which may be performed repeatedly for each row received from server 100, client 170 performs act 176, in a manner similar or identical to act 166 (described above). Client 170's performance of act 175A eliminates the need for server 100 to perform these same steps, which reduces computation load in server 100 in responding to a query from client 170 (relative to responding to a similar query from client 160).

Several described embodiments improve transfer of information between a server 100 and clients 170, 160 (see FIG. 2A), in response to queries therefrom, by bulk transfer of data in server 100's database storage format, with (or without) certain columns that are to be (or not to be) sent. Specifically, when one or more columns of data in database tables are not needed (in response to queries from clients 170, 160), the columns may be redacted (e.g. modified or excised) from the data retrieved from the database tables and then transmitted by server 100 to clients 170, 160 in the server's database storage format, or alternatively when the columns is/are needed the data is transmitted by server 100 to clients 170, 160 without redaction in the server's database storage format, as described below. As illustrated in FIG. 2A, in many embodiments, before issuing a query to retrieve data from a relational database 202, a client 170 establishes a session with a relational database management system (RDBMS) server 100. Server 100 includes one or more computers configured with software to implement method 220.

In establishing the session, server 100 receives (as per act 221 in FIG. 2B) from client 170, certain information 204 indicating capabilities of client 170 (see FIG. 2A). For example, in information 204, client 170 may inform server 100 of its ability (or inability) to parse rows in the server's database storage format (e.g. to collate row and/or column pieces, re-order and re-format column values, and convert data types in rows expressed in the server's database storage format) to generate rows expressed in a normal format of a query response (also called "query response format") which may be predetermined, such as comma separated values. Typically, rows in the query response format are expressed in a per column format, wherein multiple portions (also called "pieces") of any column (which may be split on disk, across multiple disk blocks in the server's database storage format) are joined together, to form each column's value. Moreover, multiple portions (also called "pieces") of any row (which may additionally be split on disk, across multiple disk blocks in the server's database storage format) are joined together, to form the row's information (which may include pairs of length, and value of each column), and typically each row in the query's response format (after column processing) has multiple column values, e.g. values separated by commas.

An illustrative example of such a query is "select column5, column7, column1 from Table A" where Table A has ten columns, namely columns 1-10. The reordering of these ten columns from their storage order (in which the columns are stored on disk, e.g. sequentially from column 1 to column 10), to query-specified order (e.g. column 1 occurs after column 7) is done on a client 170, which results in saving of CPU processing at server 100. Thus, processing power savings in server 100 are obtained in several embodiments, by transmission of one or more rows in the server's database storage format (which column values are arranged in the server's database storage order), due to server 100 not being required to join row pieces before transmission, or not being required to join (before transmission) column pieces of a column split on disk across multiple disk blocks, or not being required to reorder columns (e.g. when performing operation 130 or operation 140). In such embodiments, CPU power of server 100 is considered more precious, as it services thousands of clients concurrently.

Use of redaction techniques, such as excising, masking, nulling of original rows in the server's database storage format as described in some embodiments herein, makes these embodiments independent of any thresholding test (e.g. 80%) to be applied to a number of columns selected from a table in a query (relative to total number of columns in the table), as may be required when transmitting all columns of one or more rows in server's database storage format. Hence such non-thresholding embodiments (e.g. implemented by use of branch 114 in FIGS. 1D, 1N) provide improvements over transmission of all columns of one or more rows, because use of redaction techniques is applicable to a server's responses to all queries from a client capable of parsing the server's database storage format (instead of just those queries that satisfy a thresholding test on the percent of total columns that are query-selected columns, as may be required for transmission of all columns of one or more rows). Moreover, use of redaction techniques as described herein improves security because columns not to be sent are redacted, and use of the storage format reduces processing load at the server.

In some embodiments, an excising redaction technique is used to increase security, because in some situations a weak data modification technique (e.g. by certain types of masking) is vulnerable to hackers, who can recover the original data from the modified data.

The redaction techniques described herein may be applied to data in other storage formats used in server 100, where a raw version of data in the server's other storage format is sent to client 170 without changing the format. For example, server 100 may store original rows in a spreadsheet, or in a file as comma separated values, or in an image or in video based files, and these rows (in the server's other storage formats) are sent unchanged to a client.

Information 204 (see FIG. 2A) may include one or more specific flags which informs server 100 regarding client 170's ability (or inability) to perform row format processing e.g. based on software installed in client 170, to disassemble a row of data into individual columns selected in a query (e.g. by using metadata to extract length and value of each individual column), when the row is expressed in a server-specified format related to storage in a RDBMS database (e.g. the server's database storage format), which is different from the format of columns of data normally transmitted to a client, in response to a SQL query (e.g. the SQL response format), or query's response format. Information 204 may further include one or more latency measurements (also called "past latency measurements") of past query responses received in client 170 from server 100.

In illustrative embodiments, client 170 is programmed with software to parse the server's database storage format that may be identified by server 100, and use the server's database storage format to extract columns and perform per-column processing, on rows expressed in the server's database storage format. The just-described ability of client 170 to parse and use the server's database storage format in performing per-column processing is identified in the one or more specific flags included in information 204, which is transmitted by client 170 to server 100. Hence, based on information 204, in response to client 170 indicating it is able to parse server's database storage formats, server 100 transmits (as per act 222 in FIG. 2B) to client 170, a definition 205 (see FIG. 2A) of the server's database storage format (also called "server's storage format" or simply, "storage format") in which data in columns of each row are to be supplied, in response to queries from client 170.

The server's database storage format defined in definition 205 (see FIG. 2A) may be similar or identical to a format of columns in storage, in one or more blocks (also called "disk blocks") of relational database 202. An illustrative example of definition 205 (see FIG. 2A) of such a database storage format in server 100 is described in U.S. Pat. No. 7,188,202 (see above) as a "disk row format" wherein rows in a database table may be stored as a contiguous set of a row's column values, and these column values may be stored in the same order relative to one another ("storage order"), in each row of a table. Another illustrative example of definition 205 of the server's database storage format includes a sequence of cells (or tuples) containing one or more of: size (also called length) and data-type, wherein size (or length) is the width of a column in number of bytes (or alternatively another attribute or field of the column), and wherein data-type is the data-type of the column (e.g. character string, integer, etc). Any other such definition 205 of the database storage format may be supplied by server 100 to client 170 (see FIG. 2A), depending on the embodiment. Hence, a specific database storage format's definition 205 provided by server 100 can be different, in different embodiments. In some embodiments, a server's database storage format identifies each column's position within a row from the beginning of the row, e.g. by identifying lengths of all columns in the row, which are arranged sequentially one after another from the beginning of the row (wherein each column may contain a pair of numbers, namely the column's length and the column's value).

Note that a disk block (also called "data block" or simply "block") is the smallest unit of on-disk storage accessed (e.g. read and/or written) in one or more storage devices, by an application (e.g. RDBMS that accesses relational database 202) executed by server 100. A disk block corresponds to a specific number of bytes of physical space on disk.

After establishment of a session, client 170 may send to server 100, one or more queries, such as queries 206, 208 (see FIG. 2A). Server 100 responds to receipt of a query (e.g. in act 223 in FIG. 2B), based on capabilities of client 170 (as identified in information 204), by transmitting (e.g. in act 141 or act 131 in FIGS. 2B and 1C), in server's database storage format (as per definition 205), one of two versions 207, 209 (FIG. 2A) of one or more rows retrieved respectively from one or more database tables (e.g. Table A and/or Table B) identified in queries 206, 208 (FIG. 2A). The two versions 207, 209 (see FIG. 2A) which are both expressed in the server's database storage format may be, for example, a redacted version 207 of the one or more retrieved rows when one or more columns of the one or more database tables are not to be sent (see act 131 in FIGS. 2B and 1C), or alternatively an unredacted version (also called "raw" version) 209 of the one or more retrieved rows when all columns of the one or more database tables are to be sent (see act 141 in FIGS. 2B and 1C).

Specifically, after receipt of each query 206, 208 (see FIG. 2A), server 100 retrieves (see act 224 in FIG. 2B) original rows 240 from one or more tables in database 202 that are identified by the query. Depending on the embodiment, act 224 in FIG. 2B may be performed at any time after receipt of query 206 and before preparation of a version of each retrieved row for transmission (as per operation 120, 130 or 140 in FIGS. 1D, 1N, 1O). Hence, after act 223, but either before or after act 224, server 100 checks (see act 112 in FIG. 2B) whether any columns in any of tables (e.g. Table A or Table B in FIG. 2A) identified in a received query 206, 208 are not to be sent to client 170 in executing the received query, for any reason. One reason may be, if any columns, e.g. columns AI, AJ in Table A (see FIG. 2A) are not requested, e.g. by being not identified in a select clause of the query. Another reason may be, e.g. that one or more columns, e.g. columns BI, BJ in Table B (see FIG. 2A) are determined by server 100 as being inaccessible (or unauthorized, or not visible), if client 170 does not have access to them (e.g. due to access control). These are just two examples, of any number of reasons, why server 100 may determine (in act 112 in FIG. 2B) that certain columns, e.g. columns AI, AJ, BI, BJ in certain tables, e.g. tables A, B identified in query 206 are not to be sent to client 170.

When a result 234 (see FIG. 2B) of checking in act 112 is true, e.g. in response to query 206 (FIG. 2A), server 100 prepares (as per operation 130 in FIGS. 2B and 1A, 1K, 1L), in a database storage format (which is defined in definition 205 and related to storage in relational database 202), a redacted version 207 of rows identified by execution of query 206 from tables A, B. Prior to preparing redacted version 207 in the database storage format, server 100 checks, in act 111 whether the client that sent the query can parse a row in the database storage format, and if not then server 100 performs operation 120, but if yes then server 100 performs either operation 140 (if there are no columns not to be sent) or operation 130 (if there are one or more columns not to be sent).

Redacted version 207 (see FIG. 2A) may be prepared in operation 130 (FIGS. 2B and 1A, 1K, 1L) by server 100 redacting (e.g. by modifying or excising) from original rows 240 (see FIG. 2A), any columns AI, AJ, BI, BJ that are to not be sent. The discarding by server 100 may be performed by applying a specific redaction technique selected from among multiple redaction techniques, while maintaining unchanged the formatting of the remaining columns that are to be sent (e.g. columns A1 . . . AI−1, AI+1 . . . AJ−1, AJ+1 . . . AN, B1 . . . BI−1, BI+1 . . . BJ−1, BJ+1 . . . BZ in FIG. 2A), namely in the database storage format (and also maintaining a sequence of these columns in the storage order, relative to one another).

The just-described redaction of not-to-be-sent columns AI, AJ, BI, BJ (see FIG. 2A) may be performed by server 100 in any manner in operation 130 (FIGS. 2B and 1A, 1K, 1L), depending on the embodiment. In some embodiments described below in reference to FIG. 3A, server 100 may use in operation 130, at a selected granularity level, a specific redaction technique selected from a group of redaction techniques, e.g. to excise (or cut), or to mask or null or randomize, any to-be-not-sent columns from original rows 240 (FIG. 2A). On completion of operation 130, server 100 transmits (in act 131) to client 170, a redacted version 207 (see FIG. 2A) of rows, in the tables identified by query 206. In some embodiments, operation 130 is based on table-related statistics 235 which are stored in database 202 and updated in an act 134 (FIGS. 2B and 1C). Examples of table-related statistics 235, which may be used to select a granularity level in act 111 (which is performed within operation 130), include cardinality of the result set of the query, and/or number of rows and/or number of columns identified based on the query, and/or number of nulls in each column and/or average size of each column. In some embodiments, when the number of query-responsive rows is more than N1 (e.g. more than 5000 rows are responsive to the query, where N1=5000), the granularity may be programmed to default to intermediate level, and when this number is more than N2 (e.g. more than 500,000 rows, where N2=500,000) the granularity may be programmed to default to minimal level.

In operation 130, if there are no columns that can be sent, e.g. due to one or more columns being inaccessible to the client and remaining columns not being selected in the query, then in act 131, no rows are sent, and instead an error is returned to the client. Moreover, if the number of columns selected in a query is too small (e.g. 15% of the columns), server 100 may be configured to perform operation 120, wherein a column-processed version of each row is prepared for transmission of only those columns which are selected in the query.

Hence, operation 130 may be performed in some embodiments, to prepare a redacted version 207 of rows in the tables identified by query 206, even when the percent of total columns that are query-selected (e.g. see act 113 in FIG. 1O) is lower than prior-art thresholds thereon used previously to perform traditional row shipping. For example, even when less than 50% of columns in query-identified tables are selected, operation 130 is still performed in such embodiments, to prepare redacted rows in the server's database storage format, for transmission in act 131.

Act 134 to update statistics may be performed iteratively for each query, at any time after receipt of the query in act 223. However, in some embodiments act 134 to update statistics may be performed after server 100 transmits to a client, a result set of one or more rows. The result set of rows transmitted by server 100 in acts 131, 141 or 121 may be in a corresponding one of (1) redacted version 207 or (2) unredacted version 209 or (3) processed version 213 (after complete server-side processing of a query, by performing per-column processing in operation 120), as shown in FIG. 2B.

Another query 208 (see FIG. 2A) from client 170 may select all columns of a table, e.g. Table A (FIG. 2A). In this example, none of the columns in Table A are identified in server 100 as sensitive, e.g. because client 170 has access to all columns (e.g. allowed by access control). Hence, server 100 may find a result 234, obtained by checking (in act 112 in FIGS. 2B and 1C) in response to receipt of query 208, indicating that there are no "not-to-be-sent" columns in Table A, i.e. all columns A1 . . . AI . . . AJ . . . AN of Table A may be sent to client 170 in response to query 208. Thus, in response to query 208, server 100 prepares for transmission (as per operation 140 in FIG. 2B) in the server's database storage format, an unredacted version 209 of rows in the result set for query 208. Depending on the embodiment, operation 140 to prepare for transmission to client 170 may include, for example, adding a check sum, and/or compression and/or encryption of one or more original rows 240A (and 240B). Thus, server 100 transmits unredacted version 209 of the rows in the query's result set as per act 141 (see FIG. 2B) to client 170, in response to query 208 (see FIG. 2A).

In establishing a session, another client 160 (FIG. 2A) may send to server 100, information 211 indicating that client 160 is incapable of row format processing (see FIG. 2A), by use of server's database storage format. Hence, in act 221 (see FIG. 2B), server 100 which performs method 220 may receive information 211 (see FIG. 2A) indicating inability of client 160 to perform row format processing, due to inability to parse rows in the server's database storage format. Depending on the embodiment, inability of client 160 to parse rows in the server's database storage format may be determined by server 100, for example on receipt of an error code from client 160, or due to no response from client 160 (e.g. to maintain backward compatibility). Accordingly, in act 223 (see FIG. 2B), server 100 may receive from client 160 (FIG. 2A), a query 212 (which may be similar or identical to query 206). In this example, server 100 responds by preparing (see act 231 in FIG. 2B) a per-column processed version 213, of those rows which are responsive to query 212 (as specified in a predicate which may be, e.g. identified in a WHERE clause of query 212).

In the example described in the preceding paragraph above, in act 232 (see FIG. 2B), server 100 (see FIG. 2A) transmits to client 160, a per-column processed version 213 (see FIG. 2A), in a normal format of a response to a query (e.g. a SQL response format). Hence, a per-column processed version 213 transmitted by server 100 to client 160 (FIG. 2A) includes only to-be-sent columns (e.g. columns A1 . . . AI−1, AI+1 . . . AJ−1, AJ+1 . . . AN, B1 . . . BI−1, BI+1 . . . BJ−1, BJ+1 . . . BZ in FIG. 2A), which are obtained by server 100 performing per-column processing in act 231, in a normal manner. During per-column processing in act 231 (see FIG. 2B) to prepare version 213 (see FIG. 2A), server 100 disassembles each row retrieved into individual columns (e.g. columns A1 ... AN, and columns B1 ... BZ) of original rows 240 (e.g. by using metadata to extract length and value of each of columns AI and BI), followed by post-processing such as converting a data-type of a column, and/or retrieving data related to a column from another table and/or formatting a column's data, and/or performing an operation (e.g. arithmetic operation, by adding a constant 5) on a column's data and/or applying a function (such as a PL/SQL function) to a column's data, and/or ordering columns relative to one another (in a "query order"), as specified in query 212.

In preparing the per-column processed version 213, during a column's extraction, server 100 may additionally collate N pieces of a column's value if it is stored in corresponding N disk blocks (and/or similarly collate Z pieces of a row if it is stored in corresponding Z disk blocks). Such collation is necessary during a column's extraction (either at server 100 or at client 170 depending on the embodiment), when data of a row in server's database storage format is stored in multiple disk blocks (e.g. because the data does not fit within a single disk block). Depending on the embodiment, server 100 may additionally decompress a column's value if the value was stored in a compressed form. If the column is not selected in the query, its value can be redacted or sent as null without decompression in the second operation 34 in FIG. 1A.

The just-described per-column processing in server 100 in act 231 (see the preceding two paragraphs), to prepare version 213 of rows to be transmitted to client 160 in a result set responsive to query 212, increases computation load in server 100, relative to preparing redacted version 207 in act 229 (or to prepare an unredacted version 209 in act 227). Hence, operations 130 and 140 (see FIG. 2B) to prepare versions 207 and 209 transfer computation load, of per-column processing, from server 100 to client 170 (which as noted above, is identified in information 204, as being capable of per-column processing), while maintaining security of not-to-be-sent columns (by discarding them in operation 130, before transmission from server 100 in act 131).

As noted above, in certain embodiments of operation 130 (see FIG. 3A), server 100 which implements a relational database management system performs an act 111 (described briefly above in reference to FIG. 1N, 1O), to select and use a specific granularity level from among multiple granularity levels, e.g. 3 levels. In some embodiments, the multiple granularity levels used in act 111 (FIG. 3A) include (1) a minimal level granularity (e.g. table level) (2) an intermediate level of granularity (e.g. column level) and (3) a maximal level of granularity (e.g. row level). In a minimal level of granularity, a specific redaction technique selected in act 310 (described below in detail in reference to FIG. 3A) is applied identically to all rows of a table, e.g. all rows R1-RT of Table A in FIG. 2A. In an intermediate level of granularity, a specific redaction technique selected in act 111 (FIG. 3A) is applied to at least one to-be-not-sent column in all rows, e.g. column AI in all rows R1-RM of Table A (with another redaction technique selected for another not-to-be-sent column, e.g. column AJ in all rows R1-RM in Table A). In a maximal level of granularity, the specific redaction technique is individually selected by repeated performance of act 111, and applied in each cell, at each row-column intersection, of each not-to-be-sent column. For example, if column AI is not to be sent, then the specific redaction technique is individually selected for one cell 242 (FIG. 2A) in one iteration of act 310, at the intersection of row RI and column AI, while another such redaction technique is individually selected for another such cell in another iteration of act 310.

Hence server 100 may select (in act 310), a specific redaction technique from a group of redaction techniques, e.g. to excise (or cut), or to mask or null or randomize, any not-to-be-sent columns from original rows 240 (FIG. 2A). Specifically, in act 310, some embodiments of server 100 may perform steps 311 and 312 and optionally one or more of steps 313 and 314 (FIG. 3A) to determine multiple estimates of instructions required by respective multiple redaction techniques. This is followed by step 315, to select one of the multiple redaction techniques 340. Steps 311-315 are described next.

Specifically, in step 311 (FIG. 3A) server 100 prepares a first estimate 331 of a number of instructions that are required to perform a nulling redaction technique (in which one or more bytes of each column to be redacted are set to zero), on one or more not-to-be-sent columns of original row 240, to obtain a redacted version 207 of the row. In step 312, server 100 prepares a second estimate 332 of a number of instructions that are required to perform a masking redaction technique (in which existing bytes of each column to be redacted are changed by applying a masking function thereon), on one or more not-to-be-sent columns of original row 240, to obtain redacted version 207 of the row. In addition to estimates 331, 332, some embodiments may prepare a third estimate 333 by performing step 313. Specifically, in such embodiments, in step 313, server 100 prepares estimate 333 of a number of instructions required to perform an excising redaction technique, in which one or more row pieces to be sent is/are divided up into smaller row pieces, which on being combined with one another (e.g. by concatenation), omit each not-to-be-sent column from a redacted version of a row, e.g. as described below in reference to FIGS. 4A and 4B. Step 314 is performed similar to 313.

In some embodiments, after multiple estimates 331, 332 (and optionally estimates 333 and 334) are prepared, server 100 may go to step 315. In step 315, server 100 compares the multiple estimates 331, 332 (and estimates 333 and 334, if computed) to identify the lowest estimate, and this lowest estimate is used to identify a corresponding redaction technique (from among multiple redaction techniques 340) as a specific redaction technique that is selected, on completion of act 310 (FIG. 3A). In some embodiments of step 315, a redaction technique to be used on a column is identified as being selected, based partially or wholly on statistics related to a number of times each redaction technique is used to discard a column's value, in redacting at least a predetermined minimum number of rows responsive to the query. For example, if a specific redaction technique (e.g. nulling redaction technique 341) has been used to redact a specific column's value in more than 50% of the rows, step 315 may be configured in future iterations (based on additional statistics 351 illustrated in FIGS. 2B and 3A) to identify nulling as the technique selected to be used in redacting this specific column's value, and this selection of nulling is done without comparison of estimates 331-334. Alternatively, step 315 may compare the number of times of nulling 351N (FIG. 2B), number of times of excising 351E (FIG. 2B), number of times of masking 351M (FIG. 2B), and number of times of randomizing 351R (FIG. 2B) to one another, to identify a largest value among these numbers, and based on this identification, identify a redaction technique which is most frequently used as being selected, such as nulling redaction technique 341.

Estimates 330 (which include estimates 331-334, see FIG. 3A) may be stored for future use, e.g. (1) in a cursor of the current query, or (2) in a shared memory with the current query's other metadata, or (3) persisted in a table (also called "estimates table") in database 202. Storage of estimates 330 enables their re-use when the same or similar query is executed by server 100, e.g. on receipt of the same query from a different client, and/or receipt of a query with different bind values in the WHERE clause (which is otherwise identical to the query used to generate estimates 330). Examples of estimates 330, which may be used to select a redaction technique in act 310, include the CPU cost (e.g. in number of instructions) of performing each redaction technique. In certain first embodiments, estimates 330 are stored in the query's cursor. In certain second embodiments, estimates 330 are stored in shared memory (e.g. in a shared cursor) with metadata (e.g. privilege) of the query. In certain third embodiments, estimates 330 are stored in in an estimates table (which is independent of the cursor). Therefore, in certain embodiments, when a new query is processed but has different bind values in the WHERE clause, server 100 is programmed to use stored estimates 330 of an earlier query that is otherwise identical to the new query.

Two illustrative examples, of server 100 performing steps 311-313 (see FIG. 3A) in preparing estimates 331-333 for redacting a row, in one specific embodiment, are based on the following statistics. In a first example, an original row (which includes one or more columns to be redacted) has 100 columns, and values in columns 22 and 56 are to be discarded before the row (also called "current row") can be sent to client 170. In this specific embodiment, rows may be stored in database 202 as one or more row pieces, wherein no single row piece is allowed to be of a length so large as to span across a boundary of two adjacent disk blocks in database 202.

In the above-described first example, the size of column 22 is 8 bytes, and the size of column 56 is 14 bytes. Moreover, the average number of instructions required to perform a nulling redaction technique 341 on a cluster of columns, is 2 instructions per byte (for each byte in each column to be nulled). Although in some embodiments each byte in a column is set to 0 by a nulling redaction technique as just described, in other embodiments a nulling redaction technique may be implemented to set each to-be-nulled column to a single byte of value 0, regardless of the length of the column in the original row, in which case the number of instructions required to perform nulling is significantly lower, and independent of the length of each to-be-nulled column. A cluster constitutes columns that are not to be sent, and are sequential and co-located with one another, in a disk block on database 202. In this example, column 22 forms in a cluster of size 1 and column 56 forms another cluster of size 1. Hence, in step 311 (see FIG. 3A), server 100 prepares nulling estimate 331 in this first example=(8+14)*2=44 instructions.

In the above-described first example, the average number of instructions required to perform a masking redaction technique 342 (also called "scratch cost") is 3 instructions per byte (for each byte in each column to be masked). The cost can include one or more instructions to identify which redaction technique to use, and this identification can be based on various criteria including data-type of a column to be redacted. In some embodiments wherein table-related statistics 235 are maintained by server 100 in database 202, the percentage of columns that are null may be identified therefrom as 60% in this example. In some embodiments, columns which are null do not require execution of masking instructions. Hence, in step 312 (see FIG. 3A), server 100 prepares masking estimate 332 in this first example=(8+14) * 3 * 0.60=39.6 instructions. For the purpose of comparison with the just-described cost, in previous paragraph above, the cost for nulling can also be modified to be 44*0.6=26.4 instructions.

In some embodiments, an original row 240 (FIG. 2A) which is retrieved from database 202 (also called "retrieved row") may have been stored in a single block (also called "database block" or "disk block"). In this example, original row 240 has just a single row piece 410, which includes a header 411 (FIG. 4A) and data 412, although other original rows 240 may have multiple row pieces. In addition to header 411, original row 240 may, depending on the embodiment, additionally include a tail (not shown). In row piece 410 in the embodiment shown in FIG. 4A, data 412 is expressed in the database storage format and includes tuples of length and value (in pairs), in the form of a sequence of N cells that correspond to N columns A1-AN of original row 240 (which may be, for example, row RI in FIG. 2A). Specifically, each cell 242 of row RI (at column AI, see FIG. 2A), normally includes a length (in number of bytes) and a value (in bytes of the just-described length), although when the value is null the cell has only a length field, which is assigned a predetermined value, such as value FF (in hex) the cell has no byte for the value field (because the value is null).

In some embodiments, during act 224 (described above in reference to FIG. 2B), two or more existing row pieces (of the type described above, e.g. row piece 410) are retrieved from database 202 (e.g. from corresponding two tables A, B), in the form of retrieved rows 240. Hence, retrieved rows 240 may include an existing row 240A (FIG. 4A) retrieved from table A (and an existing row 240B (not shown) retrieved from table B). To redact columns AI and AJ from existing row 240A, server 100 may apply an excising redaction technique 343 to row 240A in performing operation 130 (e.g. by performing act 229A, which is illustratively shown by an arrow in FIG. 4A), which splits existing row piece 410 into three new row pieces 420, 430 and 440. Specifically, in operation 130, server 100 splits or divides up existing row piece 410 to (1) obtain a first new row piece 420 by retaining in data 422 only columns A1-AI−1 while removing column AI (thereby to discard AI's value), and (2) creates a second new row piece 430 to include in data 432 the columns AI+1-AJ−1 while removing column AJ (thereby to discard Ar s value), and (3) further creates a third new row piece 440 to include in data 442, the columns AJ+1-AN.

In addition to preparing data 422, 432 and 442 for row pieces 420, 430 and 440 (FIG. 4A) based on data 412 in row piece 410, when applying the excising redaction technique 343, server 100 may additionally update and/or create headers 421, 431 and 441. Specifically, in some embodiments, header 441 of row piece 440 is created to include one or more flags, such as a flag of value "L" to indicate that a current row piece is the last row piece in row 207A. Similarly, header 431 of row piece 430 is created to include a flag of value "P" to indicate that the current row piece is a continuation of a previous row piece in row 207A. And, header 421 of row piece 420 is updated (e.g. based on header 411 of row piece 410 in retrieved row 240A), to update a flag to value "N", to indicate that data of this row 207A continues in a next row piece 430.

The just-described flags in headers 421, 431 and 441 (FIG. 4A) constitute metadata which interrelate data 422, 432 and 442 of respective row pieces 420, 430 and 440 of row 207A. The just-described headers 421, 431, and 441 may include, depending on the embodiment, other such metadata which is appropriately updated and/or created as needed, to complete creation of new row pieces 420, 430 and 440, which when combined, form row 207A that is expressed in the server's database storage format and excludes not-to-be-sent columns AI and AJ. As discussed below in reference to FIG. 5A, these flags may also be set in headers of original row pieces (i.e. row pieces in database storage format), e.g. if a column CI in storage is already split across row pieces 510, 520 and 530.

Hence, on excising retrieved row 240A, on completion of act 229A, server 100 obtains redacted row 207A, which includes the three new row pieces 420, 430 and 440 (FIG. 4A). Server 100 may similarly redact row 240B (not shown) retrieved from table B, by applying just-described excising redaction technique 343 to row 240B in performing act 229 (e.g. by performing act 229B shown in FIG. 4B). Specifically, act 229B splits row piece 450 in row 240B, to create the new row pieces 470, 480 and 490 in row 207B. Row 207B, which is formed by combination of row pieces 470, 480 and 490, excludes columns BI and BJ on performance of 229B.

Redacted rows 207A and 207B shown in FIGS. 4A and 4B respectively, are redacted versions of corresponding rows 240A and 240B retrieved from respective tables A and B (FIG. 2A), as responsive to query 206. Hence, rows 207A and 207B are concatenated by server 100, to form a query-responsive row 207 (FIG. 4C), which is then transmitted by server 100 to client 170. Row 207 of FIG. 4C is expressed in the database storage format, and omits not-to-be-sent columns AI, AJ, BI and BJ. In other embodiments, other redaction techniques 360 may modify (instead of omit) not-to-be-sent columns AI, AJ, BI and BJ, in preparing a similar row for transmission to client 170, as shown in FIGS. 4D, 4E and 4F, and described next.

FIG. 4D illustrates an act 229M in which a masking redaction technique 342 (FIG. 3A) is applied to original row 240A (described above), to prepare redacted row 207M which includes in partially masked data 412M, at least masked values 242M and 243M, that replace corresponding original values 242 and 243 of columns AI and AJ in original row 240A (thereby to discard values 242 and 243). Note that lengths of columns AI and AJ in row piece 413 in redacted row 207M are identical to corresponding lengths of these same columns AI and AJ in row piece 410 in row 240A.

As columns AI and AJ are the only columns that are masked by application of masking redaction technique 342, data 412M of row piece 413 (FIG. 4D) includes, in addition to masked values 242M and 243M, the rest of the original values in data 412 e.g. original values of columns A1, A2 ... AI−1, AI+1 ... AJ−1, and AJ+1 ... AN (see FIG. 4A) that are kept unchanged in data 412M of redacted row 207M (FIG. 4D). Also, all the lengths of columns A1-AN in data 412 are unchanged (and identical) in data 412M (FIG. 4D). Hence data 412M is also referred to herein, as partially-masked data. Moreover, header 411 in row piece 413 of redacted row 207M is identical to header 411 in row piece 410 in original row 240A.

In some embodiments, masking redaction technique 342 is implemented to generate masked values 242M and 243M from corresponding original values 242 and 243 by use of a function, or alternatively by a predetermined mapping therebetween. In certain embodiments, exactly how each of original values 242 and 243 are mapped by masking redaction technique 342 to corresponding masked values 242M and 243M may be specified by a user, e.g. in a table in database 202 (also called "configuration table"). For example, if value 242 is a date, which includes three values concatenated with one another, including a first value of day, a second value of month, and a third value of year, these three original values in original row 240A may be replaced by masking redaction technique 342 to corresponding three new values, which may be preset by a user to, for example, 01 as the new value of day, 01 as the new value of month, and 01 as the new value of year, which when concatenated together from the new value 242M. In the just-described example, a snooper who sees the new value 242M may know based on general knowledge that the original value 242 has been replaced, because the date 01/01/01 is too old to be meaningful (depending on the application and the field, e.g. if the field is the birthdate of an employee). In certain embodiments, masking redaction technique 342 implements a one-way hash function to generate masked values 242M and 243M from corresponding original values 242 and 243. The one-way hash function prevents a snooper from determining the original values 242 and 243 based on masked values 242M and 243M (which may be obtained by the snooper, from a result set of redacted rows transmitted by server 100, in response to a query).

FIG. 4E illustrates an act 229N in which a nulling redaction technique 341 is applied to original row 240A (described above), to prepare redacted row 207N which includes nulled values 242N and 243N, that replace corresponding values 242 and 243 of columns AI and AJ in original row 240A (thereby to discard values 242 and 243). Lengths of columns AI and AJ in row piece 414 in redacted row 207N are identical to corresponding lengths of these same columns AI and AJ in row piece 410 in row 240A. Moreover, header 411 in row piece 413 of redacted row 207N is identical to header 411 in row piece 410 in original row 240A.

Similarly, FIG. 4F illustrates an act 229N in which a randomizing redaction technique 344 is applied to original row 240A (described above), to prepare redacted row 207F which includes randomized values 242R and 243R, that replace corresponding values 242 and 243 of columns AI and AJ in original row 240A (thereby to discard values 242 and 243). Lengths of columns AI and AJ in row piece 414 in redacted row 207R are identical to corresponding lengths of these same columns AI and AJ in row piece 410 in row 240A. Moreover, header 411 in row piece 413 of redacted row 207R is identical to header 411 in row piece 410 in original row 240A.

In some embodiments, randomizing redaction technique 344 is implemented to generate randomized values 242R and 243R from corresponding original values 242 and 243 by use of a randomizing function that selects a new value 242R from within a range of predetermined valid values. The range of predetermined valid values may be preset by the user or database administrator to real values if he/she believes it may prevent a snooper from immediately knowing (based on general knowledge) that the original value 242 has been altered. For example, if value 242 is a first name of an employee, the randomized value 242R may be selected from within a range of predetermined valid values of employee names. Therefore, if the value 242 is "Jay", randomizing redaction technique 344 may use "Peter" as the new value 242R selected at random from among a list of first names of employees which occur in the query-identified table. Similarly, if the value 243 is "John", randomizing redaction technique 344 may use "Steve" as the new value 243R selected at random from among this same list of first names. A snooper who sees the names "Peter" and "Steve" as the values 242R and 243R would be misled into believing that these values are not altered, when in reality they are changed from the original values 242 and 243 (in this example, "Jay" and "John"). Thus, randomizing redaction technique 344 as just described is a type of masking, to prevent a snooper from knowing that one or more values, in a result set of rows returned by server 100, are altered.

Although, original rows 240A and 240B illustrated in in FIGS. 4A and 4B require only a single row piece to store their data in database 202, specifically the respective row pieces 410 and 450, other original rows in storage in database 202 may need to store their data in multiple row pieces, e.g. when data of all columns of a row (or even data of a single column within a row) does not fit into a database block, as illustrated in FIGS. 5A and 5B (described below).

In the above-described first example of preparing estimates 331-333 (shown in FIG. 3A) for redacting a row, the average cost of creating a new row piece (e.g. by including one or more columns of the current row piece in the new row piece, and updating metadata of the current row piece) is 35 instructions per new piece, wherein 20 instructions are required to create a new header, and 15 instruction are required for updating lengths in a retrieved row piece's header. For example, excising a column reduces the length of the row piece, hence its header is updated when performing excising redaction technique 343. In this example, as two columns 22 and 56 are to be redacted, hence two new pieces need to be created, by excising redaction technique 343. Thus, excising estimate 333 in this first example=2*35=70 instructions.

There may be certain data types of columns such as user defined types where the cost of randomizing function or masking function may be more expensive than the costing of nulling the columns not selected in the query.

Accordingly, in step 315, the above-described values of two or more of estimates 331, 332, 333 and 334 (whichever are prepared in steps 311-314) are compared to one another to identify the least estimate, which in this first example is masking estimate 332 (which is 26.4 instructions) and hence, masking redaction technique 342 (FIG. 3A) is identified as the specific redaction technique (which has the lowest estimate) at the end of act 310.

In the above-described first example, instead of using a first nulling redaction technique (described above), which sets each byte to be nulled to the value 00 as described above, a second nulling redaction technique creates new metadata for a column to be nulled which requires 20 instructions and updates size in the header (e.g. to value FF, as described above), which requires 2 instructions. Hence, nulling of columns 22 and 56 requires creation of two new metadata (for these two columns), and two updates, so the nulling estimate=20*2+2*2=44 instructions. Note that as this nulling estimate happens to be exactly same as the above-described nulling estimate, masking redaction technique 342 (FIG. 3A) is still identified as the specific redaction technique (which has the lowest estimate) at the end of act 310. In another embodiment, the size of row piece is not included in the header of the row piece, and the header is followed by (length, value) pairs of columns. In this embodiment, there is zero cost to update the header (as no metadata needs to be created), and hence in the above-described example the nulling estimate=0*2+2*2=4 instructions. This is an example of in-line row piece transformation.

The comparison to choose the redaction technique used the computation load. In some embodiments, the comparison to choose the redaction technique can include usage of other resources such as I/O resources in selecting one or more redaction techniques.

A randomizing redaction technique may include (in addition to using the above-described excising redaction technique), setting a column being nulled to a random value instead of a null value, in which case the nulling estimate 331 is increased by the number of instructions to create the random value of the column, e.g. 15 instructions per column. The randomizing redaction technique may send a random value instead of a null value, to deceive a "man-in-the-middle" snooper.

In a second example, an original row to be redacted has 100 columns, and this row is split into two row pieces, with columns 1-40 in a first row piece, and columns 41-100 in a second row piece. In this second example, columns 22, 56 and 87-98 are to be redacted before the row (also called "current row") can be sent to client 170. In this second example, the size of column 22 is 8 bytes, and the size of column 56 is 14 bytes, and the average size of columns 87-98 is 20 bytes.

In the above-described second example, the average number of instructions to perform the above-described second nulling redaction technique 341, requires instructions to null column 22 (which forms in a first cluster of size 1), instructions to null column 56 (which forms a second cluster of size 1), and instructions to null columns 87-97 (which forms a third cluster of size 12). Hence, nulling estimate 331 in this second example (based on the above-described second nulling redaction technique) is 20*2*1+20*2*1+20*2*12=88 instructions. Preparation of this estimate is based on the instructions being 20 for metadata creation, and 2 for updating size with the value FF, as noted above. Moreover, in the above-described second example, as three clusters are to be redacted, use of excising redaction technique 343 requires three new pieces need to be created. Thus, excising estimate 333 in this second example=3*35=205 instructions. Furthermore, in the above-described second example, the number of bytes to be masked=8+14+11*20, or 242, so masking estimate 332=242*2 instructions/byte*0.6 (percentage of nulls)=314 instructions.

Accordingly, in step 315 (FIG. 3A), the above-described values of estimates 331, 332, 333 (and 334 if prepared) are compared to identify the least estimate, which in this second example is nulling estimate 331(which is 88 instructions) and hence, nulling redaction technique 341, is identified as the specific redaction technique (which has the lowest estimate) at the end of act 310.

A specific redaction technique, which may be selected in act 310 (e.g. as described in any of the above examples) is applied in act 113 (FIG. 3A). In several embodiments, in act 111, using statistics 352 and other parameters, such as previous granularity level 353, count 355 of executions of query 206 at the previous granularity level, and a limit 356 on the count of query executions whose statistics are to be stored, a current level of granularity is automatically selected in act 111 (FIG. 3A), from among multiple levels of granularity. In some embodiments, the just-described limit 356 is computed (e.g. in act 111), as a function of computation load in server 100. Depending on the embodiment, statistics 352 which are used in granularity selection may be related to data in tables identified in the query 206 (e.g. number of columns and number of rows), and/or statistics recorded during execution of query 206 in one or more prior iterations. Subsequently in act 113 (FIG. 3A), a specific redaction technique (e.g. technique 342), which is selected in step 315 is applied, at a granularity level selected in act 111.

Examples of table-related statistics 235 (FIG. 2B) which may be used in act 310 as described above include one or more of: percentage of nulls, size of clusters of columns in user issued query, average size of columns, scratch cost per byte, number of instructions for metadata creation, etc. Examples of additional statistics 351 (FIG. 3A) which may be additionally used in act 310 include number of rows redacted by excising, number of rows redacted by masking and number of rows redacted by nulling, as discussed below. In certain embodiments, additional statistics 351 (FIG. 2B) used in act 111 and/or act 112 to select a specific redaction technique and/or a granularity level include number of times nulling has been used, number of times excising has been used, number of times masking has been used, and number of times randomizing has been used, and these numbers may be maintained on a per-column basis and/or on a per-query basis, depending on the granularity level and/or depending on the embodiment. For example, when a specific redaction technique (such as nulling) is used to redact a specific column in more than 50% of rows at the maximum granularity level, server 100 of some embodiments may be programmed to simply use this specific redaction technique to redact this column in future iterations, without computing and comparing multiple estimates of corresponding multiple redaction techniques applicable thereto (without performing, for example, steps 311-313 described above).

An original row 240C as stored in database 202 may include a column, e.g. column CI (FIG. 5A), whose data does not fit within a single database block (and also does not fit within a single row piece). Specifically, in an example row 240C, which is expressed in database storage format as shown in FIG. 5A, the data of column CI is stored in three parts, wherein a first part of column CI is stored at the end of data 512 of row piece 510, a second part of column CI is stored in data 522 of row piece 520, and a third part of column CI is stored in the beginning of data 532 of row piece 530. In response to a query, if column CI is a not-to-be-sent column, then server 100 may perform act 229C on row 240C (FIG. 5A), to implement excising redaction technique 343 (FIG. 3A), resulting in redacted row 501 which includes only two row pieces 540 and 550. Row piece 540 is obtained as follows: header 511 may be updated if necessary to obtain header 541 (e.g. by updating one or more flags), which excludes any reference to column CI, and data 512 is updated to obtain data 542, e.g. by omitting the length of the first part of column CI and the value of the first part of column CI. Similarly, row piece 550 is obtained as follows: header 531 is updated if necessary to obtain header 551 (e.g. by updating one or more flags), which excludes any reference to column CI, and data 532 is updated to obtain data 552 by omitting the length of the last part of column CI and the value of the last part of column CI. In some embodiments, headers 511 and 531 may include corresponding sizes of the row pieces, and these sizes are updated to obtain the corresponding headers 541 and 551. Including a row piece's size in the header has the advantage of being useable by client 170 (e.g. in act 175 in FIG. 1G) as a checksum to confirm proper receipt of the row piece via a network, from server 100.

In another embodiment, if column C2 was not selected in query and to be excised, the row piece 510 could be divided into two row pieces one containing column C1, and other containing columns C3 to CI-1. If Column CI was selected in query, the second row piece would include column C3 to CI. In this embodiment, the number of row pieces increases.

Instead of performing act 229C, some embodiments of server 100 may perform an alternative act 229D (FIG. 5B) to implement a masking redaction technique 342 (FIG. 3A), resulting in redacted row 502 which includes row pieces 560, 570 and 580 that are obtained by masking corresponding row pieces 510, 520 and 530 of original row 240C. Specifically, each value of column CI in original row 240C is masked to obtain a corresponding masked value in redacted row 502. For example, as illustrated in FIG. 5B, masked value 513M of a first part of column CI in row piece 560 is obtained by masking an original value 513A of the first part of column CI in row piece 510. Similarly, masked value 523M of a Jth part of column CI in row piece 570 is obtained by masking an original value 523J of the Jth part of column CI in row piece 520. And masked value 533M of a Nth part of column CI in row piece 570 is obtained by masking an original value 533N of the Nth part of column CI in row piece 530. Other than the just-described changes, at the end of performing act 229C in some embodiments, the rest of the information in redacted row 502 (FIG. 5B) may be identical to corresponding information in original row 240C, as stored in database 202.

FIG. 5C illustrates an original row 240C being redacted by application of a combination redaction technique, which includes modifying a portion of the data in column CJ which is being redacted (by setting the length of CJ to zero) and excising another portion of the data in column CJ which is being redacted by excising the value of CJ (thereby to discard this value). Hence, in this example, server 100 transmits data 535 of row piece 590 in redacted row 503 to client 170 (FIG. 2A), in addition to transmitting thereto, row pieces 560 and 570 (in redacted row 503). In the example shown in FIG. 5C server 100 transmits a multi-piece column C4, after redaction of a single-piece column CJ (by use of a combination redaction technique). In contrast, in the example shown in FIG. 5A, the server 100 redacts multi-piece column CI which is not transmitted due to use of an excising technique thereon. As noted elsewhere herein, which particular column CI or CJ is redacted by server 100 depends on several reasons for not sending the column (e.g. client is not authorized to receive the column and/or the column is not selected in the query).

Original row 240C as stored in database 202 in which column CI (FIG. 5A) is stored in three parts as described above, is excised in some embodiments as shown in FIG. 5D if in response to a query, column CI is a not-to-be-sent column. Server 100 may perform act 229F on row 240C (FIG. 5D), to implement an alternative embodiment of excising redaction technique 343, resulting in redacted row 592 which includes the same number of row pieces, namely row pieces 560, 570 and 580 (FIG. 5D). Row piece 560 is obtained as follows: header 511 is unchanged, as it excludes any reference to column CI, and data 512 is updated to obtain data 512E, which includes length 561 of the first part of column CI set to 1, and value 562 of the first part of column CI set to 0. Similarly, row pieces 570 and 580 are obtained by setting to 0, the lengths 571 and 581 of the Jth part and the last part of column CI and by setting to 0 the values 572 and 582 of the Jth part and last part of column CI. A variant of the just-described alternative embodiment may set the lengths 561, 571 and 581 to 0, and omit the values 562, 572 and 582 (see FIG. 5D). Another alternative embodiment of the excising redaction technique 343 is shown in FIG. 5E, wherein row 593 is obtained by server 100 performing act 229G on original row 240C, resulting in redacted row 593. Row 593 includes an excised row piece 595 obtained by setting to 0, length 594 of column CI, omitting the value of column CI, and updating header 511 to point to row piece 550 to obtain header 596. Row piece 550 is obtained by omitting from data 552, the length of the Nth part of CI and the value of the Nth part of CI, e.g. as described above in reference to FIG. 5A.

In some embodiments, a server 100 that performs method 220 may execute a procedure 610 (FIG. 6A) to implement act 111 of FIG. 3A (described above), at which to apply a specific redaction technique. Specifically, in acts 611 and 612, server 100 tests the current computation load (e.g. due to other processes and/or threads in server 100 and/or other software executed by server 100), to determine a granularity level. More specifically, in act 611, server 100 checks if the computation load is greater than a first limit L1, which may be, for example, 60%. When the result of checking in act 611 is true, server 100 goes to act 617, in which the minimal level of granularity is selected.

Hence, in act 617, server 100 applies a specific redaction technique which is selected in act 310 in common to all original rows 240 (FIG. 2A) retrieved from one or more tables A, B identified in the query, specifically to redact all not-to-be-sent columns, e.g. columns AI, AJ, BI and BJ in FIG. 2A. The selected redaction technique which is applied in act 617 (FIG. 6A) may, for example, modify all not-to-be-sent columns in all rows identically, e.g. by masking them if masking was selected in a previous performance of act 310 (specifically, if masking was previously determined in act 310, to require the lowest estimated number of instructions, among multiple redaction techniques).

Thereafter, server 100 returns to act 611. In act 611, if the answer is no, server 100 goes to act 612, to check if the computation load is greater than a second limit L2, which may be, for example, 40%. When the result of checking in act 611 is true, server 100 goes to act 614, in which the intermediate level of granularity is selected. Hence, in act 614, server 100 applies a specific redaction technique (e.g. masking) which was selected previously (e.g. in act 310 of FIG. 3A, or in an earlier performance of act 310A or 310B of FIG. 6A), to redact a single not-to-be-sent column (e.g. column AI in FIG. 2A) in all original rows 240 to be sent in response to the query. If there are one or more additional not-to-be-sent columns, they are similarly redacted in act 614 (or on its repetition, depending on the embodiment), by application of one or more redaction techniques respectively, to all original rows 240. After applying the specific redaction techniques, server 100 updates one or more statistics, e.g. the number of times each specific redaction technique has been applied in the current table and/or to retrieved rows 240 of the current query. After act 614, server 100 goes to act 615A to check if the number of times that query has been executed a predetermined limit M (e.g. 500 times), and if the answer is no, server 100 selects a redaction technique (as per act 112A in FIG. 6A, implemented identical to act 112 in FIG. 3A described above) and goes to act 618A. In act 618A, server 100 checks if all rows and columns responsive to the query have been processed and if the answer is no, then server 100 returns to act 611, to iteratively redact any other not-to-be-sent columns in a current row, e.g. column AJ in row RI of table A, or to redact one or more columns in to-be-sent rows.

In some embodiments, in act 615A of checking on whether a query has been executed M times, server 100 may be additionally or alternatively programmed to check whether a predetermined amount of time has passed, e.g. whether 10 minutes have passed, since the last time act 615A was performed.

In the intermediate level of granularity applied on act 614, a first redaction technique (e.g. masking) which is applied to a cell 242 in a first not-to-be-sent column AI of row RI is also identically applied to another cell 243 (FIG. 2A) in the first not-to-be-sent column AI of another row RJ. Similarly, a second redaction technique (e.g. nulling) which is applied to a cell 244 in a second not-to-be-sent column AJ of row RI is also identically applied to a cell 245 (FIG. 2A) in the second not-to-be-sent column AJ of another row RJ.

If the answer in act 615A is yes (because the query has been already executed M times), then server 100 goes to act 615B to check if data in the table has been modified and/or if metadata of the table has been modified (depending on the embodiment). In act 615B, if the answer is yes then server 100 goes to act 310A in which the redaction technique is again selected (because a previously selected technique may be no longer applicable). Specifically, in act 615B, server 100 may check if an indicator of alteration of the table satisfies a preset limit thereon. The just-described alteration indicator may be computed, for example, as a difference between a previous data version number V1 of the table (at which a redaction technique currently in use was selected), and a current data version number V2 of the same table (identified in the query's select clause), and the preset limit on the difference may be, e.g. 100. In such embodiments, server 100 increments the current data version number of the table, each time that any change is made, to the table's data. Depending on the embodiment, in act 615B, server 100 may alternatively or additionally check on another alteration indicator, e.g. whether a metadata version number MV1 of the table (at which the currently-in-use redaction technique was selected) differs from a current metadata version number MV2 of the same table, by a metadata change threshold, e.g. 0 or 1. In the example of the metadata change threshold being zero, the redaction technique is reselected each time that the definition of the table is changed (by execution of any DDL statement thereon, by server 100).

In certain implementations of act 615B, instead of (or in addition to) using alteration indicator, server 100 may be programmed to check whether any DDL statement has been executed on any table identified in the query (to add or drop one or more columns), and if so then the test is satisfied and the answer in act 615B is yes. Depending on the embodiment, server 100 may be programmed to check in act 615B, whether more than a predetermined percentage (e.g. X %) of rows are modified by execution of DML statements and/or whether a predetermined number (e.g. Y number) DML statements have been executed. One example of X % is 20% and one example of Y number of DMLs is 1000. In some embodiments, server 100 may be programmed to check on both these conditions (check on both X % of rows and Y number of DML statements), which may be in addition to server 100 checking on whether even a single DDL statement has been executed. In some embodiments, when the answer in act 615B is yes (due to alteration of any table identified in the query), additional statistics 351 related to number of times one or more redaction techniques are used, to redact rows responsive to the query, by discarding values of one more columns not selected in the query, are initialized to zero.

If the answer in act 615B is no, then server 100 goes to act 616 to check if a threshold T (e.g. 50%) is exceeded by a number of times that a specific redaction technique was previously used to redact one or more columns in this query (e.g. relative to a total number of times redaction was performed on retrieved rows 240 for this query). If the answer in act 616 is yes, then server 100 goes to act 617 (described above). If the answer in act 616 is no, then server 100 goes to act 310B in FIG. 6A to select a redaction technique (implemented identical to act 310 in FIG. 3A described above), and then returns to act 611. If in act 612, the answer is no, then server 100 goes to act 613, in which the maximum level of granularity is selected.

In an illustrative example, while performing act 616 at an intermediate level of granularity, if server 100 finds that a specific redaction technique (e.g. masking) is used more than a predetermined percent (e.g. 50%) of the times, then act 617 may be programmed to select minimum granularity for application of this specific redaction technique (e.g. masking is to be used to redact all the remaining not-to-be-sent columns).

In act 613, server 100 applies a specific redaction technique (e.g. masking) which was selected previously (e.g. in act 310 of FIG. 3A, or in an earlier performance of act 310A or act 310B of FIG. 6A), to redact a single not-to-be-sent cell (e.g. cell 242 at the intersection of column AI and row RI in FIG. 2A). After act 613, server 100 goes to act 310B to select a redaction technique and goes to act 618B. In act 618B, server 100 checks if all rows and columns responsive to the query have been processed and if the answer is no, then server 100 returns to act 611, to iteratively redact any other not-to-be-sent cell in a current row, e.g. cell at the intersection of column AJ in row RI (or if already redacted, a cell at column BI in row SI of table B), see FIG. 2A. Hence, by performing act 613, the redaction techniques applied to other not-to-be-sent CELLS (e.g. cells at row-column intersections RI-AJ, RJ-AI, RJ-AJ, SI-BI and SI-BJ in FIG. 2A) are selected by performance of act 310 of FIG. 3A or act 310A of FIG. 6A or act 310B of FIG. 6A a corresponding number of times, i.e. selected individually, for each cell to redact, in retrieved rows 240.

At the intermediate granularity level, multiple redaction techniques may be applied to respective multiple columns by server 100, to redact all the rows responsive to a query, when there is no change in granularity level during query execution. Depending on the query, granularity level during query execution may change at the end of redacting a block (or group) of rows (e.g. 5000 rows) responsive to a query, when multiple blocks (or multiple groups) of query-responsive rows (e.g. 200 blocks, if the result set has 1 million rows) are being redacted, e.g. during corresponding multiple iterations of acts 614, 615A and 618A (followed by returning to act 614 via acts 611 and 612), as described above. At each such iteration, server 100 may change the above-described correspondence (used in each block of rows), between multiple redaction techniques and respective multiple columns. For example, if server 100 changes granularity level from intermediate granularity to minimum granularity at the end of processing a block of rows, in the next block of rows a single common redaction technique may be applied to all the multiple columns. As another example, if server 100 changes granularity level from intermediate granularity to maximum granularity at the end of a block of rows, in redacting the next block of rows the redaction technique used may be individually selected for each column's value in each row.

When all rows responsive to a query have been processed, the answer in acts 618A and 618B is yes, hence preparation of rows in storage format containing only query-selected columns in procedure 610 ends. In embodiments wherein procedure 610 implements acts 111-113 (see FIGS. 3A and 3B), on completion of procedure 610, an act 230 may be performed in some embodiments, to transmit redacted rows, as described above in reference to FIG. 2B.

In certain embodiments, client 170 which is capable of receiving and processing redacted rows in database storage format is programmed to identify a specific redaction technique used to redact a row 207, as being excising redaction technique 343. Use of excising redaction technique 343 may be identified in client 170, e.g. when the number of columns received in a redacted row 207 is identical to the number of columns in the select clause of query 206. When the redaction technique used is excising redaction technique 343, client 170 does not process one or more columns (e.g. columns AI, AJ, BI and BJ of Tables A and B) which are not identified in the select clause of query 206. Lack of need for client 170 to process such not-to-be-sent columns reduces processing load on client 170 (from which the query is received). Hence, in several such embodiments, an estimate of a size of reduction in processing load at client 170 (due to not processing the one or more not to be sent columns) is used to reduce or offset an estimate of the number of server instructions required to perform a corresponding redaction technique, as illustrated by step 313C (e.g. performed in a relational database management system, which is implemented by server 100), as illustrated in FIG. 3B.

Specifically, in the above-described second example, an estimate to perform an excising redaction technique 343 is reduced from 35 to 25 instructions, wherein the savings from not processing not-to-be-sent columns is estimated to be 10 instructions (at client 170). Thus the excising estimate 333C is 3*25=75 instructions. In this example, estimates 331C and 332C (FIG. 3B) for performing nulling redaction technique 341 and masking redaction technique 342 in the server 100 are unchanged by savings from reduced client load (and thus identical to estimates 331 and 332 discussed above in reference to FIG. 3A), because client 170 simply drops any columns not in the query's select clause. Accordingly, in step 315 (FIG. 3B), the above-described values of estimates 331C, 332C and 333C are compared to identify the least estimate, which in this revised second example is excising estimate 331C (because it is just 75 instructions). Hence, excising redaction technique 343 is identified as the specific redaction technique (as having the lowest estimate), at the end of act 310 in FIG. 3B.

Although in some embodiments, a level of granularity, at which a redaction technique is applied is selected as shown in FIG. 6A normally, in other embodiments the level of granularity may be increased if client 170 (from which query 206 is received as shown in FIG. 2A) provides to server 100, certain indicators to increase granularity. Two examples of granularity increase indicators include (1) privilege of client 170 (or user within client 170) or (2) latency of the client 170 (e.g. based on past latency measurements therein), which are illustrated in FIGS. 6B and 6C and described next. In certain embodiments, when the result of checking in act 611 is true, instead of server 100 selecting minimum granularity in act 617 (as shown in FIG. 6A), server 100 checks a granularity increase indicator in acts 622, 632 (see FIGS. 6B, 6C), and depending on the outcome of this checking, server 100 performs either act 614 (to select intermediate granularity), or act 617 (to select minimum granularity), followed by checking if all data responsive to the query has been processed (in act 618A or act 618B) and if the answer is no, returns to act 611. Moreover, when the result of checking in act 612 is true, instead of server 100 selecting intermediate granularity in act 614 (as shown in FIG. 6A), server 100 checks the granularity increase indicator in acts 621, 631 (see FIGS. 6B, 6C), and depending on the outcome of this checking, server 100 performs either act 613 (to select maximum granularity), or act 614 (to select intermediate granularity).

Specifically, in the embodiment shown in FIG. 6B, in act 622, server 100 checks if the client 170 has high privilege.

If the answer is yes, server 100 goes to act 614 (from act 622), but if the answer is no server 100 goes to act 617 (from act 622). Hence, when computation load in server 100 is >L1, server 100 selects intermediate granularity for high-privileged clients (in act 614), although server 100 selects minimum granularity for normal privileged clients (in act 617). Also in the embodiment shown in FIG. 6B, in act 621, server 100 checks if the client 170 has high privilege. If the answer is yes, server 100 goes to act 613 (from act 621), but if the answer is no server 100 goes to act 614 (from act 621). Hence, when computation load in server 100 is >L2, server 100 selects maximum granularity for high-privileged clients (in act 613), although server 100 selects intermediate granularity for normal privileged clients (in act 614).

Moreover, in the embodiment shown in FIG. 6C, in act 632, server 100 checks if information 204 received from the client 170 (e.g. latency measurements of past query responses) meet a test (e.g. a preset limit on latency is exceeded) which indicates that client 170 has seen high latency (or high response times) of queries. This test (also called "optimization test") being satisfied by information 204 from client 170 indicates that client 170 has high latency (e.g. checked in act 631 in FIG. 6C) and better optimization is needed by server 100, in executing the query from this client 170. Some embodiments of the optimization test are performed by server 100 without information from client 170, specifically by internally comparing CPU cost of responding to a query to another preset limit thereon. Moreover, instead of using response time (or alternatively CPU cost) in the optimization test, other embodiments may compute a difference between a response time (or CPU cost) of responding to a query and a baseline value, followed by comparing this difference to another preset limit thereon. In the just-described optimization test, the baseline value may be generated in some embodiments, by measuring latency of server 100's response (or alternatively CPU cost) to the same query, when the response is expressed in SQL response format (i.e. difference between time to respond in SQL response format and time to respond in database storage format).

If the answer is yes, server 100 goes to act 614 (from act 632), but if the answer is no server 100 goes to act 617 (from act 632). Hence, when computation load in server 100 is >L1, server 100 selects intermediate granularity for high-latency clients (in act 614), although server 100 selects minimum granularity for normal latency clients (in act 617). Also in the embodiment shown in FIG. 6C, in act 631, server 100 checks if the client 170 has high latency. If the answer is yes, server 100 goes to act 613 (from act 621), but if the answer is no server 100 goes to act 614 (from act 631). Hence, when computation load in server 100 is >L2, server 100 selects maximum granularity for high-latency clients (in act 613), although server 100 selects intermediate granularity for normal latency clients (in act 614).

Although a certain illustrative sequence of acts are shown in FIGS. 6A-6C described above, other sequences may be used in other embodiments. Hence, in several embodiments, server 100 selects from among multiple redaction techniques, a specific redaction technique, and server 100 selects from among several levels of granularity, a current level of granularity. The just-described two selections are performed in different sequence relative to one another, in different embodiments. Moreover, depending on the embodiment, the just-described two selections may be performed before or after receipt of a query whose response is prepared by using these selections. Specifically, in the some embodiments, server 100 uses the selected specific redaction technique at the selected current level of granularity (i.e. the two selections) to redact one or more not-to-be-sent columns in original rows stored in an object in a database storage format that are responsive to the query, such as a table in a relational database, after performing the two selections.

As noted earlier above in reference to FIGS. 6A-6C, the several levels of granularity in the immediately preceding paragraph above may include a minimal level of granularity, wherein the specific redaction technique is applicable to all cells of the object, an intermediate level of granularity, wherein the specific redaction technique is applicable to at least a first column in each row of the object and another redaction technique is applicable to at least a second column in said each row, and a maximal level of granularity, wherein the specific redaction technique is selected for application to only one cell in the object. Accordingly, server 100 prepares and transmits, in the storage format in which the object is stored in one or more storage devices, a redacted version of a row identified in response to the query, by use of the selected specific redaction technique at the selected current level of granularity.

Depending on the embodiment, any or all of server 100 and clients 160, 170 which perform one or more acts or steps described above in reference to FIGS. 1A-1D, 1K, 1L, 1M, 1N, 1O, 1P, 2B, 3A, 3B, 6A, 6B and 6C, may be implemented in a system 1000, described below as a "cloud". Cloud 1000 (FIG. 7A) of some embodiments includes a pool of resources including, for example, a relational database management system (RDBMS) executing in one or more processors 1105 of server 100. Examples of additional resources 1030 which may be included in the pool are processor, server, data storage, virtual machine (VM), platform, and/or other software applications. The pool of resources in cloud 1000 may be geographically centralized and/or distributed. As an example, the pool of resources in cloud 1000 may be located at one or more datacenters.

Client devices 1010 outside cloud 1000 may independently request resources in the form of computing services, such as CPU time (e.g. in processors 1105 in computers 160, 170) and storage (e.g. in disks 1110 used by database 202 in computer 100), as needed. The just-described resources 1105, 1110 and additional resources 1130 may be dynamically assigned by server computer 100 to the requests and/or client devices 1010 on an on-demand basis. One or more resources 1105, 1110 and 1130 which are assigned to each particular client device 1010 may be scaled up or down based on the services requested by the particular client device. The resources 1105, 1110 and 1130 assigned to each particular client device 1010 may also be scaled up or down based on the aggregated demand for computing services requested by all client devices 1010. In an embodiment, the resources 1105, 1110 and 1130 included in cloud 1000 are accessible via switch 1175 over a network 1120, such as a private network or the Internet. One or more physical and/or virtual client devices 1010 demanding use of the resources 1105, 1110 and 1130 may be local to or remote from cloud 1000. The client devices 1010 may be any type of computing devices, such as computers or smartphones, executing any type of operating system. The client devices 1010 communicate requests to access the resources 1105, 1110 and 1130 in cloud 1000 using a communications protocol, such as Hypertext Transfer Protocol (HTTP). Such requests, which are communicated by client devices 1010 via network 1120 to the resources 1105, 1110 and 1130, may be expressed in conformance with an interface, such as a client interface (e.g. a web browser), a program interface, or an application programming interface (API).

In some embodiments, a cloud service provider provides access to cloud 1000 to one or more client devices 1010. Various service models may be implemented by cloud 1000 including but not limited to Software-as-aService (SaaS), Platform-as-a-Service (PaaS), and Infrastructure-as-a-Service (IaaS). In SaaS, a cloud service provider provides client devices 1010 the capability to use the cloud service provider's applications, which are executing on the resources in cloud 1000. In PaaS, the cloud service provider provides cloud users the capability to deploy onto cloud resources 1105, 1110 and 1130 custom applications, which are created using programming languages, libraries, services, and tools supported by the cloud service provider. In Paas, the cloud service provider may make available to client devices 1010, one or more applications, such as a Relational Database Management System (RDBMS) as a service, Customer Relationship Management (CRM) application as a service, Enterprise Resource Planning (ERP) as a service, an Java as a service.

In IaaS, the cloud service provider provides cloud users the capability to provision processing, storage, networks, and other resources 1105, 1110 and 1130 in the cloud 1000. Any applications and/or operating systems, may be deployed on the resources 1105, 1110 and 1130. Resources 1105, 1110 and 1130 may be used to implement processes to perform one or more acts or steps or operations described above in reference to FIGS. 1A-1D, 1K, 1L, 1M, 1N, 1O, 1P, 2B, 3A, 3B, 6A, 6B and 6C.

In some embodiment, various deployment models may be implemented by cloud 1000, including but not limited to a private cloud, a public cloud, and a hybrid cloud. In a private cloud, cloud resources 1105, 1110 and 1130 are provisioned for exclusive use by a particular group of one or more users, referred to below as entities, examples of which are a corporation, an organization, a single person, a family, or other such groups of users. The cloud resources may be located on the premises of one or more entities in the particular group, and/or at one or more remote off-premise locations. In a public cloud, cloud resources are provisioned for use by multiple entities (also referred to herein as "tenants" or "customers"). Each tenant uses one or more client devices 1010 to access cloud resources 1105, 1110 and 1130. Several tenants may share their use of a particular resource, such as server computer 100 in cloud 1000 at different times and/or at the same time. Cloud resources 1105, 1110 and 1130 may be located at one or more remote off-premise locations, away from the premises of the tenants.

In some embodiments referred to as hybrid cloud, cloud 1000 includes a private cloud (not shown) and a public cloud (not shown). A cloud interface (not shown) between the private cloud and the public cloud allows for data and application portability. Data stored at the private cloud and data stored at the public cloud may be exchanged through the cloud interface. Applications implemented at the private cloud and applications implemented at the public cloud may have dependencies on each other. A call from an application at the private cloud to an application at the public cloud (and vice versa) may be executed through the cloud interface.

In certain embodiments, cloud 1000 is configured to support multiple tenants such that each tenant is independent from other tenants. For example, a business of one tenant may be separate from a business of another tenant. Each tenant may require different levels of computing services to be provided by the cloud computing network. Tenant requirements may include, for example, processing speed, amount of data storage, level of security, and/or level of resiliency.

In various embodiments, tenant isolation is implemented in cloud 1000. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In several embodiments of cloud 1000, data sets corresponding to various tenants are stored as entries in a database 202. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In a few embodiment of cloud 1000, data sets and virtual resources (e.g., virtual machines, application instances, and threads) corresponding to different tenants are isolated to tenant-specific overlay networks, which are maintained by cloud 1000. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint de-capsulates the outer packet to obtain the original packet transmitted by the source device. The original packet is transmitted from the second encapsulation tunnel endpoint to the destination device in the same particular overlay network.

One or more of steps and acts described above in reference to FIGS. 1A-1D, 1K, 1L, 1M, 1N, 1O, 1P, 2B, 3A, 3B, 6A, 6B and 6C may be used to program one or more computer(s) 100, 160, 170 each of which may be implemented in hardware of the type illustrated in FIGS. 7B and 7C. Each of computers 100, 160, 170 include a bus 1102 (FIGS. 7B, 7C) or other communication mechanism for communicating information. Computers 100, 160, 170 may include processors 1105 (FIGS. 7A-7C). Bus 1102 (FIGS. 7B, 7C) connects processors 1105 to memory 1107 (FIGS. 7A-7C). Memory 1107 may be implemented, for example, as random access memory (RAM) or other dynamic storage device, coupled to bus 1102 for storing information and instructions (e.g. to perform the steps and acts described above in reference to FIGS. 1A-1D, 1K, 1L, 1M, 1N, 1O, 1P, 2B, 3A, 3B, 6A, 6B and 6C) to be executed by processors 1105. Memory 1105 (FIGS. 7A-7C) may be used additionally for storing temporary variables or other intermediate information during execution of instructions to be executed by processors 1105.

For example, memory 1105 (FIGS. 7A and 7B) of server 110 may contain instructions to perform acts 221-224, 111, 112, 121, 131 and 141 and operations 120, 130 and 140 of FIG. 2B. Memory 1105 of server 110 may also temporarily store original rows 240A, 240B and/or redacted versions 207A, 207B of these rows shown in FIGS. 4A, 4B, and/or instructions to perform acts 132, 133 and 310 of FIG. 3A, and/or acts 611-617 of FIG. 6A. Main memory 1105 of server 110 also may be used for storing temporary variables or other intermediate information (e.g. query 206, 212 of FIG. 2B, result 234 of FIG. 2B, table-related statistics 235 of FIG. 2B and additional statistics 351 of FIG. 2B) during execution of instructions to perform acts of the type described above in reference to FIG. 2B by processors 1107 of server computer 100. Moreover, as shown in FIGS. 7A and 7C, memory 1105 of client 170 may temporarily store rows received in database storage format of server 100, which are processed by processors 1107 in client 170 by performing at least act 175A in FIG. 1G (described above) to generate processed rows also stored temporarily in memory 1107.

Computers 100, 160, 170 (FIG. 7B, 7C) may include read only memory (ROM) 1104 or other static storage device coupled to bus 1102 for storing static information and instructions for processors 1105, such as one or more components of software in the form of relational database management system (RDBMS) software and/or software in the form of BIOS and/or drivers of an operating system. A storage device 1110, such as a magnetic disk or optical disk may be included in computers 100, 160, 170 and coupled to bus 1002 for storing information and instructions, such as middleware (not shown) and/or relational database management system.

Computers 100, 160, 170 may include a display device or video monitor 1112 such as a cathode ray tube (CRT) or a liquid crystal display (LCD) which is coupled to bus 1102 for use in displaying information to a computer user. Computers 100, 160, 170 may additionally include an input device 1114, including alphanumeric and other keys (e.g. of a keyboard) also coupled to bus 1102 for communicating information (such as user input) to processors 1105. Another type of user input device is cursor control 1116, such as a mouse, a trackball, or cursor direction keys for communicating information and command selections to processors 1105 and for controlling cursor movement on display device 1112. This input device typically has two degrees of freedom in two axes, a first axis (e.g., x) and a second axis (e.g., y), that allows the input device to specify positions in a plane. In addition computers 100, 160, 170 may include a speaker (not shown) which generates sound, or any other output device, for use by processor 1105 in interacting locally, with any users.

As described above, computers 160, 170 may each issue a query to computer 100 to retrieve rows responsive thereto from a database 202, by processors 1105 in computers 160, 170 executing one or more sequences of one or more instructions that are contained in memory 1107 of computers 160, 170. And, computer 100 may respond to receipt of such a query by processors 1105 in computer 100 executing one or more sequences of one or more instructions that are contained in memory 1107 of computer 100. Such instructions may be read into the respective memories 1107 from a non-transitory computer-readable storage medium, such as storage device 1110. Execution of the sequences of instructions contained in main memory 1107 causes respective processors 1105 to perform the steps, acts, operations of the type described above in reference to FIGS. 1A-1D, 1K, 1L, 1M, 1N, 1O, 1P, 2B, 3A, 3B, 6A, 6B and 6C. In alternative embodiments, hard-wired circuitry may be used in place of or in combination with the just-described software instructions.

The term "non-transitory computer-readable storage medium" as used herein refers to any non-transitory storage medium that participates in providing instructions to processors 1105 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computers 100, 160 and 170. Volatile storage media includes dynamic memory, such as memory 1107 which may be implemented in the form of a random access memory or RAM.

Instructions to processors 1105 can be provided by a transmission link or by a non-transitory storage medium from which a computer can read information, such as data and/or code. Specifically, various forms of transmission link and/or non-transitory storage medium may be involved in providing one or more sequences of one or more instructions to processors 1105 for execution. For example, the instructions may initially be comprised in a non-transitory storage device, such as a magnetic disk, of a remote computer 1010. Such a computer 1010 (FIG. 7A) can load the instructions into its dynamic memory (RAM) and send the instructions over a telephone line using a modem to any of client computers 160, 170 and/or server computer 100.

A modem local to computers 100, 160 and 170 can receive instructions and/or rows of data via a telephone line, a cable link, a cellular wireless link, or via a Bluetooth wireless link, and store the received information in memory 1107 and/or on storage devices 1110. Moreover, storage devices 1110 may, in some embodiments, be used to store database 202, which may place on bus 1102 of server computer 100 (FIG. 7A), data blocks that hold original rows responsive to a query. Bus 1102 carries information placed thereon, to memory 1107, from which processors 1105 retrieve the data blocks and execute instructions of the type described above in reference to FIGS. 1A-1D, 1N, 1O, 1P, e.g. to perform operation 120, 130 or 140. Thus, processors 1105 retrieve original rows 240 and if necessary redact one or more not-to-be-sent columns, to prepare for transmission, a version of retrieved rows 240, such as redacted version 207 or processed version 213 (see FIG. 2A), or alternatively prepares for transmission unredacted version 209. Any software and/or data, such as rows 240 temporarily stored in main memory 1107 may optionally be stored on storage devices 1110 either before or after redaction by processors 1105. Moreover, instructions to perform operations 120, 130 and 140 may be received in memory 1107 and may optionally be stored on storage device 1110 either before or after execution by processors 1105.

Each of computers 100, 160 and 170 includes a network interface module 1109 coupled to bus 1102 as shown in FIGS. 7B and 7C. Network interface modules 1109 provides two-way data communication coupling to network link 1120 that is connected to a local network 1122. Network link 1120 may interconnect multiple computers (as described above). For example, network interface module 1109 may be an integrated services digital network (ISDN) card or a modem to provide a data communication connection to a corresponding type of telephone line. As another example, network interface module 1109 may be a local area network (LAN) card to provide a data communication connection to a compatible LAN. Wireless links may also be implemented. In any such implementation, network interface module 1109 sends and receives electrical, electromagnetic or optical signals that carry digital data streams representing various types of information.

Network link 1120 typically provides data communication through one or more networks to other data devices. For example, network link 1120 may provide a connection through local network 1122 to data equipment operated by an Internet Service Provider (ISP) 1126. ISP 1126 in turn provides data communication services through the world wide packet data communication network 1124 now commonly referred to as the "Internet". Network 1122 and network link 1120 both use electrical, electromagnetic or optical signals that carry digital data streams. The signals through the various networks and the signals on network link 1120 and through network interface module 1109 which carry the digital data to and from computers 100, 160 and 170 are exemplary forms of carrier waves transporting the information, which may be, for example, instructions of RDBMS to interface with relational database 202.

Computers 100, 160 and 170 can send messages and receive data, including program code, through the network(s), network link 1120 and network interface module 1109. In the Internet example, a server computer 100 might transmit information retrieved from RDBMS database through Internet 1124, ISP 1126, local network 1122, network link 1120 and network interface module 1109. Examples of such information include rows responsive to a query, e.g. redacted version 207 or original version 209 or processed version 213 described above in reference to FIG. 2A, after retrieval of respective original rows 240 by execution of relational database management system 1220 on relational database 202 (FIG. 2A) that is stored non-transitorily, e.g. in non-volatile storage media, such as hard disk included in storage devices 1110 (FIG. 7A)

Computer instructions for performing one or more steps or acts described above in reference to FIGS. 1A-1D, 1K, 1L, 1M, 1N, 1O, 1P, 2B, 3A, 3B, 6A, 6B and 6C may be executed by processors 1105 as they are received, and/or stored in storage device 1110, or other non-volatile storage for later execution. In this manner, computers 100, 160 and 170 may additionally or alternatively obtain instructions and any related data.

Note that FIGS. 7A-7C are low-level representations of some hardware components of computers 100, 160 and 170. Several embodiments of server computer 100 may have additional software components and/or related data in memory 1107, as may be needed to implement operations, steps, and acts, as shown in FIGS. 1A-1D, 1K, 1L, 1M, 1N, 1O, 1P, 2B, 3A, 3B, and 6A-6C. In addition to memory 1107, computers 100, 160 and 170 may include one or more other types of memory such as flash memory (or SD card) and/or a hard disk and/or an optical disk (also called "secondary memory") to store data and/or software for loading into memory 1107 (also called "main memory") and/or for use by processors 1105. In some embodiments, server computer 100 implements a relational database management system 1220 (FIG. 7A) to manage data in one or more tables of relational database 202 of the type illustrated in FIG. 2A. Relational database management system 1220 may manage a distributed database that includes multiple databases in addition to database 202, and database tables may be stored on different storage mechanisms instead of or in addition to storage devices 1110.

In some embodiments, processors 1107 that execute software of a relational database management system can access and modify the data in a relational database 202, and hence server computer 100 accepts queries in conformance with a relational database language, the most common of which is the Structured Query Language (SQL). The commands are used by processors 1105 of some embodiments to store, modify and retrieve data in the form of rows in tables A and B (FIG. 2A) that are implemented as relational tables (which may additionally contain one or more indexes pointing to other relational tables) in relational database 202.

Client computers 160 and 170 may include output logic that makes the data in a database table retrieved from database 202 via server computer 100, available to a user via a graphical user interface that generates a screen of an application program on a video monitor 1112. In one example, the output logic of client computers 160, 170 provides results on a monitor or other such visual display, via a command line interface. Additionally and/or alternatively, screens responsive to a command in a command-line interface and display on a video monitor may be generated by server computer 100.

As described elsewhere herein, execution of relational database management system 1220 (FIG. 7A) in server 100 may be implemented by one or more processors 1105 executing one or more sequences of one or more instructions that are contained in main memory 1107. Such instructions may be read into main memory 1107 from another non-transitory computer readable storage medium, such as storage devices 1110. Execution of the sequences of instructions contained in main memory 1107 causes processor 1105 to temporarily store in memory 1107, original rows which are retrieved from database 202 as illustrated in FIG. 2A. In alternative embodiments, hard-wired circuitry may be used in place of or in combination with software instructions in relational database management system 1220, to perform one or more acts, steps and/or operations described above.

Relational database management system 1220 (FIG. 7A) in server 100 may further include output logic that makes rows of data in a database table of relational database 202 available to a user via a graphical user interface that generates a display on a screen 1112 (FIG. 7B) of server 100. In some embodiments of server 100, functionality in the above-described operations, steps or acts of FIGS. 1A-1D, 1K, 1L, 1M, 1N, 1O, 1P, 2B, 3A, 3B, and 6A-6C is implemented by processor 1105 (FIG. 7A) executing software in memory 1107, although in other embodiments such functionality is implemented in any combination of hardware circuitry and/or firmware and/or software in one or more of clients 170, 160 and server 100. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing operations or acts of FIGS. 2B, 3A, 3B, and 6A-6C can, but need not necessarily include, one or more microprocessors, embedded processors, controllers, application specific integrated circuits (ASICs), digital signal processors (DSPs), multi-core processors and the like, appropriately programmed with software in the form of instructions to implement one or more operations, steps, or acts of the type described herein.

In some embodiments, server 100 may include multiple processors, each of which is programmed with software in a memory 1607 shared with each other to perform acts of the type described above to implement the individual components illustrated in, for example, FIGS. 1A-1D, 1K, 1L, 1M, 1N, 1O, 1P, 2B, 3A and 6A. For example, a first processor 1605 in server 100 may be programmed with software in memory 1107 to implement steps 311-315 of FIG. 3A in one component. A second processor 1605 in server 160 may be programmed with software in memory 1107 (FIG. 7A) to implement acts 111, 112, 131 and 134 of FIG. 2B in a second component. Finally, a third processor 1605 in server 100 may be programmed with software in memory 1107 (FIG. 7A) to implement in a third component, other processes, tasks, functions, threads, and logic of relational database management system 220 to interface with relational database 202 in the normal manner.

Thus multiple processors 1105 (FIG. 7A) may be used in some embodiments to individually implement multiple components of software (e.g. act 150 to select a specific redaction technique, and act 132 to select a specific granularity level). In other embodiments a single processor 1105 may be used in a time shared manner to perform all the above-described operations and/or steps and/or acts. For example, a server 100 that executes relational database management system 1220 may also execute acts 221-224(FIG. 2B) described above. Such a server 100 may be programmed to perform any one or more of acts described above in reference to FIGS. 1A-1D, 1K, 1L, 1M, 1N, 1O, 1P, 2B, 3A, 3B, and 6A-6C. Furthermore, although multiple processors 1105 for certain embodiments are included in a single computer, in other embodiments multiple processors 1105 may be included in multiple computers, for example two computers 100 may respectively perform the above-described acts 111 and 112. Database 202 of some embodiments may be implemented as a relational database which is accessible by executing software of a relational database management system (RDBMS) software 1220 (FIG. 7A), such as Oracle 11gR2 available from Oracle Corporation of Redwood Shores, Calif.

Server 100 of the type described above may be programmed with software in a memory 1107 to perform a computer-implemented method of processing queries, as follows. In some embodiments, the computer-implemented method includes (a) receiving a query that references an object, wherein the object comprises a plurality of cells located at intersections of columns and rows, (b) selecting from among multiple redaction techniques, a specific redaction technique, (c) selecting from among a plurality of levels of granularity, a current level of granularity, wherein the plurality of levels of granularity include: (c1) a minimal level of granularity, wherein the specific redaction technique is applicable to all cells of the object, (c2) an intermediate level of granularity, wherein the specific redaction technique is applicable to at least a first column in each row of the object and another redaction technique is applicable to at least a second column in said each row, (c3) a maximal level of granularity, wherein the specific redaction technique is selected for application to only one cell in the object, and (d) preparing and transmitting, in a database storage format in which the object is stored in the one or more storage devices, a redacted version of a row identified in response to the query, by use of the specific redaction technique at the current level of granularity. In an embodiment of the type described in this paragraph, at the maximal level of granularity in the computer-implemented method, a redaction technique is independently selected from among multiple redaction techniques, for each cell at a row column intersection.

Server 100 of some embodiments may be programmed with software in a memory 1107 to perform a computer-implemented method of processing database queries, by (a) receiving, in one or more computers, a query that identifies one or more tables in a relational database accessible to the one or more computers through a relational database management system, wherein the one or more tables comprise a plurality of columns and a plurality of rows stored in the relational database, in a database storage format, (b) checking whether the plurality of columns comprise any column not to be sent in responding to the query, (c) when a result of the checking is true, preparing and transmitting from the one or more computers, a redacted version of a row in the one or more tables identified in the query, wherein the redacted version is prepared by redacting said any column not to be sent, from one or more rows retrieved respectively from the one or more tables, by applying a specific redaction technique, while maintaining in the database storage format, one or more columns selected in the query, and (d) when the result of the checking is false, preparing and transmitting from the one or more computers, in the database storage format, all columns in at least said row in the one or more tables identified in the query.

As noted above, in some embodiments, a non-transitory computer-readable medium tangibly embodies software (also called "computer instructions") to implement one or more acts or operations described herein and illustrated in FIGS. 2B, 3A, 3B, and 6A-6C. Specifically, such software includes computer instructions stored in memory 1607 that when executed by processor 1105 (FIG. 7), cause the processor 1105 to perform a computer-implemented method, the computer-implemented method including receiving a query, checking whether a plurality of columns stored in an object referenced by the query comprise one or more columns not to be sent in responding to the query, when the plurality of columns comprise one or more columns not to be sent, preparing and transmitting in a database storage format used in the one or more storage devices, a redacted version of a row identified in response to the query, wherein the redacted version is prepared by redacting from said row, at least one column not to be sent, by applying a specific redaction technique thereto, while maintaining in the database storage format, one or more columns selected in the query, and when the plurality of columns do not comprise any columns not to be sent, preparing and transmitting in the database storage format, all columns in said row.

Moreover, in some embodiments, an apparatus (such as server 100) includes one or more computer memories coupled to one or more processors, the one or more processors being configured to execute instructions in the one or more computer memories to perform a computer-implemented method, the computer-implemented method including receiving a query, checking whether columns stored in one or more objects referenced by the query include any columns not to be sent in responding to the query, and if so preparing and transmitting in a database storage format used in the one or more storage devices, a redacted version of a row identified in response to the query, wherein the redacted version is prepared by redacting from said row, at least one column not to be sent, by applying a specific redaction technique thereto, while maintaining in the database storage format, columns selected in the query. In the just-describe embodiments, when the columns stored in one or more objects referenced by the query do not include any columns not to be sent, the apparatus may prepare and transmit in the database storage format, all columns in each row responsive to the query.

Server 100 of some embodiments may be programmed with software in a memory 1607 to perform a computer-implemented method to execute a query to prepare data for transmission in the database storage format, by using one or more redaction techniques that are selected by default initially (e.g. based on user-selectable options). After initial execution of a query, a specific redaction technique that is used, to discard a value at a specific row-column intersection in data responsive to the query, may be selected by server 100 based on statistics and/or estimates that are generated during the query's initial execution. Selection of one or more redaction techniques, to be used in redacting query responsive data, may be itself done in server 100, at a selected level of granularity, as follows.

Specifically, preparation of redacted versions of one or more original rows retrieved from database 202 in response to a query may be performed by server 100, at any of multiple levels of granularity, which may include, for example, (1) a minimal level of granularity (also called "coarsest granularity"), (2) an intermediate level of granularity, and (3) a maximal level of granularity (also called "finest granularity"). In some embodiments, server 100 may prepare a query's response at the maximal level of granularity, by selecting a respective redaction technique independently, for each cell at the intersection of a to-be-redacted column and a row, from among multiple redaction techniques (such as nulling, randomizing, masking, excising, or any combination thereof). Depending on one or more factors, such as processing load in server 100, statistics related to size of data in the object, and/or latency measurements of past query responses, server 100 may prepare redacted versions of rows at an intermediate level of granularity. At the intermediate level, server 100 selects and applies one specific redaction technique to one specific column in each row of the object, while another redaction technique is selected and applied to another column in each row of the object (thereby to implement column-level usage of redaction techniques). Also depending on one or more factors of the type described above, server 100 may prepare redacted versions of rows at the minimal level of granularity, wherein one specific redaction technique is applied to all cells of the object.

In such embodiments, a current level of granularity may be selected by server 100, based at least partially on an indicator of alteration of the object, a count of executions of the query at a prior level of granularity, and a limit on the count of query executions whose statistics are to be stored, wherein depending on the embodiment, the just-described limit may be a function of computation load in server 100. In some embodiments, server 100 may select the current level of granularity based at least partially on a privilege of a client, from which the query is received. In various embodiments, server 100 may select the current level of granularity, based at least partially on past latency measurements at a client from which the query is received. Depending on the embodiment, selection of a current level of granularity may be performed periodically, e.g. every 10 minutes, or performed asynchronously, e.g. on receipt of each query, or any combination thereof (e.g. on receipt of a new query after waiting 10 minutes from the most-recent granularity level selection).

In several embodiments, server 100 may select from among multiple redaction techniques, a specific redaction technique (which may be used at any of the above-described levels of granularity), based at least partially on a size of reduction in load at a client from which the query is received, due to not processing one or more columns not to be sent. In certain embodiments, server 100 may select from among multiple redaction techniques, a specific redaction technique (which may be used at any of the above-described levels of granularity), based on respective multiple estimates of number of instructions required in application of each redaction technique. Depending on the embodiment, selection of a specific redaction technique may be performed periodically, e.g. every 10 minutes, or performed asynchronously, e.g. after M executions of a query if an indicator of alteration of the object satisfies a test thereon (e.g. data in the object is changed a certain number of times, or metadata of the object changed another number of times). In several embodiments, the multiple redaction techniques include a first redaction technique of nulling, a second redaction technique of masking, a third redaction technique of randomizing (all these three redaction techniques modify the data being redacted), and a fourth redaction technique of excising (which discards the data being redacted). In some embodiments, a fifth redaction technique includes a combination of modifying and excising different portions of the data being redacted, followed by sending at least the modified data of the redacted column to the client.

In many embodiments, server 100 responds to a client's query, by bulk transfer of data in a database storage format, wherein the data is prepared by server 100: (1) redacting data of one or more not-to-be-sent columns of a row, when they cannot be sent (for any reason) in a response to the client's query while keeping data in other columns of the row which are to be sent in the storage format, thereby to obtain a redacted version of original rows for transmission to the client or (2) retaining all columns of the row without redaction when they are all needed by the client's query, thereby to obtain unredacted versions of original rows for transmission to the client.

In some embodiments, an object of the type described above includes a table in a relational database as described in detail below, although in other embodiments, the object may be organized in a non-relational system of storage. In examples of a non-database system of storage, data of the type described above is stored in files and/or images and/or videos. In an illustrative embodiment of a non-relational storage system, the data is stored in cells at the intersection of columns and rows, in a spreadsheet.

Various adaptations and modifications may be made without departing from the scope of the described embodiments. Numerous modifications and adaptations of the embodiments described herein are encompassed by the attached claims.

The invention claimed is:

1. A computer-implemented method of processing queries, the computer-implemented method comprising:
receiving from a client computer, a query referencing one or more objects stored by a database management system in a database on one or more storage devices;
retrieving from the one or more storage devices, one or more raw rows responsive to the query, the one or more raw rows being expressed in a database storage format related to storage in the database;
checking a plurality of conditions to decide how to send to the client computer, the one or more raw rows responsive to the query;
when at least one of one or more first conditions in the plurality of conditions is satisfied, extracting into memory one or more columns selected in the query from the one or more raw rows or portions thereof, preparing one or more processed rows or portions thereof in a predetermined format which is different from the database storage format and transmitting to the client computer, the one or more processed rows or portions thereof in the predetermined format;

when all of the one or more first conditions are not satisfied and at least one of one or more second conditions in the plurality of conditions is satisfied, omitting from or modifying in the one or more raw rows or portions thereof in the database storage format, one or more columns not to be sent to obtain redacted versions of the one or more raw rows or portions thereof in the database storage format and transmitting to the client computer, the redacted versions of the one or more raw rows or portions thereof in the database storage format; and when all of the one or more first conditions are not satisfied and all of the one or more second conditions are not satisfied, retaining all columns in the one or more raw rows or portions thereof in the database storage format, and transmitting to the client computer, the one or more raw rows or portions thereof in the database storage format;

wherein at least the receiving, the checking, the transmitting, and one or more of the extracting, the preparing, and the omitting from or modifying are implemented automatically by one or more processors coupled to the one or more storage devices.

2. The computer-implemented method of claim 1 wherein the plurality of conditions are hereinafter a plurality of run-time conditions, the method further comprising:

checking one or more compile-time conditions to decide how to send to the client computer, the one or more raw rows;

when none of the one or more compile-time conditions are satisfied, extracting into memory one or more columns selected in the query from the one or more raw rows or portions thereof, preparing one or more processed rows or portions thereof and transmitting to the client computer, the one or more processed rows or portions thereof; and when any of the one or more compile-time conditions is satisfied, performing the checking of the plurality of run-time conditions.

3. The computer-implemented method of claim 1 wherein:

the plurality of conditions comprise one or more attributes that do not change during query execution.

4. The computer-implemented method of claim 3 wherein:

at least one attribute in the one or more attributes is related to the query.

5. The computer-implemented method of claim 1 wherein:

the plurality of conditions comprise one or more parameters that vary during query execution.

6. The computer-implemented method of claim 5 wherein:

at least one parameter in the one or more parameters is related to a size of a column in a row in the one or more raw rows.

7. The computer-implemented method of claim 1 wherein:

among the plurality of conditions, at least one condition applies one or more access control policies to the one or more columns in the one or more raw rows or portions thereof.

8. The computer-implemented method of claim 1 wherein the omitting from or the modifying is performed by applying one or more redaction techniques at a granularity level, and the computer-implemented method further comprises:

automatically selecting, from among a plurality of levels of granularity, a current level of granularity at which the one or more redaction techniques are to be applied, based on results of evaluation of one or more additional conditions; and determining from among a plurality of redaction techniques, the one or more redaction techniques are to be used at the current level of granularity;

wherein the plurality of levels of granularity comprise:

a minimal level of granularity, wherein one of the one or more redaction techniques is commonly applied to all cells at intersections of the one or more raw rows with one or more columns;

an intermediate level of granularity, wherein one of the one or more redaction techniques is applied to a specific column in the one or more raw rows, and another of the one or more redaction techniques is applied to another column in the one or more raw rows; and a maximal level of granularity, wherein one of the one or more redaction techniques is independently selected from among the plurality of redaction techniques, for each application to each cell's value at each intersection of the one or more raw rows with the one or more columns.

9. The computer-implemented method of claim 8 wherein an additional condition in the one or more additional conditions checks on at least one of: computation load in the one or more processors or privilege of the client computer or past latency measurements at the client computer.

10. The computer-implemented method of claim 8 wherein the determining comprises checking one or more of:

an indicator of alteration of the one or more objects; and a count of executions of the query, at a prior level of granularity.

11. The computer-implemented method of claim 8 wherein:

the plurality of redaction techniques comprise at least a first redaction technique of nulling, a second redaction technique of masking, and a third redaction technique of excising.

12. The computer-implemented method of claim 1 wherein:

among the one or more raw rows, a raw row comprises one or more row pieces; and the omitting from comprises dividing a row piece into smaller row pieces and forming a redacted version of the raw row by concatenating at least two smaller row pieces thereby to omit therefrom at least a value of a column not selected in the query.

13. The computer-implemented method of claim 1 wherein:

the one or more columns selected in the query are ordered relative to one another in a first order that is different from a second order in which the one or more columns are stored in the one or more objects; and the one or more columns selected in the query are transmitted in the second order in the redacted versions of the one or more raw rows.

14. The computer-implemented method of claim 1 wherein:

among the one or more raw rows, a raw row comprises one or more existing row pieces;

among the one or more existing row pieces, at least one existing row piece comprises to-be-sent data in one or more columns selected in the query from among a plurality of columns, and further comprises not-to-be-sent data in one or more additional columns not selected in the query; and
the omitting from or the modifying comprises preparing one or more new row pieces to include the to-be-sent data in the database storage format and omit therefrom the not-to-be-sent data by at least updating metadata for the one or more new row pieces.

15. The computer-implemented method of claim 1 wherein the omitting from or the modifying is performed by applying a redaction technique, and the computer-implemented method further comprises:
   determining from among a plurality of redaction techniques, the redaction technique to be used to perform the omitting from or the modifying.

16. The computer-implemented method of claim 15 further comprising:
   storing in the memory, statistics related to a number of times each redaction technique is used to discard a value of a column in executing the query;
   wherein the determining is performed based at least partially on the statistics.

17. The computer-implemented method of claim 15 wherein:
   the redaction technique is determined based at least partially on comparing a plurality of estimates of number of instructions required to be performed by the one or more processors in applying the plurality of redaction techniques.

18. The computer-implemented method of claim 17 wherein:
   one or more estimates in the plurality of estimates are based at least partially on an estimate of reduction in processing load at the client computer that sent the query, due to not extracting from the one or more raw rows in the database storage format at least the one or more columns not selected in the query.

19. The computer-implemented method of claim 1 wherein:
   the plurality of conditions comprise one or more attributes related to the client computer.

20. The computer-implemented method of claim 1 wherein:
   among the plurality of conditions, one or more conditions determine the one or more columns not be sent to the client computer.

21. One or more computer-readable storage media comprising a plurality of instructions to one or more processors to perform a method of processing queries, the method comprising:
   receiving from a client computer, a query referencing one or more objects stored by a database management system in a database on one or more storage devices;
   retrieving from the one or more storage devices, one or more raw rows responsive to the query, the one or more raw rows being expressed in a database storage format related to storage in the database;
   checking a plurality of conditions to decide how to send to the client computer, the one or more raw rows responsive to the query;
   when at least one of one or more first conditions in the plurality of conditions is satisfied, extracting into memory one or more columns selected in the query from the one or more raw rows or portions thereof, preparing one or more processed rows or portions thereof in a predetermined format which is different from the database storage format and transmitting to the client computer, the one or more processed rows or portions thereof in the predetermined format;
   when all of the one or more first conditions are not satisfied and at least one of one or more second conditions in the plurality of conditions is satisfied, omitting from or modifying in the one or more raw rows or portions thereof in the database storage format, one or more columns not to be sent to obtain redacted versions of the one or more raw rows or portions thereof in the database storage format and transmitting to the client computer, the redacted versions of the one or more raw rows or portions thereof in the database storage format; and
   when all of the one or more first conditions are not satisfied and all of the one or more second conditions are not satisfied, retaining all columns in the one or more raw rows or portions thereof in the database storage format, and
   transmitting to the client computer, the one or more raw rows or portions thereof in the database storage format.

22. An apparatus comprising one or more computer memories coupled to one or more processors, the one or more processors being configured to execute instructions in the one or more computer memories to cause the one or more processors to:
   receive from a client computer, a query referencing one or more objects stored by a database management system in a database on one or more storage devices;
   retrieve from the one or more storage devices, one or more raw rows responsive to the query, the one or more raw rows being expressed in a database storage format related to storage in the database;
   check a plurality of conditions to decide how to send to the client computer, the one or more raw rows responsive to the query;
   when at least one of one or more first conditions in the plurality of conditions is satisfied, extract into memory one or more columns selected in the query from the one or more raw rows or portions thereof, prepare one or more processed rows or portions thereof in a predetermined format which is different from the database storage format and transmit to the client computer, the one or more processed rows or portions thereof in the predetermined format;
   when all of the one or more first conditions are not satisfied and at least one of one or more second conditions in the plurality of conditions is satisfied, omit from or modify in the one or more raw rows or portions thereof in the database storage format, one or more columns not to be sent, to obtain redacted versions of the one or more raw rows or portions thereof in the database storage format and transmit to the client computer, the redacted versions of the one or more raw rows or portions thereof in the database storage format; and
   when all of the one or more first conditions are not satisfied and all of the one or more second conditions are not satisfied, retain all columns in the one or more raw rows or portions thereof in the database storage format, and
   transmit to the client computer, the one or more raw rows or portions thereof in the database storage format.

* * * * *

UNITED STATES PATENT AND TRADEMARK OFFICE
CERTIFICATE OF CORRECTION

PATENT NO. : 11,055,289 B2
APPLICATION NO. : 16/040551
DATED : July 6, 2021
INVENTOR(S) : Bastawala et al.

It is certified that error appears in the above-identified patent and that said Letters Patent is hereby corrected as shown below:

On the Title Page

Column 2, Item (57), under Abstract, Line 7, delete "to not be" and insert -- not to be --, therefor.

On page 2, Column 1, Item (56), under Other Publications, Line 6, delete "https://oraclue.wordpress.com" and insert -- https://oracle.wordpress.com --, therefor.

In the Drawings

On sheet 1 of 32, in FIG. 1A, under Reference Numeral 23, Line 2, after "version" insert -- of --.

On sheet 3 of 32, in FIG. 1C, under Reference Numeral 23, Line 2, after "version" insert -- of --.

On sheet 10 of 32, in FIG. 1N, under Reference Numeral 121, Line 6, delete "paresable" and insert -- parsable --, therefor.

On sheet 11 of 32, in FIG. 1O, under Reference Numeral 121, Line 6, delete "paresable" and insert -- parsable --, therefor.

On sheet 19 of 32, in FIG. 4C, under Reference Numeral 430, Line 4, delete "Lengh" and insert -- Length --, therefor.

In the Specification

In Column 6, Line 43, delete "FIG." and insert -- FIGS. --, therefor.

In Column 7, Line 19, after "FIG. 2A" insert -- . --.

In Column 11, Line 36, delete "runtime," and insert -- run-time, --, therefor.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*

In Column 12, Line 34, delete "second-runtime" and insert -- second run-time --, therefor.

In Column 16, Line 35, delete "1N,1O" and insert -- 1N, 1O --, therefor.

In Column 20, Line 61, delete "IF" and insert -- 1F --, therefor.

In Column 21, Line 5, delete "IF" and insert -- 1F --, therefor.

In Column 22, Line 47, delete "below)" and insert -- below). --, therefor.

In Column 24, Line 26, delete "(FIG." and insert -- (FIGS. --, therefor.

In Column 31, Line 45, delete "FIG." and insert -- FIGS. --, therefor.

In Column 33, Line 18, delete "in in" and insert -- in --, therefor.

In Column 34, Line 47, delete "Ar s" and insert -- AJ's --, therefor.

In Column 37, Line 7, delete "in in" and insert -- in --, therefor.

In Column 45, Line 66, after "in" delete "the".

In Column 47, Line 4, delete "Software-as-aService" and insert -- Software-as-a-Service --, therefor.

In Column 47, Line 14, delete "Paas," and insert -- PaaS, --, therefor.

In Column 49, Line 18, delete "(FIG." and insert -- (FIGS. --, therefor.

In Column 51, Line 38, delete "7A)" and insert -- 7A). --, therefor.

In the Claims

In Column 57, Line 8, in Claim 1, delete "sent" and insert -- sent, --, therefor.

In Column 57, Line 34, in Claim 2, delete "are" and insert -- is --, therefor.

In Column 58, Line 9, in Claim 8, after "techniques" delete "are".

In Column 60, Line 10, in Claim 21, delete "sent" and insert -- sent, --, therefor.